(12) United States Patent
Bennett et al.

(10) Patent No.: US 10,162,109 B2
(45) Date of Patent: Dec. 25, 2018

(54) MULTIMODE OPTICAL FIBERS FOR ATTENUATORS

(71) Applicant: Corning Incorporated, Corning, NY (US)

(72) Inventors: Kevin Wallace Bennett, Hammondsport, NY (US); Scott Robertson Bickham, Corning, NY (US); Dana Craig Bookbinder, Corning, NY (US); Robert Arnold Knowlton, Wellsboro, PA (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/881,239

(22) Filed: Jan. 26, 2018

(65) Prior Publication Data
US 2018/0224599 A1     Aug. 9, 2018

Related U.S. Application Data

(60) Provisional application No. 62/455,737, filed on Feb. 7, 2017.

(51) Int. Cl.
*G02B 6/028* (2006.01)
*G02B 6/036* (2006.01)

(52) U.S. Cl.
CPC ....... *G02B 6/0288* (2013.01); *G02B 6/03627* (2013.01)

(58) Field of Classification Search
CPC .................................................. G02B 6/0288
See application file for complete search history.

(56) References Cited

U.S. PATENT DOCUMENTS

| 4,447,124 A | 5/1984 | Cohen |
| 5,410,567 A | 4/1995 | Brundage et al. |
| (Continued) | | |

FOREIGN PATENT DOCUMENTS

EP          0294037 A1    12/1988

OTHER PUBLICATIONS

Tanaka; "Co2+-Doped Flatband Optical Fiber Attenuator"; Optics Letters, vol. 26, No. 11, pp. 783-785 (2001).
(Continued)

*Primary Examiner* — Omar R Rojas
(74) *Attorney, Agent, or Firm* — John P. McGroarty; Svetlana Z. Short

(57) ABSTRACT

According to embodiments, an optical fiber may include a core portion comprising a radius $r_C$, a centerline $C_L$, a numerical aperture NA greater than or equal to 0.15 and less than or equal to 0.25, a graded relative refractive index profile having a maximum relative refractive index $\Delta_{Cmax}$ and an α value greater than or equal to 1 and less than or equal to 3. The core portion may include an up-dopant with a graded concentration from the radius $r_C$ to the centerline $C_L$ and an attenuation dopant with a constant concentration from the centerline $C_L$ of the core portion to the radius $r_C$ of the core portion. The optical fiber is multi-moded for wavelengths of light within a range from 800 nm to 1350 nm and an attenuation of the optical fiber wavelengths between 800 nm and 1000 nm is greater than or equal to 0.5 dB/m.

34 Claims, 20 Drawing Sheets

(56) References Cited

U.S. PATENT DOCUMENTS

| | | |
|---|---|---|
| 5,651,085 A | 7/1997 | Chia |
| 5,841,926 A | 11/1998 | Takeuchi et al. |
| 5,897,803 A | 8/1999 | Zheng et al. |
| 6,027,062 A | 2/2000 | Bacon et al. |
| 6,748,151 B1 | 6/2004 | Watanabe et al. |
| 7,092,610 B2 | 8/2006 | Yamaguchi et al. |
| 7,565,820 B2 | 7/2009 | Foster et al. |
| 7,832,675 B2 | 11/2010 | Bumgarner et al. |
| 8,189,978 B1 * | 5/2012 | Bennett ............... G02B 6/0288 385/124 |
| 2016/0202419 A1 | 7/2016 | Lapointe et al. |

OTHER PUBLICATIONS

International Search Report and Written Opinion PCT/US2018/016575 dated Apr. 16, 2018, 16 Pages.

Seikai et al. "Optimization of multimode graded-index fiber parameters: design considerations" Applied Optics, 19(16) pp. 2860-2865. Aug. 1980.

* cited by examiner

US 10,162,109 B2

MULTIMODE OPTICAL FIBERS FOR ATTENUATORS

This application claims the benefit of priority under 35 U.S.C. § 119 of U.S. Provisional Application Ser. No. 62/455,737 filed on Feb. 7, 2017 the content of which is relied upon and incorporated herein by reference in its entirety.

BACKGROUND

Field

The present specification generally relates to multimode optical fibers and, more specifically, to multimode optical fibers for attenuators.

Technical Background

Optical networks carry large amounts of information over a single optical fiber. Such networks typically require the monitoring and adjustment of optical signal power levels of each wavelength component of an optical signal in order to produce a balanced output performance. Automated power control of the optical signal power is usually performed with attenuators in optical cross-connects or in other network nodes. Examples of fixed optical attenuators include receptacle-style and loopback-style attenuators. There is a need for fixed optical attenuators with improved attenuation properties and low bend losses.

SUMMARY

According to embodiments, an optical fiber may include a core portion comprising a radius $r_C$, a centerline $C_L$, a numerical aperture NA greater than or equal to 0.15 and less than or equal to 0.25, a graded relative refractive index profile having a maximum relative refractive index $\Delta_{Cmax}$ and an α value greater than or equal to 1 and less than or equal to 3. The core portion may include an up-dopant with a graded concentration such that the concentration of the up-dopant is lowest at the radius $r_C$ and increases from the radius $r_C$ along a direction towards the centerline $C_L$ of the core portion. The core portion may also include an attenuation dopant with a constant concentration from the centerline $C_L$ of the core portion to the radius $r_C$ of the core portion. A cladding portion may surround the core portion and have a relative refractive index $\Delta_{OC}$, wherein $\Delta_{Cmax} > \Delta_{OC}$. The cladding portion may be formed from silica-based glass comprising the attenuation dopant with a constant concentration through a radial thickness of the cladding portion. The optical fiber is multi-moded for wavelengths of light within a range from 800 nm to 1000 nm and an attenuation of the optical fiber for at least one wavelength between 800 nm and 1000 nm is greater than or equal to 0.5 dB/m.

According to other embodiments, an optical fiber may include a core portion comprising a radius $r_C$, a centerline $C_L$, a numerical aperture NA greater than or equal to 0.15 and less than or equal to 0.25, a graded relative refractive index profile having a maximum relative refractive index $\Delta C_{max}$ and an α value greater than or equal to 1 and less than or equal to 3. The core portion may be formed from silica-based glass comprising an up-dopant, wherein a concentration of the up-dopant in the core portion is graded such that the concentration of the up-dopant is lowest at the radius $r_C$ and increases from the radius $r_C$ along a direction towards the centerline $C_L$ of the core portion. The core portion may further comprise an attenuation dopant, wherein a concentration of the attenuation dopant in the core portion is graded such that the concentration of the attenuation dopant is lowest at the radius $r_C$ and increases from the radius $r_C$ along a direction towards the centerline $C_L$ of the core portion. A cladding portion may surround the core portion and have a relative refractive index $\Delta_{OC}$, wherein $\Delta_{Cmax} > \Delta_{OC}$. The optical fiber is multi-moded for wavelengths of light within a range from about 800 nm to about 1350 nm and an attenuation of the optical fiber for at least one wavelength between 800 nm and 1350 nm is greater than or equal to 0.5 dB/m.

In embodiments, the cladding portion may comprise a low-index trench and an outer cladding with the low-index trench disposed between the core portion and the outer cladding. In such embodiments, the cladding portion may further comprise an inner cladding disposed between the core portion and the low-index trench.

Additional features and advantages of the optical fibers described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
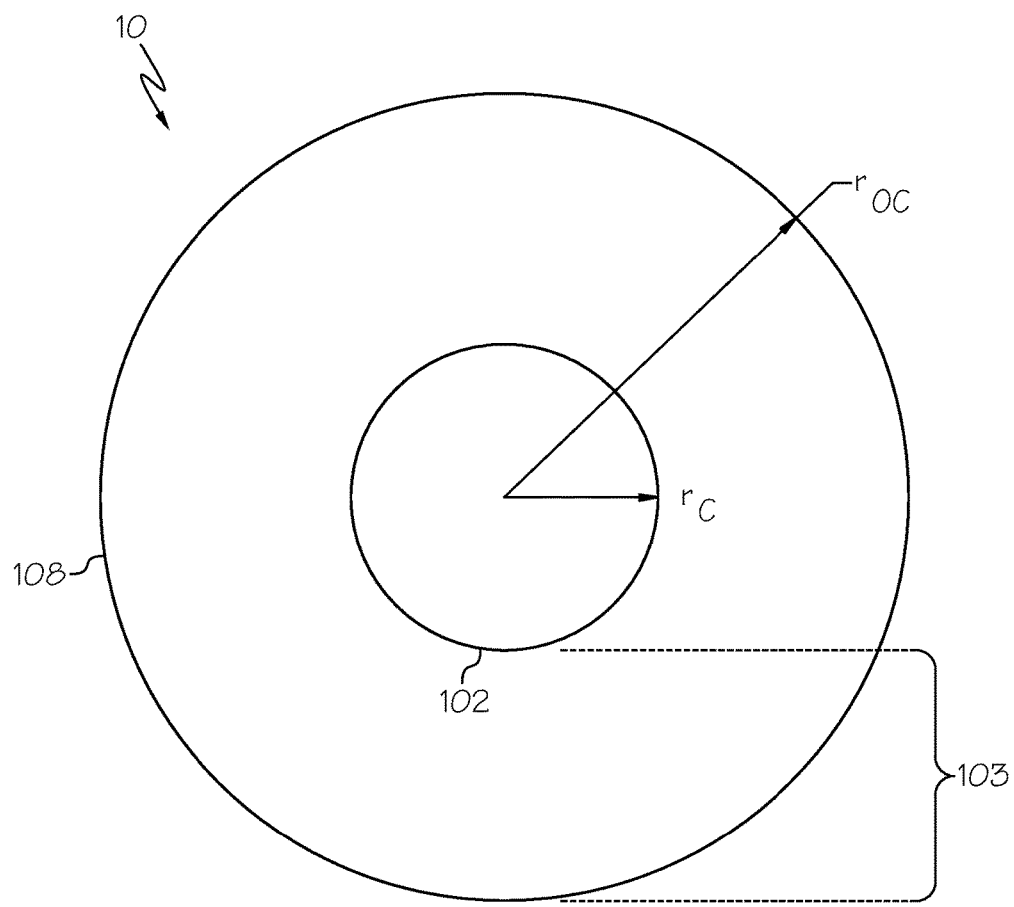
FIG. 1 schematically depicts a radial cross section of an optical fiber according to one or more embodiments shown and described herein.
Figure 2:
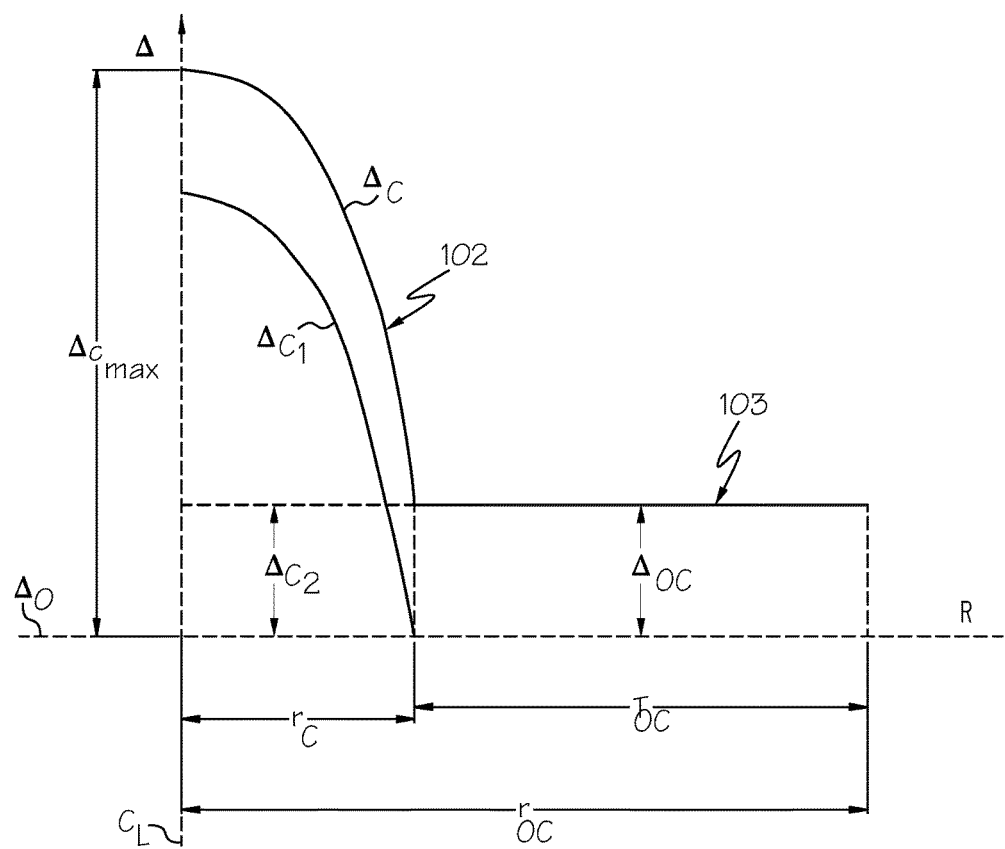
FIG. 2 graphically depicts a relative refractive index profile of the optical fiber of FIG. 1 as a function of the radius R of the glass portion of the optical fiber according to one or more embodiments shown and described herein.

Reference will now be made in detail to various embodiments of multimode optical fibers for use with optical fiber attenuators, examples of which are schematically depicted in the accompanying drawings. Whenever possible, the same reference numerals will be used throughout the drawings to refer to the same or like parts. A radial cross section and relative refractive index profile of one embodiment of a multimode optical fiber are schematically depicted in FIGS. 1 and 2, respectively. The optical fiber may include a core portion comprising an outer radius $r_C$ and a maximum relative refractive index $\Delta_{Cmax}$ relative to pure silica glass. A cladding portion surrounds the core portion and may be in direct contact with the core portion. The core portion may comprise an up-dopant and an attenuation dopant. A concentration of the up-dopant is graded such that the concentration of the up-dopant is lowest at the radius $r_C$ and increases from the radius $r_C$ along a direction towards a centerline $C_L$ of the core portion. The concentration of the attenuation dopant is constant from the centerline $C_L$ of the core portion to the radius $r_C$ of the core portion. The graded concentration of the up-dopant and the constant concentration of the attenuation dopant provide the core portion with a graded relative refractive index with an alpha ($\alpha$) value greater than or equal to 1 and less than or equal to 3. The cladding portion surrounding the core portion may have a relative refractive index $\Delta_{OC}$ and may be formed from silica glass containing the attenuation dopant. The concentration of the attenuation dopant in the cladding portion may be constant through a radial thickness of the cladding. The maximum relative refractive index $\Delta_{Cmax}$ of the core portion may be greater than the relative refractive index of the cladding portion $\Delta_{OC}$. The optical fiber may be multi-moded for wavelengths of light within a range from 800 nanometers (nm) to 1000 nm, may have a numerical aperture greater than or equal to 0.15 and less than or equal to 0.25, and may have an attenuation for at least one wavelength between 800 nm and 1000 nm greater than or equal to 0.5 decibels per meter (dB/m). In some embodiments, the cladding portion of the optical fiber may further comprise a low-index trench and an outer cladding with the low-index trench disposed between the core portion and the outer cladding. In such embodiments, the cladding portion may further comprise an inner cladding disposed between the core portion and the low-index trench.

Various embodiments of multimode optical fiber attenuators with a core portion comprising an up-dopant and an attenuation dopant will be described herein with specific reference to the appended drawings.

The following terminology will be used in conjunction with the optical fibers described herein:

The term "refractive index profile" or "relative refractive index profile," as used herein, is the relationship between the refractive index or the relative refractive index and the radius R of the fiber.

The term "relative refractive index," as used herein, is defined as:

$$\Delta(r)\% = 100 \times \frac{(n(r)^2 - n_{REF}^2)}{2n(r)^2},$$

where n(r) is the refractive index at radius r of the optical fiber, unless otherwise specified, and r=0 corresponds to the centerline of the fiber. The relative refractive index is defined at 850 nm unless otherwise specified. In the embodiments described herein, the reference index $n_{REF}$ is the refractive index of pure silica glass (i.e., $n_{REF}$=1.4525 at a wavelength of 850 nm). As used herein, the relative refractive index is represented by Δ and its values are given in units of "%," unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "pure silica" or "pure $SiO_2$" as used herein, refers to silica glass that is substantially free of dopants, wherein the concentration of said dopants is less than 0.5 wt. % and the refractive index of the silica glass is 1.4525 at 850 nm.

The term "up-dopant," as used herein, refers to a dopant which raises the refractive index of glass relative to pure $SiO_2$. The term "down-dopant," as used herein, is a dopant which has a propensity to lower the refractive index of glass relative to pure $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

The term "attenuation dopant" as used herein, refers to a dopant which attenuates an optical signal propagating through the optical fiber relative to un-doped $SiO_2$.

The numerical aperture (NA) of an optical fiber, as used herein, means the numerical aperture as measured using the method set forth in IEC-60793-1-43 (TIA SP3-2839-URV2 FOTP-177) titled "Measurement Methods and Test Procedures: Numerical Aperture".

The term "α-profile" or "alpha profile," as used herein, refers to a relative refractive index profile of the core portion, expressed in terms of Δ which is in units of "%," where r is the radius and which follows the equation, $$\Delta = \Delta_{Cmax}\left[1 - \left(\frac{r}{r_C}\right)^\alpha\right],$$

where $\Delta_{Cmax}$ is the maximum relative refractive index or the core portion, $r_C$ is the radius of the core portion, r is in the range $r_i \le r \le r_f$, Δ is as defined above, $r_i$ is the initial point of the α-profile, $r_f$ is the final point of the α-profile, and α is an exponent which is a real number. For a graded index profile, the alpha value is less than 10. The term "parabolic," as used herein, includes substantially parabolic refractive index profiles which may vary by up to 20% from an α value of 2.0 at one or more points in the core, as well as profiles with minor variations and/or a centerline dip.

A measure of the bend performance of the optical fibers described herein is macrobend performance. Macrobend performance is determined according to FOTP-62 (JEC-60793-1-47) by wrapping an optical fiber a prescribed number of turns around a mandrel with a fixed diameter, e.g. 10 mm, 15 mm, 20 mm, and/or 30 mm diameter and measuring the increase in attenuation due to the bending using an encircled flux (EF) launch condition. The encircled flux is measured by launching an overfilled pulse into an input end of a 2 meter length of InfiniCor® 50 micron core optical fiber which is deployed with a 1 wrap on a 25 mm diameter mandrel near the midpoint. The output end of the InfiniCor® 50 micron core optical fiber is spliced to the fiber under test, and the measured bend loss in dB is the ratio of the attenuation under the prescribed bend condition to the attenuation without the bend. Unless otherwise specified, the bend performance is measured at 850 nm.

The launch conditions and measurements are as specified above with respect to the average or total loss for a prescribed number of wraps around 10 mm, 15 mm, 20 mm, and/or 30 mm diameter mandrels.

Attenuation of the optical fibers described herein may be determined using an Optical Time Domain Reflectometer (OTDR).

The terms "microns" and "μm" are used interchangeably herein. The terms "nanometers" and "nm" are used interchangeably herein.

FIG. 1 schematically depicts a radial cross section of one embodiment of an optical fiber 10 for use with attenuators, e.g., fixed attenuators, having a relatively high attenuation per unit length. The optical fibers described herein are multimode optical fibers meaning that the fibers support the propagation of multiple modes of electromagnetic radiation at wavelengths between 800 nm and 1350 nm. In embodiments, the optical fibers described herein support the propagation of multiple modes of electromagnetic radiation at wavelengths between 800 nm and 1000 nm, for example propagation of multiple modes of electromagnetic radiation at wavelengths between 800 nm and 900 nm. In other embodiments, the optical fibers described herein support the propagation of multiple modes of electromagnetic radiation at wavelengths between 1250 nm and 1350 nm. The optical fibers generally comprise a core portion 102 and a cladding portion 103 surrounding the core portion 102. In embodiments, the cladding portion 103 directly contacts the core portion 102. In the embodiments described herein, the various portions of the optical fiber 10 (i.e., the core portion 102 and the cladding portion 103) are formed from glass, such as silica-based glass, which may be doped with one or more dopants to achieve the desired optical properties. The structure and composition of the optical fibers as well as the properties of the optical fibers will be described in further detail herein.

Referring to FIGS. 1 and 2, a radial cross section of one embodiment of an optical fiber 10 (FIG. 1) and the corresponding relative refractive index profile (FIG. 2) of the optical fiber 10 are depicted. The relative refractive index of the optical fiber 10 is plotted as a function of the radius R from the axial centerline $C_L$ of the optical fiber 10. The optical fiber 10 generally comprises a core portion 102 and a cladding portion 103, as described herein. In the embodiments described herein, the core portion 102 is positioned within the cladding portion 103 and has a maximum relative refractive index $\Delta_{Cmax}$ (relative to pure silica glass). The core portion 102 and the cladding portion 103 are concentric such that the cross section of the optical fiber 10 is generally circular symmetric with respect to the center of the core portion 102. In the embodiments described herein, the outer cladding 103 is in direct contact with the core portion 102. The cladding portion 103 has a relative refractive index $\Delta_{OC}$ (relative to pure silica glass). In the embodiment depicted in FIGS. 1 and 2, $\Delta_{Cmax} > \Delta_{OC}$. In the embodiments described herein, the core portion 102 and the outer cladding 103 are formed from silica, specifically silica glass.

While FIGS. 1 and 2 depict only a core portion 102 and a cladding portion 103, it should be understood that, in other embodiments, the cladding portion 103 may optionally comprise a low-index trench and an outer cladding as will be described in further detail herein. In still other embodiments, the cladding portion 103 may optionally comprise an inner cladding, a low-index trench, and an outer cladding, as will be described in further detail herein. In embodiments where the optical fiber does not include a low-index trench or an inner cladding, the cladding portion 103 may be referred to as the outer cladding.

Still referring to FIGS. 1 and 2, the core portion 102 has a radius $r_C$ and the cladding portion 103 has a radius $r_{OC}$. The cladding portion 103 extends from the radius $r_C$ to the radius $r_{OC}$ such that the outer cladding 103 has a radial thickness $T_{OC} = r_{OC} - r_C$. The cladding 103 surrounds the core portion 102. Accordingly, the glass portion of the optical fiber 10, (i.e., the core portion 102 and the cladding portion 103) may have a diameter of $2r_{OC}$. In some embodiments described herein, the radius $r_{OC}$ of the glass portion of the optical fiber 10 is less than 65 microns. In some embodiments described herein, the radius $r_{OC}$ of the glass portion of the optical fiber 10 is 62.5 microns. In some embodiments described herein, the radius $r_{OC}$ of the glass portion of the optical fiber 10 is greater than or equal to 40 microns and less than or equal to 62.5 microns.

The radius $r_C$ of the core portion 102 of the optical fiber 10 is defined as the minimum radius at which the line tangent to the relative refractive index profile (i.e., FIG. 2) of the core portion 102 crosses the zero delta line ($\Delta_0$). In the embodiments of the optical fiber depicted in FIGS. 1 and 2, the radius $r_C$ of the core portion 102 is greater than or equal to 22 microns and less than or equal to 28 microns. In some of these embodiments, the radius $r_C$ of the core portion 102 is greater than or equal to 23 microns and less than or equal to 28 microns, for example greater than or equal to 23.5 microns and less than or equal to 27.5 microns.

In embodiments, the maximum relative refractive index $\Delta_{Cmax}$ of the core portion 102 of the optical fiber 10 is greater than or equal to 0.8% and less than or equal to 1.6%. In some of these embodiments, the maximum relative refractive index $\Delta_{Cmax}$ of the core portion 102 is greater than or equal to 0.8% and less than or equal to 1.4% or even greater than or equal to 0.8% and less than or equal to 1.2%. In some embodiments the maximum relative refractive index $\Delta_{Cmax}$ of the core portion 102 is greater than or equal to 0.9% and less than or equal to 1.1%.

To obtain maximum relative refractive index $\Delta_{Cmax}$ values greater than 0.8%, the core portion 102 of the optical fiber 10 may be up-doped with one or more up-dopants, and, in the alternative or in addition to, doped with one or more attenuation dopants, which increase the refractive index of silica glass. Suitable up-dopants include, without limitation, $GeO_2$, $Al_2O_3$, $P_2O_5$, $TiO_2$, Cl and Br or the like. For example, up-doping the silica glass of the core portion 102 with 16.4 wt. % $GeO_2$ is the equivalent of increasing the relative refractive index of the silica glass of the core portion 102 by 1.0%. In embodiments, the core portion 102 is up-doped with a maximum concentration of $GeO_2$ greater than or equal to 7 wt. % and less than or equal to 20 wt. %. The concentration of $GeO_2$ in the core portion 102 may be graded such that the concentration of $GeO_2$ is lowest at the radius $r_C$ and increases from the radius $r_C$ along a direction towards the centerline $C_L$ of the core portion 102. Suitable attenuation dopants include, without limitation, oxides of transition metals including, titanium, vanadium, chromium, manganese, iron, cobalt, nickel, copper, molybdenum, tungsten or tantalum, or the like. These attenuation dopants can be in one or more oxidation states, for example Ti (+4 and/or +3), V (+5 and/or +4 and/or +3 and/or +2), Cr (+6 and/or +3 and/or +2), Mn (+7 and/or +6 and/or +4 and/or +3 and/or +2), Fe (+3 and/or +2), Co (+3 and/or +2), Ni (+3 and/or +2), Cu (+2 and/or +1), or the like. For example, doping the core portion 102 with 6.0 wt. % $TiO_2$ is the equivalent of increasing the relative refractive index of the core portion 102 by 1.0%. In embodiments, the core portion 102 is doped with a maximum $TiO_2$ concentration greater than or equal to 0.5 wt. % and less than or equal to 15 wt. %. In the embodiment depicted in FIGS. 1 and 2, the core portion 102 is doped with an attenuation dopant such that the concentration of the attenuation dopant in the core portion 102 is generally constant from the centerline $C_L$ of the core portion 102 to the radius $r_C$ of the core portion 102.

It is understood that an optical attenuator comprising the optical fiber 10 will propagate an optical signal primarily through the core portion 102 of the optical fiber 10. Accordingly, it is the core portion 102 of the optical fiber 10 that is doped with the attenuation dopant thereby attenuating the optical signal and providing a balanced optical signal output from the optical attenuator.

In embodiments, the core portion 102 of the optical fiber 10 has a numerical aperture NA greater than or equal to 0.15 and less than or equal to 0.25. In another embodiment, the core portion 102 of the optical fiber 10 has a numerical aperture NA greater than or equal to 0.16 and less than or equal to 0.24. In another embodiment, the core portion 102 of the optical fiber 10 has a numerical aperture NA greater than or equal to 0.18 and less than or equal to 0.22. In another embodiment, the core portion 102 of the optical fiber 10 has a numerical aperture NA greater than or equal to 0.185 and less than or equal to 0.215.

In the embodiment of the optical fiber 10 depicted in FIGS. 1 and 2, the core portion 102 of the optical fiber 10 has a graded relative refractive index profile ($\Delta_C$) with a core alpha ($\alpha$) that is greater than or equal to 1 and less than or equal to 3. In some embodiments, $\alpha$ of the core portion 102 is greater than or equal to 1.5 and less than or equal to 2.5. In some of these embodiments, $\alpha$ of the core portion 102 is greater than or equal to 1.9 and less than or equal to 2.3. The graded relative refractive index profile $\Delta_C$ of the core portion 102 may be cumulative of a relative refractive index profile of the up-dopant ($\Delta_{C1}$) and a relative refractive index profile of the attenuation dopant ($\Delta_{C2}$). That is, the concentration of the up-dopant in the core portion 102 provides the relative refractive index profile $\Delta_{C1}$ depicted in FIG. 2, the concentration of the attenuation dopant in the core portion 102 provides the relative refractive index profile $\Delta_{C2}$ depicted in FIG. 2, and the relative refractive index profile $\Delta_C$ for the core portion 102 is cumulative of $\Delta_{C1}$ and $\Delta_{C2}$. For example, in embodiments, $\Delta_C = \Delta_{C1} + \Delta_{C2}$.

Still referring to FIGS. 1 and 2, the cladding portion 103 of the optical fiber 10 is directly adjacent to and in direct contact with the core portion 102. The inner radius of the cladding portion 103 is equal to the radius $r_C$ of the core portion.

In the embodiment of the optical fiber 10 depicted in FIGS. 1 and 2, the relative refractive index $\Delta_{OC}$ of the cladding portion 103 is greater than or equal to 0% and less than or equal to 0.8% relative to pure silica. In embodiments, the relative refractive index $\Delta_{OC}$ of the cladding portion 103 is greater than 0.1% and less than or equal to 0.8%. In some of these embodiments, the relative refractive index $\Delta_{OC}$ of the cladding portion 103 is greater than or equal to 0.2% and less than or equal to 0.7%, for example greater than or equal to 0.2% and less than or equal to 0.4%, or greater than or equal to 0.5% and less than or equal to 0.7%.

In embodiments, the difference between the maximum relative refractive index $\Delta_{Cmax}$ of the core portion 102 and the relative refractive index $\Delta_{OC}$ of the cladding portion 103 (i.e., $\Delta_{Cmax} - \Delta_{OC}$) is greater than or equal to 0.6% and less than or equal to 1.5%. In some of these embodiments, $\Delta_{Cmax} - \Delta_{OC}$ is greater than or equal to 0.8% and less than or equal to 1.4% or even greater than or equal to 0.9% and less than or equal to 1.2%.

Still referring to FIGS. 1 and 2, the cladding portion 103 has a relative refractive index $\Delta_{OC}$ which is greater than the relative refractive index $\Delta_0$ of pure silica glass, thereby forming a region which is "up-doped" relative to $\Delta_0$. To achieve this index differential, the cladding portion 103 is formed from silica glass which includes an amount of attenuation dopant sufficient to increase the refractive index of the silica glass of the cladding portion 103. In embodiments, the concentration of the attenuation dopant is constant along the radial thickness of the cladding portion 103. In other embodiments, the concentration of the attenuation dopant is slightly decreasing along the radial thickness of the cladding portion 103. As used herein, the term "slightly decreasing" refers to a reduction in $\Delta_{OC}$ of less than or equal to 0.1% over a radial distance along the cladding portion 103 corresponding to radii greater than or equal to 35 microns and less than or equal to 55 microns. In some embodiments described herein, the attenuation dopant in the cladding portion 103 may be the same as the attenuation dopant present in the core portion 102 of the optical fiber 10. For example, in some embodiments, the attenuation dopant in the core portion 102 and the cladding portion 103 is $TiO_2$.

In embodiments where the attenuation dopant in the cladding portion 103 comprises $TiO_2$, the $TiO_2$ concentration in the cladding portion 103 is greater than or equal to 0.2 wt. %. In some embodiments, the $TiO_2$ concentration in the cladding portion 103 is greater than or equal to 0.5 wt. %, for example greater than or equal to 1.0 wt. % or even greater than or equal to 2.0 wt. %. In still other embodiments, the $TiO_2$ concentration in the cladding portion 103 is greater than or equal to 3.0 wt. % or even greater than or equal to 4.0 wt. %.

In the embodiments described herein, the concentration of the attenuation dopant in the cladding portion 103 is sufficient to increase the relative refractive index of the silica glass of the cladding portion 103 such that the relative refractive index $\Delta_{OC}$ of the cladding portion 103 is greater than or equal to 0.1% and less than or equal to 1.0%. For example, in some embodiments, the relative refractive index $\Delta_{OC}$ of the cladding portion 103 is greater than or equal to 0.15% or even greater than or equal to 0.2% and less than or equal to 0.8%. In some of these embodiments, the relative refractive index $\Delta_{OC}$ of the cladding portion 103 is greater than or equal to 0.2% and less than or equal to 0.6%. In some other embodiments, the relative refractive index $\Delta_{OC}$ of the cladding portion 103 is greater than or equal to 0.3% and less than or equal to 0.7%. For example, in some embodiments, the relative refractive index $\Delta_{OC}$ of the cladding portion 103 is greater than or equal to 0.2% and less than or equal to 0.5%. In some other embodiments, the relative refractive index $\Delta_{OC}$ of the cladding portion 103 is greater than or equal to 0.3% and less than or equal to 0.5%.

In embodiments, the optical fiber 10 is multi-moded at a wavelength of 850 nm. In embodiments, the optical fiber 10 has an attenuation at 850 nm that is greater than or equal to 0.5 dB/m. In some of these embodiments, the optical fiber 10 has attenuation at 850 nm greater than or equal to 1.0 dB/m. For example, in some embodiments, the attenuation at 850 nm is greater than or equal to 5 dB/m or even greater or equal to 7 dB/m. In some of these embodiments, the attenuation at 850 nm is greater than or equal to 12 dB/m or even greater than or equal to 18 dB/m.

In embodiments, the optical fiber 10 is multi-moded for wavelengths between 800 nm to 1350 nm, for example, the optical fiber 10 may be multi-moded for wavelengths less between 800 and 1000 nm or between 800 and 900 nm. In some embodiments, the optical fiber 10 is multi-moded for wavelengths between 1250 nm and 1350 nm. The optical fiber 10 may have an attenuation for at least one wavelength between 800 nm and 1000 nm that is greater than or equal to 0.5 dB/m. In embodiments, the optical fiber 10 has an attenuation for wavelengths between 800 nm and 1000 nm greater than or equal to 0.5 dB/m, for example greater than or equal to 1.0 dB/m. In some embodiments, the attenuation is greater than or equal to 5 dB/m or even greater or equal to 7 dB/m. In some of these embodiments, the attenuation is greater than or equal to 12 dB/m or even greater than or equal to 18 dB/m.

Still referring to FIGS. 1 and 2, in some embodiments, the 30 mm diameter bend loss of the optical fiber 10 (i.e., when the optical fiber is wound around a 30 mm diameter mandrel for two turns) at 850 nm is less than 0.5 dB, for example less than or equal to 0.4 dB, less than or equal to 0.3 dB, or even less than or equal to 0.2 dB. In some embodiments, the 20 mm bend loss of the optical fiber 10 (i.e., when the optical fiber is wound around a 20 mm diameter mandrel for two turns) at 850 nm is less than or equal to 0.5 dB and the 20 mm bend loss at 1300 nm is less than or equal to 1.0 dB. In some embodiments, the 15 mm diameter bend loss of the optical fiber 10 (i.e., when the optical fiber is wound around a 15 mm diameter mandrel for two turns) at 850 nm is less than 1.0 dB, for example less than or equal to 0.8 dB, less than or equal to 0.6 dB, or even less than or equal to 0.4 dB. For example, in some embodiments the 15 mm diameter bend loss of the optical fiber 10 at 850 nm is less than or equal to 0.3 dB and the 15 mm diameter bend loss at 1300 nm is less than or equal to 0.8 dB.

While FIGS. 1 and 2 depict an optical fiber 10 with only a cladding portion 103 positioned around the core portion 102, it should be understood that the cladding portion may comprise a low-index trench and an outer cladding with the low-index trench disposed between the core portion 102 and the cladding portion 103, as will be described in further detail with respect to FIGS. 3 and 4.

Figure 3:
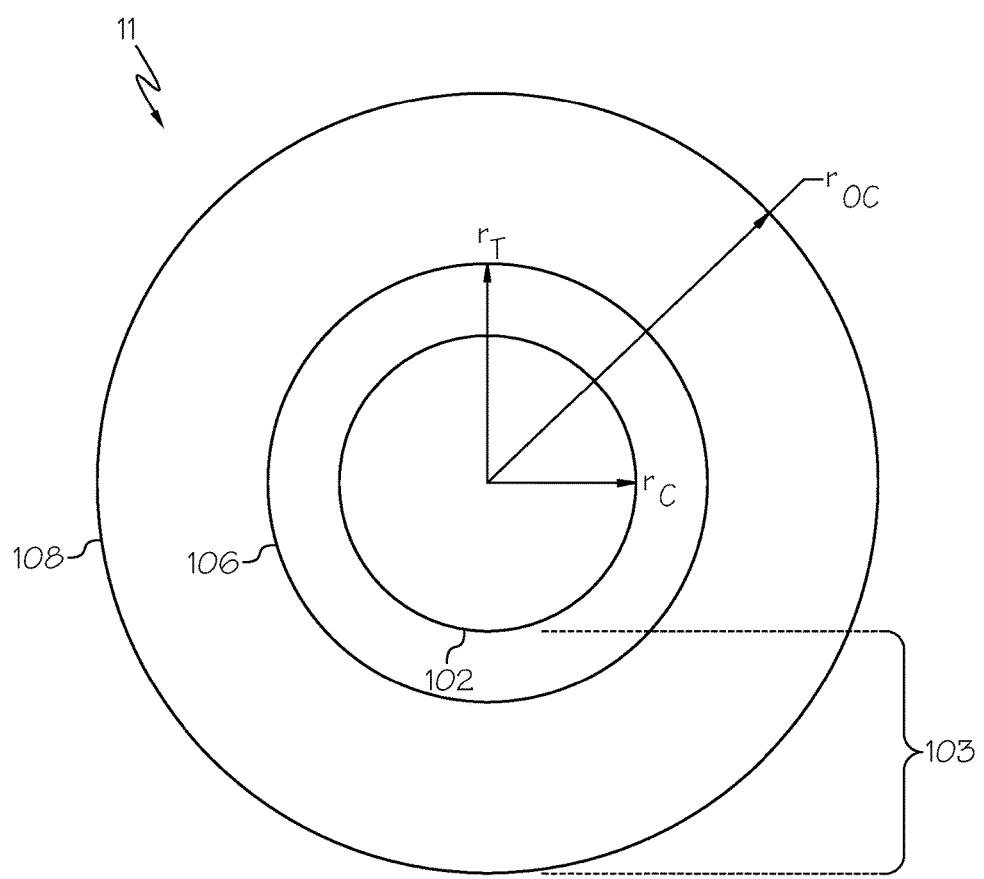
FIG. 3 schematically depicts a radial cross section of an optical fiber according to one or more embodiments shown and described herein.
Figure 4:
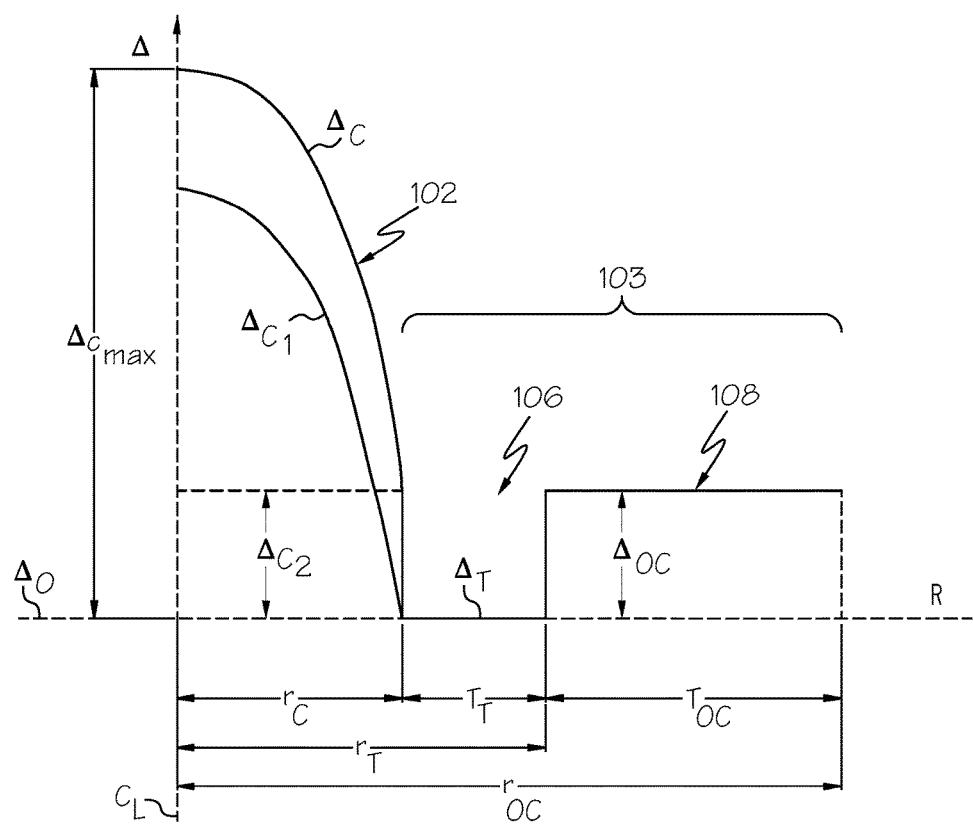
FIG. 4 graphically depicts a relative refractive index profile of the optical fiber of FIG. 3 as a function of the radius R of the glass portion of the optical fiber according to one or more embodiments shown and described herein.

Referring to FIGS. 3 and 4, a radial cross section (FIG. 3) and relative refractive index profile (FIG. 4) of an embodiment of an optical fiber 11 for use with an attenuator are schematically depicted. The optical fiber 11 generally comprises a core portion 102 and a cladding portion 103 as described herein with respect to FIGS. 1 and 2. However, in this embodiment of the optical fiber 11, the cladding portion 103 further comprises a low-index trench 106 and an outer cladding 108. In these embodiments of the optical fiber 11, the core portion 102 is surrounded by the cladding portion 103 and has a maximum relative refractive index $\Delta_{Cmax}$ (relative to pure silica glass). The core portion 102 and the cladding portion 103 are concentric such that the cross section of the optical fiber 11 is generally circular symmetric with respect to the center of the core portion 102. The low-index trench 106 surrounds and is in direct contact with the core portion 102 and has a relative refractive index $\Delta_T$ (relative to pure silica glass). The outer cladding 108 surrounds and is in direct contact with the low-index trench 106 and has a relative refractive index $\Delta_{OC}$ (relative to pure silica glass). That is, the low-index trench 106 and the outer cladding 108 are arranged such that the low-index trench 106 is disposed between the core portion 102 and the outer cladding 108. The term "low-index trench," as used herein, refers to a region of the optical fiber that is, in radial cross section, surrounded by regions having relatively higher refractive indexes. That is, in the embodiment of the optical fiber 11 depicted in FIGS. 3 and 4, $\Delta_{Cmax} > \Delta_{OC} > \Delta_T$.

Still referring to FIGS. 3 and 4, the core portion 102 has a radius $r_C$. The low-index trench 106 surrounds the core portion 102 and extends from the radius $r_C$ to a radius $r_T$ such that the low-index trench has a radial thickness $T_T = r_T - r_C$. The outer cladding 108 surrounds the low-index trench 106 and extends from the radius $r_T$ to a radius $r_{OC}$ such that the outer cladding 108 has a radial thickness of $T_{OC} = r_{OC} - r_T$. Accordingly, the glass portion of the optical fiber 11 (e.g., the core portion 102, the low-index trench 106, and the outer cladding 108) may have a diameter of $2r_{OC}$. In some embodiments described herein, the radius $r_{OC}$ of the glass portion of the optical fiber 11 is less than 65 microns. In some embodiments described herein, the radius $r_{OC}$ of the glass portion of the optical fiber 11 is 62.5 microns. In some embodiments described herein, the radius $r_{OC}$ of the glass portion of the optical fiber 11 is greater than or equal to 40 microns and less than or equal to 62.5 microns.

The radius $r_C$ of the core portion 102 of the optical fiber 11 depicted in FIGS. 3 and 4 is defined as the minimum radius at which the line tangent to the relative refractive index profile (i.e., $\Delta_C$ in FIG. 4) of the core portion 102 crosses the zero delta line ($\Delta_0$). In the embodiments of the optical fiber 11 depicted in FIGS. 3 and 4, the radius $r_C$ of the core portion 102 is greater than or equal to 22 microns and less than or equal to 28 microns. In some of these embodiments, the radius $r_C$ of the core portion 102 is greater than or equal to 23 microns and less than or equal to 28 microns, for example greater than or equal to 23.5 microns and less than or equal to 27.5 microns.

In embodiments, the maximum relative refractive index $\Delta_{Cmax}$ of the core portion 102 of the optical fiber 11 is greater than or equal to 0.8% and less than or equal to 1.6%. In some of these embodiments, the maximum relative refractive index $\Delta_{Cmax}$ of the core portion 102 is greater than or equal to 0.8% and less than or equal to 1.4% or even greater than or equal to 0.8% and less than or equal to 1.2%. In some embodiments the maximum relative refractive index $\Delta_{Cmax}$ of the core portion 102 is greater than or equal to 0.9% and less than or equal to 1.1%.

To obtain maximum relative refractive index $\Delta_{Cmax}$ values greater than 0.8% in the core portion 102, the core portion 102 of the optical fiber 11 may be up-doped with one or more up-dopants, and, in the alternative or in addition to, doped with one or more attenuation dopants, which increase the refractive index of silica glass. Suitable up-dopants include, without limitation, $GeO_2$, $Al_2O_3$, $P_2O_5$, $TiO_2$, Cl and Br, or the like. For example, up-doping the core portion 102 with 16.4 wt. % $GeO_2$ is the equivalent of increasing the relative refractive index of the core portion 102 by 1.0%. In embodiments, the core portion 102 is up-doped with a maximum $GeO_2$ concentration greater than or equal to 7 wt. % and less than or equal to 20 wt. % $GeO_2$. The concentration of $GeO_2$ in the core portion 102 may be graded such that the concentration of $GeO_2$ is lowest at the radius $r_C$ and increases from the radius $r_C$ along a direction towards the centerline $C_L$ of the core portion 102. Suitable attenuation dopants include, without limitation, oxides of transition metals including, titanium, vanadium, chromium, manganese, iron, cobalt, nickel, copper, molybdenum, tungsten or tantalum, or the like. These attenuation dopants can be in one or more oxidation states, for example Ti (+4 and/or +3), V (+5 and/or +4 and/or +3 and/or +2), Cr (+6 and/or +3 and/or +2), Mn (+7 and/or +6 and/or +4 and/or +3 and/or +2), Fe (+3 and/or +2), Co (+3 and/or +2), Ni (+3 and/or +2), Cu (+2 and/or +1), or the like. For example, doping the core portion 102 with 6.0 wt. % $TiO_2$ is the equivalent of increasing the relative refractive index of the core portion 102 by 1.0%. In embodiments, the core portion 102 is doped with a maximum $TiO_2$ concentration greater than or equal to 0.5 wt. % and less than or equal to 15 wt. %. In embodiments, the core portion 102 is doped with an attenuation dopant such that the concentration of the attenuation dopant in the core portion 102 is generally constant from the centerline $C_L$ of the core portion 102 to the radius $r_C$ of the core portion 102.

It is understood that an optical attenuator comprising the optical fiber 11 will propagate an optical signal primarily through the core portion 102 of the optical fiber 11. Accordingly, it is the core portion 102 of the optical fiber 11 that is doped with the attenuation dopant thereby attenuating the optical signal and providing a balanced optical signal output from the optical attenuator.

In embodiments, the core portion 102 of the optical fiber 11 depicted in FIGS. 3 and 4 has a numerical aperture NA greater than or equal to 0.15 and less than or equal to 0.25. In another embodiment, the core portion 102 of the optical fiber 11 has a numerical aperture NA greater than or equal to 0.16 and less than or equal to 0.24. In another embodiment, the core portion 102 of the optical fiber 11 has a numerical aperture NA greater than or equal to 0.18 and less than or equal to 0.22. In another embodiment, the core portion 102 of the optical fiber 11 has a numerical aperture NA greater than or equal to 0.185 and less than or equal to 0.215.

In the embodiment of the optical fiber 11 depicted in FIGS. 3 and 4, the core portion 102 of the optical fiber 11 has a graded relative refractive index profile $\Delta_C$ extending from $\Delta_{Cmax}$ at the centerline $C_L$ of the core portion 102 to $\Delta_{C2}$ at the radius $r_C$ of the core portion 102. Also, $\Delta_{C2}$ is greater than $\Delta_0$ and constant from the centerline $C_L$ to $r_C$. The graded relative refractive index profile $\Delta_C$ has a core alpha ($\alpha$) that is greater than or equal to 1 and less than or equal to 3. In some embodiments, $\alpha$ of the core portion 102 is greater than or equal to 1.5 and less than or equal to 2.5. In some of these embodiments, $\alpha$ of the core portion 102 is greater than or equal to 1.9 and less than or equal to 2.3. The graded relative refractive index profile $\Delta_C$ of the core portion 102 may be cumulative of the relative refractive index profile of the up-dopant ($\Delta_{C1}$) and the relative refractive index profile of the attenuation dopant ($\Delta_{C2}$). That is, the concentration of the up-dopant in the core portion 102 provides the relative refractive index profile $\Delta_{C1}$ depicted in FIG. 4, the concentration of the attenuation dopant in the core portion 102 provides the relative refractive index profile $\Delta_{C2}$ depicted in FIG. 4, and the relative refractive index profile $\Delta_C$ for the core portion 102 is cumulative of $\Delta_{C1}$ and $\Delta_{C2}$. For example, in embodiments, $\Delta_C = \Delta_{C1} + \Delta_{C2}$.

Still referring to FIGS. 3 and 4, the low-index trench 106 is directly adjacent to and in direct contact with the core portion 102. The inner radius of the low-index trench is equal to the radius $r_C$ of the core portion 102 and the outer radius of the low-index trench 106 (i.e., the radius $r_T$ of the low-index trench 106) is defined as the radially outer-most point at which the line tangent to the relative refractive index profile of the low-index trench at the radius where $\Delta=0.5$ ($\Delta_{OC} - \Delta_T$) (i.e., FIG. 4) crosses the zero delta line ($\Delta_0$).

In the embodiments depicted in FIG. 3, the radius $r_T$ of the low-index trench 106 is greater than or equal to 25 microns which improves the bend performance of the optical fiber 11. In embodiments, the radius $r_T$ is greater than or equal to 26 microns and less than or equal to 40 microns, such as greater than or equal to 26 microns and less than or equal to 35 microns.

In embodiments, the radial thickness $T_T$ of the low-index trench 106 is greater than or equal to 1 micron and less than or equal to 15 microns. In some embodiments, the radial thickness $T_T$ of the low-index trench 106 is greater than or equal to 2 microns and less than or equal to 10 microns. In some embodiments, the radial thickness $T_T$ of the low-index trench 106 is greater than or equal to 2 microns and less than or equal to 8 microns or even greater than or equal to 2 microns and less than or equal to 7 microns.

Figure 5:
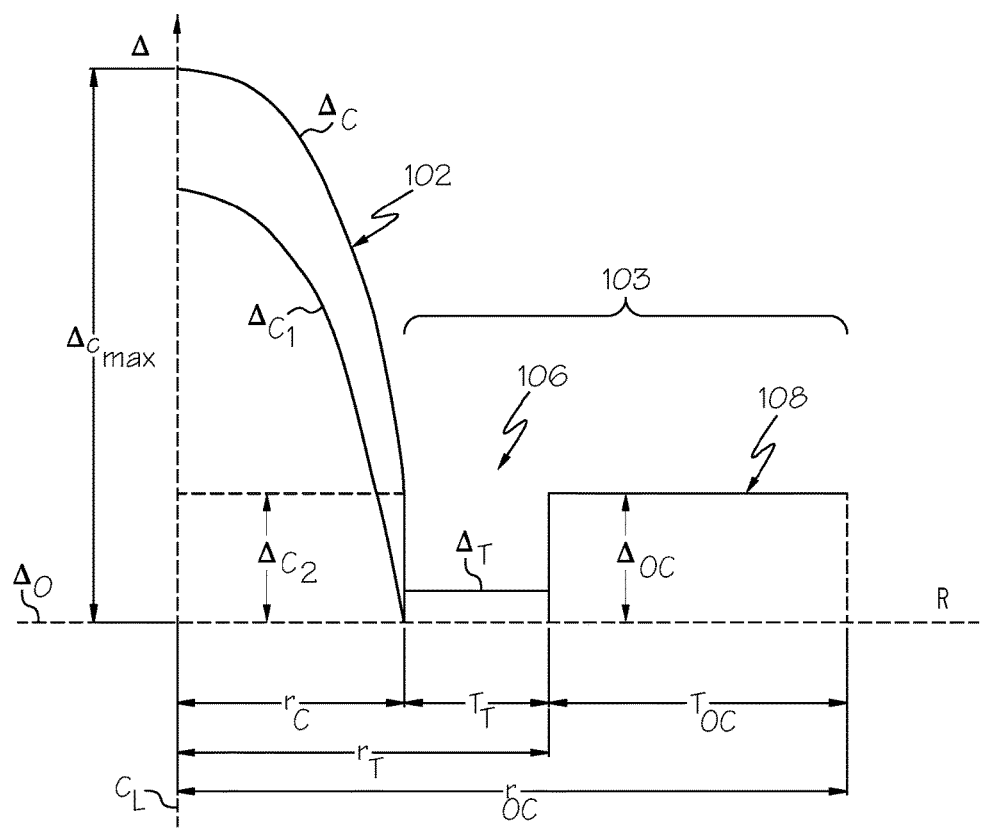
FIG. 5 graphically depicts a relative refractive index profile of the optical fiber of FIG. 3 as a function of the radius R of the glass portion of the optical fiber according to one or more embodiments shown and described herein.

As noted herein, the relative refractive index $\Delta_T$ of the low-index trench 106 is less than the maximum relative refractive index $\Delta_{Cmax}$ of the core portion 102 and less than the relative refractive index $\Delta_{OC}$ of the outer cladding 108. In the embodiments described herein, the relative refractive index $\Delta_T$ of the low-index trench 106 is generally less than or equal to 0.6% and greater than or equal to $-0.6\%$ relative to pure silica glass. In some embodiments, the relative refractive index $\Delta_T$ of the low-index trench 106 is less than or equal to 0.3% and greater than or equal to $-0.3\%$, less than or equal to 0.1% and greater than or equal to $-0.1\%$, or even less than or equal to 0.05% and greater than or equal to $-0.05\%$. For example, in some embodiments, the low-index trench 106 is formed from pure silica glass and the relative refractive index $\Delta_T$ of the low-index trench 106 is 0% as depicted in FIG. 4. In other embodiments, the low-index trench 106 is formed from silica glass doped with an attenuation dopant, e.g., $TiO_2$, such that the relative refractive index $\Delta_T$ is greater than or equal to 0.01% and less than or equal to 1.0% relative to pure silica glass as depicted in FIG. 5. For example, the low-index trench 106 may be formed from silica glass doped with an attenuation dopant such that the relative refractive index $\Delta_T$ is greater than or equal to 0.05% and less than or equal to 0.5% relative to pure silica glass. In the alternative, or in addition to, the low-index trench 106 may be doped with a down-dopant, for example and without limitation fluorine. In some embodiments, the relative refractive index $\Delta_T$ of the low-index trench 106 is essentially flat. That is, the difference between the relative refractive index $\Delta_T$ at any two radii within the low-index trench 106 is less than 0.1%, or even less than 0.05%. In other embodiments the low-index trench 106 may have small fluctuations in the relative refractive index $\Delta_T$ as a result of small profile design or process variations.

The radial thickness of a particular glass portion of an optical fiber may be interrelated with a relative refractive index of the particular glass portion. Specifically, a glass portion 'i' with a relative refractive index $\Delta_i\%$ (relative to the outer cladding), an inner radius $R_{in}$ and an outer radius $R_{out}$ may have a trench volume $V_i$ defined as:

$$V_i = 2\int_{R_{in}}^{R_{out}} \Delta_i\%(R)dR$$

which for a rectangular trench may be rewritten as:

$$V_i = (\Delta_{OC}\% - \Delta_i\%)(R_{out}^2 - R_{in}^2).$$

Accordingly, the low-index trench 106 may have a trench volume $V_T$ of:

$$V_T = (\Delta_{OC}\% - \Delta_T\%)(r_T^2 - r_C^2)$$

In order to achieve good bend performance, the volume $|V_T|$ of the low-index trench 106 is preferably greater than 20% $\Delta$-micron$^2$. In embodiments, the volume $=V_T|$ of the low-index trench 106 may be greater than or equal to 30% $\Delta$-micron$^2$ or even greater than or equal to 40% $\Delta$-micron$^2$. In some of these embodiments, the volume $|V_T|$ of the low-index trench 106 may be greater than or equal to 50% $\Delta$-micron$^2$ or even greater than or equal to 60% $\Delta$-micron$^2$. In some embodiments the volume $|V_T|$ of the low-index trench is greater than or equal to 30% $\Delta$-micron$^2$ and less than or equal to 120% $\Delta$-micron$^2$. In some of these embodiments, the volume $|V_T|$ of the low-index trench is greater than or equal to 40% $\Delta$-micron$^2$ and less than or equal to 100% $\Delta$-micron$^2$.

Still referring to FIGS. 3 and 4, the outer cladding 108 is directly adjacent to and in direct contact with the low-index trench 106. That is, the inner radius of the outer cladding 108 is equal to the radius $r_T$ of the low-index trench 106 and the outer radius of the outer cladding 108 (i.e., radius $r_{OC}$ of the outer cladding 108) is defined as the outer radius of the glass portion of the optical fiber. In the embodiment depicted in FIG. 3, the radius $r_{OC}$ of the outer cladding 108 is less than 65 microns. In some embodiments described herein, the radius $r_{OC}$ of the outer cladding 108 of the optical fiber 11 is 62.5 microns. In some embodiments described herein, the radius $r_{OC}$ of the outer cladding 108 of the optical fiber 11 is greater than or equal to 40 microns and less than or equal to 62.5 microns.

The outer cladding 108 of the optical fiber 11 depicted in FIGS. 3 and 4 has a relative refractive index $\Delta_{OC}$ which is greater than the relative refractive index $\Delta_T$ of the low-index trench 106, thereby forming a region which is "up-doped" relative to the low-index trench 106. The outer cladding 108 may be up-doped with the attenuation dopant, e.g., $TiO_2$, as described herein with respect to the cladding portion 103 of the optical fiber 10 depicted in FIGS. 1 and 2.

In the embodiments where the attenuation dopant in the outer cladding 108 is $TiO_2$, the $TiO_2$ concentration in the outer cladding 108 is greater than or equal to 0.2 wt. %. In some embodiments, the $TiO_2$ concentration in the outer cladding 108 is greater than or equal to 0.5 wt. %, for example greater than or equal to 1.0 wt. % or even greater than or equal to 1.5 wt. %. In some of these embodiments, the concentration of $TiO_2$ in the outer cladding 108 is greater than or equal to 2.0 wt. % or even greater than or equal to 2.5 wt. %. In still other embodiments, the $TiO_2$ concentration in the outer cladding 108 is greater than or equal to 3.0 wt. % or even greater than or equal to 3.5 wt. %.

In the embodiments described herein, the concentration of the attenuation dopant in the outer cladding 108 is sufficient to increase the relative refractive index of the silica glass of the outer cladding 108 such that the relative refractive index $\Delta_{OC}$ of the outer cladding 108 is greater than or equal to 0.1% and less than or equal to 1.0%. For example, in some embodiments, the relative refractive index $\Delta_{OC}$ of the outer cladding 108 is greater than or equal to 0.15% or even greater than or equal to 0.2% and less than or equal to 0.8%. In some of these embodiments, the relative refractive index $\Delta_{OC}$ of the outer cladding 108 is greater than or equal to 0.2% and less than or equal to 0.6%. In some other embodiments, the relative refractive index $\Delta_{OC}$ of the outer cladding 108 is greater than or equal to 0.3% and less than or equal to 0.7%. For example, in some embodiments, the relative refractive index $\Delta_{OC}$ of the outer cladding 108 is greater than or equal to 0.2% and less than or equal to 0.5%. In some other embodiments, the relative refractive index $\Delta_{OC}$ of the outer cladding 108 is greater than or equal to 0.3% and less than or equal to 0.5%.

In embodiments, the optical fiber 11 is multi-moded at a wavelength of 850 nm. In embodiments, the optical fiber 10 has an attenuation at 850 nm that is greater than or equal to 0.5 dB/m. In some of these embodiments, the optical fiber 11 has attenuation at 850 nm greater than or equal to 1.0 dB/m. For example, in some embodiments, the attenuation at 850 nm is greater than or equal to 5 dB/m or even greater or equal to 7 dB/m. In some of these embodiments, the attenuation at 850 nm is greater than or equal to 12 dB/m or even greater than or equal to 18 dB/m.

In embodiments, the optical fiber 11 is multi-moded for wavelengths between 800 nm to 1350 nm, for example, the optical fiber 11 may be multi-moded for wavelengths less between 800 and 1000 nm or between 800 and 900 nm. In some embodiments, the optical fiber 11 is multi-moded for wavelengths between 1250 nm and 1350 nm. The optical fiber 11 may have an attenuation for at least one wavelength between 800 nm and 1000 nm that is greater than or equal to 0.5 dB/m. In embodiments, the optical fiber 11 has an attenuation for wavelengths between 800 nm and 1000 nm greater than or equal to 0.5 dB/m, for example greater than or equal to 1.0 dB/m. In some embodiments, the attenuation is greater than or equal to 5 dB/m or even greater or equal to 7 dB/m. In some of these embodiments, the attenuation is greater than or equal to 12 dB/m or even greater than or equal to 18 dB/m.

Still referring to FIGS. 3 and 4, in some embodiments, the 30 mm diameter bend loss of the optical fiber 11 (i.e., when the optical fiber is wound around a 30 mm diameter mandrel for two turns) at 850 nm is less than 0.5 dB, for example less than or equal to 0.4 dB, less than or equal to 0.3 dB, or even less than or equal to 0.2 dB. In some embodiments, the 20 mm bend loss of the optical fiber 10 (i.e., when the optical fiber is wound around a 20 mm diameter mandrel for two turns) at 850 nm is less than or equal to 0.5 dB and the 20 mm bend loss at 1300 nm is less than or equal to 1.0 dB. In some embodiments, the 15 mm diameter bend loss of the optical fiber 11 (i.e., when the optical fiber is wound around a 15 mm diameter mandrel for two turns) at 850 nm is less than 1.0 dB, for example less than or equal to 0.8 dB, less than or equal to 0.6 dB, or even less than or equal to 0.4 dB. For example, in some embodiments the 15 mm diameter bend loss of the optical fiber 11 at 850 nm is less than or equal to 0.3 dB and the 15 mm diameter bend loss at 1300 nm is less than or equal to 0.8 dB. In some embodiments, the 5×10 mm diameter bend loss of the optical fiber 10 (i.e., when the optical fiber is wound around a 10 mm diameter mandrel for five turns) at 850 nm is less than 2.0 dB, for example less than or equal to 1.8 dB, and in some embodiments less than or equal to 1.6 dB, or even less than or equal to 1.4 dB. In some embodiments, the 2×10 mm bend loss of the optical fiber 11 (i.e., when the optical fiber is wound around a 10 mm diameter mandrel for two turns) at 850 nm is less than or equal to 0.8 dB and the 10 mm two turn bend loss at 1300 nm is less than or equal to 1.5 dB.

Figure 6:
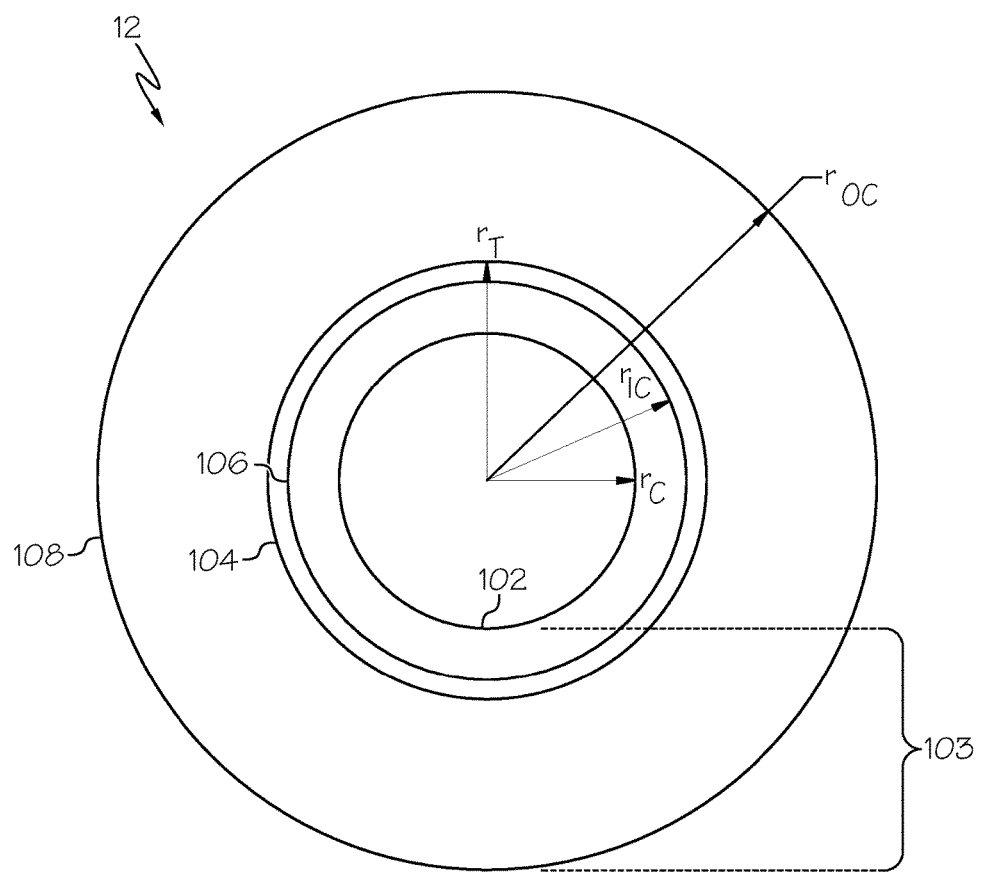
FIG. 6 schematically depicts a radial cross section of an optical fiber according to one or more embodiments shown and described herein.
Figure 7:
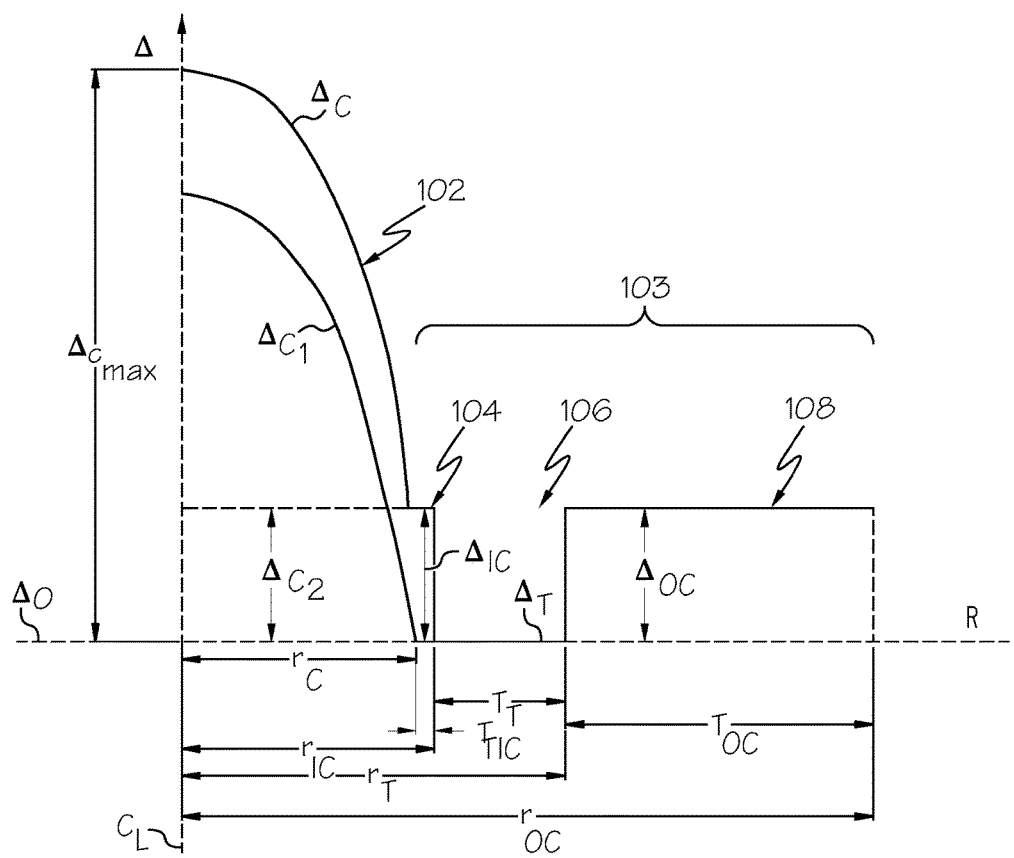
FIG. 7 graphically depicts a relative refractive index profile of the optical fiber of FIG. 6 as a function of the radius R of the glass portion of the optical fiber according to one or more embodiments shown and described herein.

While FIGS. 3 and 4 depict an optical fiber 11 with a cladding portion 103 comprising a low-index trench and an outer cladding positioned around a core portion, it should be understood that the cladding portion may further comprise an inner cladding disposed between the low-index trench and the core portion. For example, FIG. 6 schematically depicts an axial cross section of an optical fiber 12 that includes an inner cladding disposed between a core portion and a low-index trench. FIG. 7 graphically depicts a relative refractive index profile of the optical fiber 12 of FIG. 6 as function of the radius R of the optical fiber from the axial centerline $C_L$.

Referring to FIGS. 6 and 7, the optical fiber 12 generally comprises a core portion 102 and a cladding portion 103, as described hereinabove. In this embodiment, the cladding portion 103 comprises an inner cladding 104, a low-index trench 106 and an outer cladding 108. The core portion 102 is positioned within the cladding portion 103 and has a maximum relative refractive index $\Delta_{Cmax}$ (relative to pure (i.e., un-doped) silica glass). The core portion 102 and the cladding portion 103 are concentric such that the cross section of the optical fiber 12 is generally circular symmetric with respect to the center of the core portion 102. The inner cladding 104 surrounds and is in direct contact with the core portion 102 and has a relative refractive index $\Delta_{IC}$ (relative to pure silica glass). The low-index trench 106 surrounds and is in direct contact with the inner cladding 104 and has a relative refractive index $\Delta_T$ (relative to pure silica glass). The outer cladding 108 surrounds and is in direct contact with the low-index trench 106 and has a relative refractive index $\Delta_{OC}$ (relative to pure silica glass). That is, the inner cladding 104, low-index trench 106 and outer cladding 108 are arranged such that the inner cladding 104 is disposed between the core portion 102 and the low-index trench 106, and the low-index trench 106 is disposed between the inner cladding 104 and the outer cladding 108. In the embodiment of the optical fiber 12 depicted in FIGS. 6 and 7, $\Delta_{Cmax} > \Delta_{IC}$; $\Delta_{Cmax} > \Delta_{OC}$; $\Delta_{IC} > \Delta_T$; $\Delta_{Cmax} > \Delta_{IC} > \Delta_T$; $\Delta_{Cmax} > \Delta_{OC} > \Delta_T$.

Still referring to FIGS. 6 and 7, the core portion 102 has a radius $r_C$. The inner cladding 104 surrounds the core portion 102 and extends from the radius $r_C$ to a radius $r_{IC}$ such that the inner cladding 104 has a radial thickness $T_{IC} = r_{IC} - r_C$. The low-index trench 106 surrounds the inner cladding 104 and extends from the radius $r_{IC}$ to a radius $r_T$ such that the low-index trench has a radial thickness $T_T = r_T - r_{IC}$. The outer cladding 108 may surround the low-index trench 106 and extend from the radius $r_T$ to a radius $r_{OC}$ such that the outer cladding 108 has a radial thickness of $T_{OC}=r_{OC}-r_T$. Accordingly, the glass portion of the optical fiber 12 (e.g., the core portion 102, inner cladding 104, low-index trench 106, and outer cladding 108) may have a diameter of $2r_{OC}$. In some embodiments described herein, the radius $r_{OC}$ of the glass portion of the optical fiber 12 is less than 65 microns. In some embodiments described herein, the radius $r_{OC}$ of the glass portion of the optical fiber 12 is 62.5 microns. In some embodiments described herein, the radius $r_{OC}$ of the glass portion of the optical fiber 12 is greater than or equal to 40 microns and less than or equal to 62.5 microns.

The radius $r_C$ of the core portion 102 of the optical fiber 12 depicted in FIGS. 6 and 7 is defined as the minimum radius at which the line tangent to the relative refractive index profile (i.e., $\Delta_C$ in FIG. 7) of the core portion 102 crosses the $\Delta_{IC}$ line depicted in FIG. 7. In the embodiments of the optical fiber 12 depicted in FIGS. 6 and 7, the radius $r_C$ of the core portion 102 is greater than or equal to 22 microns and less than or equal to 28 microns. In some of these embodiments, the radius $r_C$ of the core portion 102 is greater than or equal to 23 microns and less than or equal to 28 microns, for example greater than or equal to 23.5 microns and less than or equal to 27.5 microns.

In embodiments, the maximum relative refractive index $\Delta_{Cmax}$ of the core portion 102 of the optical fiber 12 is greater than or equal to 0.8% and less than or equal to 1.6%. In some of these embodiments, the maximum relative refractive index $\Delta_{Cmax}$ of the core portion 102 is greater than or equal to 0.8% and less than or equal to 1.4% or even greater than or equal to 0.8% and less than or equal to 1.2%. In some embodiments the maximum relative refractive index $\Delta_{Cmax}$ of the core portion 102 is greater than or equal to 0.9% and less than or equal to 1.1%.

To obtain maximum relative refractive index $\Delta_{Cmax}$ values greater than 0.1% in the core portion 102, the core portion 102 of the optical fiber 12 may be up-doped with one or more up-dopants, and, in the alternative or in addition to, doped with one or more attenuation dopants, which increase the refractive index of silica glass. Suitable up-dopants include, without limitation, $GeO_2$, $Al_2O_3$, $P_2O_5$, $TiO_2$, Cl and Br, or the like. For example, up-doping the core portion 102 with 16.4 wt. % $GeO_2$ is the equivalent of increasing the relative refractive index of the core portion 102 by 1.0%. In embodiments, the core portion 102 is up-doped to a maximum $GeO_2$ concentration with greater than or equal to 7 wt. % and less than or equal to 20 wt. % $GeO_2$. The concentration of $GeO_2$ in the core portion 102 may be graded such that the concentration of $GeO_2$ is lowest at the radius $r_C$ and increases from the radius $r_C$ along a direction towards the centerline $C_L$ of the core portion 102. Suitable attenuation dopants include, without limitation, oxides of transition metals including, titanium, vanadium, chromium, manganese, iron, cobalt, nickel, copper, molybdenum, tungsten or tantalum, or the like. These attenuation dopants can be in one or more oxidation states, for example Ti (+4 and/or +3), V (+5 and/or +4 and/or +3 and/or +2), Cr (+6 and/or +3 and/or +2), Mn (+7 and/or +6 and/or +4 and/or +3 and/or +2), Fe (+3 and/or +2), Co (+3 and/or +2), Ni (+3 and/or +2), Cu (+2 and/or +1), or the like. For example, doping the core portion 102 with 6.0 wt. % $TiO_2$ is the equivalent of increasing the relative refractive index of the core portion 102 by 1.0%. In embodiments, the core portion 102 is doped with a maximum $TiO_2$ concentration greater than or equal to 0.5 wt. % and less than or equal to 15 wt. %. In embodiments, the core portion 102 is doped with an attenuation dopant such that the concentration of the attenuation dopant in the core portion 102 is generally constant from the centerline $C_L$ of the core portion 102 to the radius $r_C$ of the core portion 102.

It is understood that an optical attenuator comprising the optical fiber 12 will propagate an optical signal primarily through the core portion 102 of the optical fiber 12. Accordingly, it is the core portion 102 of the optical fiber 12 that is doped with the attenuation dopant thereby attenuating the optical signal and providing a balanced optical signal output from the optical attenuator.

In embodiments, the core portion 102 of the optical fiber 12 depicted in FIGS. 6 and 7 has a numerical aperture NA greater than or equal to 0.15 and less than or equal to 0.25. In another embodiment, the core portion 102 of the optical fiber 12 has a numerical aperture NA greater than or equal to 0.16 and less than or equal to 0.24. In another embodiment, the core portion 102 of the optical fiber 12 has a numerical aperture NA greater than or equal to 0.18 and less than or equal to 0.22. In another embodiment, the core portion 102 of the optical fiber 12 has a numerical aperture NA greater than or equal to 0.185 and less than or equal to 0.215.

In these embodiments of the optical fiber 12 depicted in FIGS. 6 and 7, the core portion 102 of the optical fiber 12 has a graded relative refractive index profile ($\Delta_C$) extending from $\Delta_{Cmax}$ at the centerline $C_L$ of the core portion 102 to $\Delta_{C2}$ at the radius $r_C$ of the core portion 102. Also, $\Delta_{C2}$ is greater than $\Delta_0$ and constant from the centerline $C_L$ to $r_C$. In embodiments, the core portion 102 has a core alpha ($\alpha$) that is greater than or equal to 1 and less than or equal to 3. In some embodiments, $\alpha$ of the core portion 102 is greater than or equal to 1.5 and less than or equal to 2.5. In some of these embodiments, $\alpha$ of the core portion 102 is greater than or equal to 1.9 and less than or equal to 2.3. The graded relative refractive index profile $\Delta_C$ of the core portion 102 may be cumulative of the relative refractive index profile of the up-dopant ($\Delta_{C1}$) and the relative refractive index profile of the attenuation dopant ($\Delta_{C2}$). That is, the concentration of the up-dopant in the core portion 102 provides the relative refractive index profile $\Delta_{C1}$ depicted in FIG. 7, the concentration of the attenuation dopant in the core portion 102 provides the relative refractive index profile $\Delta_{C2}$ depicted in FIG. 7, and the relative refractive index profile $\Delta_C$ for the core portion 102 is cumulative of $\Delta_{C1}$ and $\Delta_{C2}$. For example, in embodiments, $\Delta_C=\Delta_{C1}+\Delta_{C2}$. In other embodiments, $\Delta_C<\Delta_{C1}+\Delta_{C2}$. In still other embodiments, $\Delta_C>\Delta_{C1}+\Delta_{C2}$.

Sill referring to FIGS. 6 and 7, the inner cladding 104 is directly adjacent to and in direct contact with the core portion 102. The inner radius of the inner cladding 104 is equal to the radius $r_C$ of the core portion 102 and the outer radius of the inner cladding 104 (i.e., the radius $r_{IC}$ of the inner cladding 104) is defined as the radially inner-most point at which the line tangent to the relative refractive index profile of the low-index trench at the radius where $\Delta=0.5$ ($\Delta_{OC}-\Delta_T$) (i.e., FIG. 7) crosses the zero delta line ($\Delta_0$).

In the embodiments depicted in FIG. 6, the radius $r_{IC}$ of the inner cladding 104 is greater than or equal to 23 microns. In embodiments, the radius $r_{IC}$ is greater than or equal to 23 microns and less than or equal to 30 microns, such as greater than or equal to 24 microns and less than or equal to 28 microns. In some of these embodiments, the radius $r_{IC}$ of the inner cladding 104 is greater than or equal to 25 microns and less than or equal to 28 microns or even greater than or equal to 25 microns and less than or equal to 27 microns.

In embodiments, the radial thickness $T_{IC}$ of the inner cladding 104 is greater than or equal to 0.5 microns and less than or equal to 5 microns. In some embodiments, the radial thickness $T_{IC}$ of the inner cladding 104 is greater than or equal to 1 micron and less than or equal to 4 microns. In some embodiments, the radial thickness $T_{IC}$ of the inner cladding 104 is greater than or equal to 1 micron and less than or equal to 3 microns.

The inner cladding 104 of the optical fiber 12 depicted in FIGS. 6 and 7 has a relative refractive index $\Delta_{IC}$ which is greater than the relative refractive index $\Delta_T$ of the low-index trench 106, thereby forming a region which is "up-doped" relative to the low-index trench 106. In this embodiment, the inner cladding 104 is up-doped with the attenuation dopant, e.g., TiO$_2$, as described herein with respect to the cladding portion 103 of the optical fiber 10 depicted in FIGS. 1 and 2.

In the embodiments in which the attenuation dopant is TiO$_2$, the TiO$_2$ concentration in the inner cladding 104 is greater than or equal to 0.2 wt. %. In some embodiments, the TiO$_2$ concentration in the cladding portion 103 is greater than or equal to 0.5 wt. %, for example greater than or equal to 1.0 wt. % or even greater than or equal to 1.5 wt. %. In some of these embodiments, the concentration of TiO$_2$ in the inner cladding 104 is greater than or equal to 2.0 wt. % or even greater than or equal to 2.5 wt. %. In still other embodiments, the TiO$_2$ concentration in the inner cladding 104 is greater than or equal to 3.0 wt. % or even greater than or equal to 3.5 wt. %.

In the embodiments described herein, the concentration of the attenuation dopant in the inner cladding 104 is sufficient to increase the relative refractive index of the silica glass of the inner cladding 104 such that the relative refractive index $\Delta_{IC}$ of the inner cladding 104 is greater than or equal to 0.1% and less than or equal to 1.0%. For example, in some embodiments, the relative refractive index $\Delta_{IC}$ of the inner cladding 104 is greater than or equal to 0.15% or even greater than or equal to 0.2% and less than or equal to 0.8%. In some of these embodiments, the relative refractive index $\Delta_{IC}$ of the inner cladding 104 is greater than or equal to 0.2% and less than or equal to 0.6%. In some other embodiments, the relative refractive index $\Delta_{IC}$ of the inner cladding 104 is greater than or equal to 0.3% and less than or equal to 0.7%. For example, in some embodiments, the relative refractive index $\Delta_{IC}$ of the inner cladding 104 is greater than or equal to 0.2% and less than or equal to 0.5%. In some other embodiments, the relative refractive index $\Delta_{IC}$ of the inner cladding 104 is greater than or equal to 0.3% and less than or equal to 0.5%.

Still referring to FIGS. 6 and 7, the low-index trench 106 is directly adjacent to and in direct contact with the inner cladding 104. The inner radius of the low-index trench 106 is equal to the radius $r_{IC}$ of the inner cladding 104 and the outer radius of the low-index trench 106 (i.e., the radius $r_T$ of the low-index trench 106) is defined as the radially outer-most point at which the line tangent to the relative refractive index profile of the low-index trench at the radius where $\Delta=0.5(\Delta_{OC}-\Delta_T)$ (i.e., FIG. 7) crosses the zero delta line ($\Delta_0$).

In the embodiments depicted in FIG. 6, the radius $r_T$ of the low-index trench 106 is greater than or equal to 25 microns which improves the bend performance of the optical fiber 11. In embodiments, the radius $r_T$ is greater than or equal to 26 microns and less than or equal to 40 microns, such as greater than or equal to 26 microns and less than or equal to 35 microns. In some of these embodiments, the radius $r_T$ of the low-index trench 106 is greater than or equal to 26 microns and less than or equal to 33 microns or even greater than or equal to 26 microns and less than or equal to 32 microns.

In embodiments, the radial thickness $T_T$ of the low-index trench 106 is greater than or equal to 1 micron and less than or equal to 15 microns. In some embodiments, the radial thickness $T_T$ of the low-index trench 106 is greater than or equal to 2 microns and less than or equal to 10 microns. In some embodiments, the radial thickness $T_T$ of the low-index trench 106 is greater than or equal to 2 microns and less than or equal to 8 microns or even greater than or equal to 2 microns and less than or equal to 7 microns.

As noted herein, the relative refractive index $\Delta_T$ of the low-index trench 106 is less than the maximum relative refractive index $\Delta_{Cmax}$ of the core portion 102, the relative refractive index $\Delta_{IC}$ of the inner cladding 104 and the relative refractive index $\Delta_{OC}$ of the outer cladding 108 (i.e., $\Delta_T<\Delta_{Cmax}$; $\Delta_T<\Delta_{IC}$; $\Delta_T<\Delta_{OC}$). In the embodiments described herein, the relative refractive index $\Delta_T$ of the low-index trench 106 is generally less than or equal to 0.6% and greater than or equal to −0.6% relative to pure silica glass. In some embodiments, the relative refractive index $\Delta_T$ of the low-index trench 106 is less than or equal to 0.3% and greater than or equal to −0.3%, less than or equal to 0.1% and greater than or equal to −0.1%, or even less than or equal to 0.05% and greater than or equal to −0.05%. For example, in some embodiments, the low-index trench 106 is formed from pure silica glass and the relative refractive index $\Delta_T$ of the low-index trench 106 is 0% as depicted in FIG. 7. In other embodiments, the low-index trench 106 is formed from silica glass doped with an attenuation dopant, e.g., TiO$_2$, such that the relative refractive index $\Delta_T$ is greater than or equal to 0.01% and less than 1.0% relative to pure silica glass as described above in reference to FIG. 5. For example, the low-index trench 106 may be formed from silica glass doped with an attenuation dopant such that the relative refractive index $\Delta_T$ is greater than or equal to 0.05% and less than or equal to 0.5% relative to pure silica glass. In the alternative, or in addition to, the low-index trench 106 may be doped with a down-dopant, for example and without limitation fluorine. In some embodiments, the relative refractive index $\Delta_T$ of the low-index trench 106 is essentially flat. That is, the difference between the relative refractive index $\Delta_T$ at any two radii within the low-index trench 106 is less than 0.1%, or even less than 0.05%. In other embodiments the low-index trench 106 may have small fluctuations in the relative refractive index $\Delta_T$ as a result of small profile design or process variations.

In order to achieve good bend performance, the volume $|V_T|$ of the low-index trench 106 is preferably greater than 20% $\Delta$-micron$^2$. In embodiments, the volume $|V_T|$ of the low-index trench 106 may be greater than or equal to 30% $\Delta$-micron$^2$ or even greater than or equal to 40% $\Delta$-micron$^2$. In some of these embodiments, the volume $|V_T|$ of the low-index trench 106 may be greater than or equal to 50% $\Delta$-micron$^2$ or even greater than or equal to 60% $\Delta$-micron$^2$. In some embodiments the volume $|V_T|$ of the low-index trench is greater than or equal to 30% $\Delta$-micron$^2$ and less than or equal to 120% $\Delta$-micron$^2$. In some of these embodiments, the volume $|V_T|$ of the low-index trench is greater than or equal to 40% $\Delta$-micron$^2$ and less than or equal to 100% $\Delta$-micron$^2$.

Still referring to FIGS. 6 and 7, the outer cladding 108 is directly adjacent to and in direct contact with the low-index trench 106. That is, the inner radius of the outer cladding 108 is equal to the radius $r_T$ of the low-index trench 106 and the outer radius of the outer cladding 108 (i.e., radius $r_{OC}$ of the outer cladding 108) is defined as the outer radius of the glass portion of the optical fiber. In the embodiments depicted in FIG. 6, the radius $r_{OC}$ of the outer cladding 108 is less than 65 microns. In some embodiments described herein, the radius $r_{OC}$ of the outer cladding 108 of the optical fiber 12 is less than 65 microns. In some embodiments described herein, the radius $r_{OC}$ of the outer cladding 108 of the optical fiber 12 is 62.5 microns. In some embodiments described herein, the radius $r_{OC}$ of the outer cladding 108 of the optical fiber 12 is greater than or equal to 40 microns and less than or equal to 62.5 microns.

The outer cladding 108 of the optical fiber 12 depicted in FIGS. 6 and 7 has a relative refractive index $\Delta_{OC}$ which is greater than the relative refractive index $\Delta_T$ of the low-index trench 106, thereby forming a region which is "up-doped" relative to the low-index trench 106. In embodiments, the concentration of the attenuation dopant is constant along the radial thickness of the outer cladding 108. In other embodiments, the concentration of the attenuation dopant is slightly decreasing along the radial thickness of the outer cladding 108. The outer cladding 108 may be up-doped with the attenuation dopant, e.g., $TiO_2$, as described herein with respect to the cladding portion 103 of the optical fiber 10 depicted in FIGS. 1 and 2.

In the embodiments where the attenuation dopant in the outer cladding 108 is $TiO_2$, the $TiO_2$ concentration in the outer cladding 108 is greater than or equal to 0.2 wt. %. In some embodiments, the $TiO_2$ concentration in the outer cladding 108 is greater than or equal to 0.5 wt. %, for example greater than or equal to 1.0 wt. % or even greater than or equal to 1.5 wt. %. In some of these embodiments, the concentration of $TiO_2$ in the outer cladding 108 is greater than or equal to 2.0 wt. % or even greater than or equal to 2.5 wt. %. In still other embodiments, the $TiO_2$ concentration in the outer cladding 108 is greater than or equal to 3.0 wt. % or even greater than or equal to 3.5 wt. %. In embodiments, the $TiO_2$ concentration in the outer cladding 108 is generally equal to the $TiO_2$ concentration in the inner cladding 104.

In the embodiments described herein, the concentration of the attenuation dopant in the outer cladding 108 is sufficient to increase the relative refractive index of the silica glass of the outer cladding 108 such that the relative refractive index $\Delta_{OC}$ of the outer cladding 108 is greater than or equal to 0.1% and less than or equal to 1.0%. For example, in some embodiments, the relative refractive index $\Delta_{OC}$ of the outer cladding 108 is greater than or equal to 0.15% or even greater than or equal to 0.2% and less than or equal to 0.8%. In some of these embodiments, the relative refractive index $\Delta_{OC}$ of the outer cladding 108 is greater than or equal to 0.2% and less than or equal to 0.6%. In some other embodiments, the relative refractive index $\Delta_{OC}$ of the outer cladding 108 is greater than or equal to 0.3% and less than or equal to 0.7%. For example, in some embodiments, the relative refractive index $\Delta_{OC}$ of the outer cladding 108 is greater than or equal to 0.2% and less than or equal to 0.5%. In some other embodiments, the relative refractive index $\Delta_{OC}$ of the outer cladding 108 is greater than or equal to 0.3% and less than or equal to 0.5%. In some embodiments, the relative refractive index $\Delta_{OC}$ of the outer cladding 108 is generally equal to the relative refractive index $\Delta_{IC}$ in the inner cladding 104. In other embodiments, the relative refractive index $\Delta_{OC}$ of the outer cladding 108 is generally less than the relative refractive index $\Delta_{IC}$ in the inner cladding 104. In still other embodiments, the relative refractive index $\Delta_{OC}$ of the outer cladding 108 is generally greater than the relative refractive index $\Delta_{IC}$ in the inner cladding 104.

In embodiments, the optical fiber 12 is multi-moded at a wavelength of 850 nm. In embodiments, the optical fiber 12 has an attenuation at 850 nm that is greater than or equal to 0.5 dB/m. In some of these embodiments, the optical fiber 12 has attenuation at 850 nm greater than or equal to 1.0 dB/m. For example, in some embodiments, the attenuation at 850 nm is greater than or equal to 5 dB/m or even greater or equal to 7 dB/m. In some of these embodiments, the attenuation at 850 nm is greater than or equal to 12 dB/m or even greater than or equal to 18 dB/m.

In embodiments, the optical fiber 12 is multi-moded for wavelengths between 800 nm to 1350 nm, for example, the optical fiber 12 may be multi-moded for wavelengths less between 800 and 1000 nm or between 800 and 900 nm. In some embodiments, the optical fiber 12 is multi-moded for wavelengths between 1250 nm and 1350 nm. The optical fiber 12 may have an attenuation for at least one wavelength between 800 nm and 1000 nm that is greater than or equal to 0.5 dB/m. In embodiments, the optical fiber 12 has an attenuation for wavelengths between 800 nm and 1000 nm greater than or equal to 0.5 dB/m, for example greater than or equal to 1.0 dB/m. In some embodiments, the attenuation is greater than or equal to 5 dB/m or even greater or equal to 7 dB/m. In some of these embodiments, the attenuation is greater than or equal to 12 dB/m or even greater than or equal to 18 dB/m.

Still referring to FIGS. 6 and 7, in some embodiments, the 30 mm diameter bend loss of the optical fiber 12 (i.e., when the optical fiber is wound around a 30 mm diameter mandrel for two turns) at 850 nm is less than 0.5 dB, for example less than or equal to 0.4 dB, less than or equal to 0.3 dB, or even less than or equal to 0.2 dB. In some embodiments, the 20 mm bend loss of the optical fiber 12 (i.e., when the optical fiber is wound around a 20 mm diameter mandrel for two turns) at 850 nm is less than or equal to 0.5 dB and the 20 mm bend loss at 1300 nm is less than or equal to 1.0 dB. In some embodiments, the 15 mm diameter bend loss of the optical fiber 12 (i.e., when the optical fiber is wound around a 15 mm diameter mandrel for two turns) at 850 nm is less than 1.0 dB, for example less than or equal to 0.8 dB, less than or equal to 0.6 dB, or even less than or equal to 0.4 dB. For example, in some embodiments the 15 mm diameter bend loss of the optical fiber 12 at 850 nm is less than or equal to 0.3 dB and the 15 mm diameter bend loss at 1300 nm is less than or equal to 0.8 dB. In some embodiments, the 5×10 mm diameter bend loss of the optical fiber 10 (i.e., when the optical fiber is wound around a 10 mm diameter mandrel for five turns) at 850 nm is less than 2.0 dB, for example less than or equal to 1.8 dB, and in some embodiments less than or equal to 1.6 dB, or even less than or equal to 1.4 dB. In some embodiments, the 2×10 mm bend loss of the optical fiber 12 (i.e., when the optical fiber is wound around a 10 mm diameter mandrel for two turns) at 850 nm is less than or equal to 0.8 dB and the 10 mm two turn bend loss at 1300 nm is less than or equal to 1.5 dB.

While FIGS. 1-7 depict optical fibers 10, 11 and 12 with a core portion comprising an attenuation dopant with a concentration that is constant from the centerline $C_L$ of the core portion to the radius $r_C$ of the core portion, it should be understood that the core portion may comprise an attenuation dopant with a concentration that is graded such that the concentration of the attenuation dopant in the core portion is lowest at the radius $r_C$ and increases from the radius $r_C$ along a direction towards the centerline $C_L$ of the core portion. For example, FIG. 8 schematically depicts a relative refractive index profile of the optical fiber 12 depicted in FIG. 6 that includes a core portion with a concentration of an attenuation dopant in the core portion is lowest at the radius $r_C$ and increases from the radius $r_C$ along the direction towards the center line of the core portion.

Figure 8:
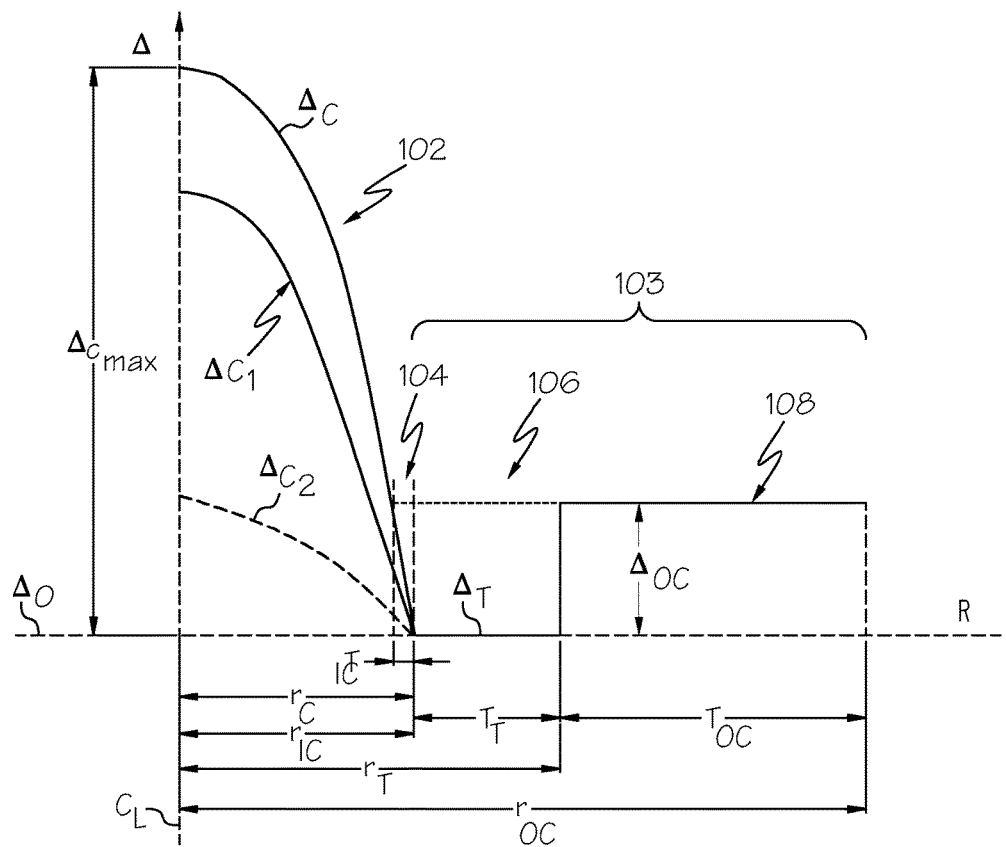
FIG. 8 graphically depicts a relative refractive index profile of the optical fiber of FIG. 6 as a function of the radius R of the glass portion of the optical fiber according to one or more embodiments shown and described herein.

Referring to FIGS. 6 and 8, the optical fiber 12 of this embodiment generally comprises a core portion 102 and a cladding portion 103, as described hereinabove. In this embodiment, the cladding portion 103 comprises an inner cladding 104, a low-index trench 106 and an outer cladding 108. The core portion 102 is positioned within the cladding portion 103 and has a maximum relative refractive index $\Delta_{Cmax}$ (relative to pure silica glass). The core portion 102 and the cladding portion 103 are concentric such that the cross section of the optical fiber 12 is generally circular symmetric with respect to the center of the core portion 102. The inner cladding 104 surrounds and is in direct contact with the core portion 102 and has a graded relative refractive index $\Delta_{IC}$ (relative to pure silica glass). The low-index trench 106 surrounds and is in direct contact with the inner cladding 104 and has a relative refractive index $\Delta_T$ (relative to pure silica glass). The outer cladding 108 surrounds and is in direct contact with the low-index trench 106 and has a relative refractive index $\Delta_{OC}$ (relative to pure silica glass). That is, the inner cladding 104, low-index trench 106 and outer cladding 108 are arranged such that the inner cladding 104 is disposed between the core portion 102 and the low-index trench 106, and the low-index trench 106 is disposed between the inner cladding 104 and the outer cladding 108. In the embodiment of the optical fiber 12 depicted in FIGS. 6 and 8, $\Delta_{Cmax} > \Delta_{IC}$; $\Delta_{Cmax} > \Delta_{OC}$; $\Delta_{IC} \geq \Delta_T$; $\Delta_{Cmax} > \Delta_{IC} \geq \Delta_T$; $\Delta_{Cmax} > \Delta_{OC} > \Delta_T$.

Still referring to FIGS. 6 and 8, the core portion 102 has a radius $r_C$. The inner cladding 104 surrounds the core portion 102 and extends from the radius $r_C$ to a radius $r_{IC}$ such that the inner cladding 104 has a radial thickness $T_{IC} = r_{IC} - r_C$. The low-index trench 106 surrounds the inner cladding 104 and extends from the radius $r_{IC}$ to a radius $r_T$ such that the low-index trench has a radial thickness $T_T = r_T - r_{IC}$. The outer cladding 108 may surround the low-index trench 106 and extend from the radius $r_T$ to a radius $r_{OC}$ such that the outer cladding has a radial thickness of $T_{OC} = r_{OC} - r_T$. Accordingly, the glass portion of the optical fiber 11 (e.g., the core portion 102, the low-index trench 106, and the outer cladding 108) may have a diameter of $2r_{OC}$. In some embodiments described herein, the radius $r_{OC}$ of the glass portion of the optical fiber 11 is less than 65 microns. In some embodiments described herein, the radius $r_{OC}$ of the glass portion of the optical fiber 11 is 62.5 microns. In some embodiments described herein, the radius $r_{OC}$ of the glass portion of the optical fiber 11 is greater than or equal to 40 microns and less than or equal to 62.5 microns.

The radius $r_C$ of the core portion 102 of the optical fiber 12 depicted in FIGS. 6 and 8 is defined as the minimum radius at which the line tangent to the relative refractive index profile (i.e., $\Delta_C$ in FIG. 8) of the core portion 102 crosses a line with zero slope extending from the relative refractive index $\Delta_{OC}$ at the radius $r_{OC}$ in a direction towards the centerline $C_L$ of the core portion 102. In the embodiments of the optical fiber depicted in FIGS. 6 and 8, the radius $r_C$ of the core portion 102 is greater than or equal to 22 microns and less than or equal to 28 microns. In some of these embodiments, the radius $r_C$ of the core portion 102 is greater than or equal to 23 microns and less than or equal to 28 microns, for example greater than or equal to 23.5 microns and less than or equal to 27.5 microns.

In embodiments, the maximum relative refractive index $\Delta_{Cmax}$ of the core portion 102 of the optical fiber 12 is greater than or equal to 0.8% and less than or equal to 1.6%. In some of these embodiments, the maximum relative refractive index $\Delta_{Cmax}$ of the core portion 102 is greater than or equal to 0.8% and less than or equal to 1.4% or even greater than or equal to 0.8% and less than or equal to 1.2%. In some embodiments the maximum relative refractive index $\Delta_{Cmax}$ of the core portion 102 is greater than or equal to 0.9% and less than or equal to 1.1%.

To obtain maximum relative refractive index $\Delta_{Cmax}$ values greater than 0.8% in the core portion 102, the core portion 102 of the optical fiber 12 may be up-doped with one or more up-dopants, and in the alternative or in addition to, doped with one or more attenuation dopants, which increase the refractive index of silica glass. Suitable up-dopants include, without limitation, $GeO_2$, $Al_2O_3$, $P_2O_5$, $TiO_2$, Cl and Br, or the like. For example, up-doping the core portion 102 with 16.4 wt. % $GeO_2$ is the equivalent of increasing the relative refractive index of the core portion 102 by 1.0%. In embodiments, the core portion 102 is up-doped with a maximum $GeO_2$ concentration greater than or equal to 7 wt. % and less than or equal to 20 wt. % $GeO_2$. The concentration of $GeO_2$ in the core portion 102 may be graded such that the concentration of $GeO_2$ in the core portion 102 is lowest at the radius $r_C$ and increases from the radius $r_C$ along a direction towards the centerline $C_L$ of the core portion 102. Suitable attenuation dopants include, without limitation, oxides of transition metals including, titanium, vanadium, chromium, manganese, iron, cobalt, nickel, copper, molybdenum, tungsten or tantalum, or the like. These attenuation dopants can be in one or more oxidation states, for example Ti (+4 and/or +3), V (+5 and/or +4 and/or +3 and/or +2), Cr (+6 and/or +3 and/or +2), Mn (+7 and/or +6 and/or +4 and/or +3 and/or +2), Fe (+3 and/or +2), Co (+3 and/or +2), Ni (+3 and/or +2), Cu (+2 and/or +1), or the like. For example, doping the core portion 102 with 6.0 wt. % $TiO_2$ is the equivalent of increasing the relative refractive index of the core portion 102 by 1.0% and the core portion 102 may be doped with a maximum $TiO_2$ concentration greater than or equal to 0.5 wt. % and less than or equal to 15 wt. % $TiO_2$. In embodiments, the core portion 102 is doped with an attenuation dopant such that the concentration of the attenuation dopant in the core portion 102 is graded and the concentration of the attenuation dopant in the core portion 102 is lowest at the radius $r_C$ and increases from the radius $r_C$ along a direction towards the centerline $C_L$ of the core portion 102.

It is understood that an optical attenuator comprising the optical fiber 12 as depicted in FIGS. 6 and 8 will propagate an optical signal primarily through the core portion 102 of the optical fiber 12. Accordingly, it is the core portion 102 of the optical fiber 12 that is doped with the attenuation dopant thereby attenuating the optical signal and providing a balanced optical signal output from the optical attenuator.

In embodiments, the core portion 102 of the optical fiber 12 depicted in FIGS. 6 and 8 has a numerical aperture NA greater than or equal to 0.15 and less than or equal to 0.25. In another embodiment, the core portion 102 of the optical fiber 12 has a numerical aperture NA greater than or equal to 0.16 and less than or equal to 0.24. In another embodiment, the core portion 102 of the optical fiber 12 has a numerical aperture NA greater than or equal to 0.18 and less than or equal to 0.22. In another embodiment, the core portion 102 of the optical fiber 12 has a numerical aperture NA greater than or equal to 0.185 and less than or equal to 0.215.

In these embodiments of the optical fiber 12 depicted in FIGS. 6 and 8, the core portion 102 of the optical fiber 12 has a graded relative refractive index profile $\Delta_C$ extending from $\Delta_{Cmax}$ at the centerline $C_L$ of the core portion 102 to a relative refractive index value equal to $\Delta_{OC}$ at the radius $r_C$ of the core portion 102. In embodiments, the graded relative refractive index profile $\Delta_C$ has a graded relative refractive index profile has a core alpha (α) that is greater than or equal to 1 and less than or equal to 3. In some embodiments, α of the core portion 102 is greater than or equal to 1.5 and less than or equal to 2.5. In some of these embodiments, α of the core portion 102 is greater than or equal to 1.9 and less than or equal to 2.3. The graded relative refractive index profile $\Delta_C$ of the core portion 102 may be cumulative of the relative refractive index profile $\Delta_{C1}$ of the up-dopant and the relative refractive index profile $\Delta_{C2}$ of the attenuation dopant. That is, the concentration of the up-dopant in the core portion 102 provides the relative refractive index profile $\Delta_{C1}$ depicted in FIG. 8, the concentration of the attenuation dopant in the core portion 102 provides the relative refractive index profile $\Delta_{C2}$ depicted in FIG. 8, and the relative refractive index profile $\Delta_C$ for the core portion 102 is cumulative of $\Delta_{C1}$ and $\Delta_{C2}$. For example, in embodiments, $\Delta_C=\Delta_{C1}+\Delta_{C2}$.

It is understood that the optical fiber 12 depicted in FIGS. 6 and 8 comprises a core portion 102 with a graded relative refractive index profile extending from $\Delta_{Cmax}$ at the centerline $C_L$ to $\Delta_{OC}$ at $r_C$. In contrast and as noted herein, the optical fiber 11 depicted in FIGS. 3 and 4 comprises a core portion 102 with a graded relative refractive index profile extending from $\Delta_{Cmax}$ at the centerline $C_L$ of the core portion 102 to $\Delta_{C2}$ at the radius $r_C$ of the core portion 102. Also, $\Delta_{C2}$ is greater than $\Delta_0$ and constant from the centerline $C_L$ to $r_C$ for the optical fiber 11 depicted in FIGS. 3 and 4.

Still referring to FIGS. 6 and 8, the inner cladding 104 is directly adjacent to and in direct contact with the core portion 102. The inner radius of the inner cladding 104 is equal to the radius $r_C$ of the core portion 102 and the outer radius of the inner cladding 104 (i.e., the radius $r_{IC}$ of the inner cladding 104) is defined as the radius at which the line tangent to the relative refractive index profile of the inner cladding at the radius where $\Delta=0.5(\Delta_{OC}-\Delta_T)$ (i.e., FIG. 8) intersects a line with zero slope extending from the innermost radius of the trench where $\Delta=\Delta_T$ in a direction towards the centerline $C_L$ of the core portion 102.

In the embodiments depicted in FIGS. 6 and 8, the radius $r_{IC}$ of the inner cladding 104 is greater than or equal to 23 microns. In embodiments, the radius $r_{IC}$ is greater than or equal to 23 microns and less than or equal to 30 microns, such as greater than or equal to 24 microns and less than or equal to 28 microns. In some of these embodiments, the radius $r_{IC}$ of the inner cladding 104 is greater than or equal to 25 microns and less than or equal to 28 microns or even greater than or equal to 25 microns and less than or equal to 27 microns.

In embodiments, the radial thickness $T_{IC}$ of the inner cladding 104 is greater than or equal to 0.5 microns and less than or equal to 5 microns. In some embodiments, the radial thickness $T_{IC}$ of the inner cladding 104 is greater than or equal to 1 micron and less than or equal to 4 microns. In some embodiments, the radial thickness $T_{IC}$ of the inner cladding 104 is greater than or equal to 1 micron and less than or equal to 3 microns.

The inner cladding 104 of the optical fiber 12 depicted in FIGS. 6 and 8 has a graded relative refractive index $\Delta_{IC}$ which is greater than the relative refractive index $\Delta_T$ of the low-index trench 106 at radii within the inner cladding 104 less than $r_{IC}$ and equal to the relative refractive index $\Delta_T$ of the low-index trench 106 at the radius $r_{IC}$, thereby forming a region which is "up-doped" relative to the low-index trench 106. In embodiments, the graded relative refractive index $\Delta_{IC}$ of the inner cladding 104 is continuous with the graded relative refractive index $\Delta_C$ of the core portion 102. In this embodiment, the inner cladding 104 is up-doped with an up-dopant, e.g., $GeO_2$, and an attenuation dopant, e.g., $TiO_2$. The concentration of the up-dopant in the inner cladding 104 may be graded such that the concentration of the up-dopant is lowest at the radius $r_{IC}$ and increases from the radius $r_{IC}$ along a direction towards the centerline $C_L$ of the core portion 102. The concentration of the attenuation dopant in the inner cladding 104 may also be graded such that the concentration of the attenuation dopant is lowest at the radius $r_{IC}$ and increases from the radius $r_{IC}$ along a direction towards the centerline $C_L$ of the core portion 102.

In the embodiments in which the attenuation dopant is $TiO_2$, the $TiO_2$ concentration in the inner cladding 104 is graded with a maximum concentration at the radius $r_C$ greater than or equal to 0.2 wt. %. In some embodiments, the maximum $TiO_2$ concentration in the inner cladding 104 is greater than or equal to 0.5 wt. %, for example greater than or equal to 1.0 wt. % or even greater than or equal to 1.5 wt. %. In some of these embodiments, the maximum concentration of $TiO_2$ in the inner cladding 104 is greater than or equal to 2.0 wt. % or even greater than or equal to 2.5 wt. %. In still other embodiments, the maximum $TiO_2$ concentration in the inner cladding 104 is greater than or equal to 3.0 wt. % or even greater than or equal to 3.5 wt. %.

In the embodiments described herein, the concentration of the attenuation dopant in the inner cladding 104 is sufficient to increase the relative refractive index of the silica glass of the inner cladding 104 such that the maximum relative refractive index $\Delta_{IC}$ of the inner cladding 104 (e.g., at the radius $r_C$) is greater than or equal to 0.1% and less than or equal to 1.0%. For example, in some embodiments, the maximum relative refractive index $\Delta_{IC}$ of the inner cladding 104 is greater than or equal to 0.15% or even greater than or equal to 0.2% and less than or equal to 0.8%. In some of these embodiments, the maximum relative refractive index $\Delta_{IC}$ of the inner cladding 104 is greater than or equal to 0.2% and less than or equal to 0.6%. In some other embodiments, the maximum relative refractive index $\Delta_{IC}$ of the inner cladding 104 is greater than or equal to 0.3% and less than or equal to 0.7%. For example, in some embodiments, the maximum relative refractive index $\Delta_{IC}$ of the inner cladding 104 is greater than or equal to 0.2% and less than or equal to 0.5%. In some other embodiments, the maximum relative refractive index $\Delta_{IC}$ of the inner cladding 104 is greater than or equal to 0.3% and less than or equal to 0.5%.

Still referring to FIGS. 6 and 8, the low-index trench 106 is directly adjacent to and in direct contact with the inner cladding 104. The inner radius of the low-index trench 106 is equal to the radius $r_{IC}$ of the inner cladding 104 and the outer radius of the low-index trench 106 (i.e., the radius $r_T$ of the low-index trench 106) is defined as the radially outer-most point at which the line tangent to the relative refractive index profile of the low-index trench at the radius where $\Delta=0.5(\Delta_{OC}-\Delta_T)$ (i.e., FIG. 8) crosses the zero delta line ($\Delta_0$).

In the embodiments depicted in FIGS. 6 and 8, the radius $r_T$ of the low-index trench 106 is greater than or equal to 25 microns which improves the bend performance of the optical fiber 12. In embodiments, the radius $r_T$ is greater than or equal to 26 microns and less than or equal to 40 microns, such as greater than or equal to 26 microns and less than or equal to 35 microns. In some of these embodiments, the radius $r_T$ of the inner cladding 104 is greater than or equal to 26 microns and less than or equal to 33 microns or even greater than or equal to 26 microns and less than or equal to 32 microns.

In embodiments, the radial thickness $T_T$ of the low-index trench 106 of the low-index trench 106 for the optical fiber 12 depicted in FIGS. 6 and 8 is greater than or equal to 1 micron and less than or equal to 15 microns. In some embodiments, the radial thickness $T_T$ of the low-index trench 106 is greater than or equal to 2 microns and less than or equal to 10 microns. In some embodiments, the radial thickness $T_T$ of the low-index trench 106 is greater than or equal to 2 microns and less than or equal to 8 microns or even greater than or equal to 2 microns and less than or equal to 7 microns.

As noted herein, the relative refractive index $\Delta_T$ of the low-index trench 106 is less than the maximum relative refractive index $\Delta_{Cmax}$ of the core portion 102 and the relative refractive index $\Delta_{OC}$ of the outer cladding 108. In the embodiments described herein, the relative refractive index $\Delta_T$ of the low-index trench 106 is generally less than or equal to 0.6% and greater than or equal to −0.6% relative to pure silica glass. In some embodiments, the relative refractive index $\Delta_T$ of the low-index trench 106 is less than or equal to 0.3% and greater than or equal to −0.3%, less than or equal to 0.1% and greater than or equal to −0.1%, or even less than or equal to 0.05% and greater than or equal to −0.05%. For example, in some embodiments, the low-index trench 106 is formed from pure silica glass and the relative refractive index $\Delta_T$ of the low-index trench 106 is 0% as depicted in FIG. 8. In other embodiments, the low-index trench 106 is formed from silica glass doped with the attenuation dopant, e.g., $TiO_2$, such that the relative refractive index $\Delta_T$ is greater than 0.01% and less than 1.0% relative to pure silica glass as described above with reference to FIG. 5. For example, the low-index trench 106 may be formed from silica glass doped with an attenuation dopant such that the relative refractive index $\Delta_T$ is greater than or equal to 0.05% and less than or equal to 0.5% relative to pure silica glass. In the alternative, or in addition to, the low-index trench 106 may be doped with a down-dopant, for example and without limitation fluorine. In some embodiments, the relative refractive index $\Delta_T$ of the low-index trench 106 is essentially flat. That is, the difference between the relative refractive index $\Delta_T$ at any two radii within the low-index trench 106 is less than 0.1%, or even less than 0.05%. In other embodiments the low-index trench 106 may have small fluctuations in the relative refractive index $\Delta_T$ as a result of small profile design or process variations.

In order to achieve good bend performance, the volume $|V_T|$ of the low-index trench 106 is preferably greater than 20% $\Delta$-micron$^2$. In embodiments, the volume $|V_T|$ of the low-index trench 106 may be greater than or equal to 30% $\Delta$-micron$^2$ or even greater than or equal to 40% $\Delta$-micron$^2$. In some of these embodiments, the volume $|V_T|$ of the low-index trench 106 may be greater than or equal to 50% $\Delta$-micron$^2$ or even greater than or equal to 60% $\Delta$-micron$^2$. In some embodiments the volume $|V_T|$ of the low-index trench is greater than or equal to 30% $\Delta$-micron$^2$ and less than or equal to 120% $\Delta$-micron$^2$. In some of these embodiments, the volume $|V_T|$ of the low-index trench is greater than or equal to 40% $\Delta$-micron$^2$ and less than or equal to 100% $\Delta$-micron$^2$.

Still referring to FIGS. 6 and 8, the outer cladding 108 is directly adjacent to and in direct contact with the low-index trench 106. That is, the inner radius of the outer cladding 108 is equal to the radius $r_T$ of the low-index trench 106 and the outer radius of the outer cladding 108 (i.e., radius $r_{OC}$ of the outer cladding 108) is defined as the outer radius of the glass portion of the optical fiber. In the embodiments depicted in FIG. 8, the radius $r_{OC}$ of the outer cladding 108 is less than 65 microns. In embodiments described herein, the radius $r_{OC}$ of the outer cladding 108 of the optical fiber 12 is 62.5 microns. In some embodiments described herein, the radius $r_{OC}$ of the outer cladding 108 of the optical fiber 12 is greater than or equal to 40 microns and less than or equal to 62.5 microns.

The outer cladding 108 of the optical fiber 12 depicted in FIGS. 6 and 8 has a relative refractive index $\Delta_{OC}$ which is greater than the relative refractive index $\Delta_T$ of the low-index trench 106, thereby forming a region which is "up-doped" relative to the low-index trench 106. In embodiments, the concentration of the attenuation dopant is constant along the radial thickness of the outer cladding 108. In other embodiments, the concentration of the attenuation dopant is slightly decreasing along the radial thickness of the outer cladding 108. The outer cladding 108 may be up-doped with the attenuation dopant, e.g., $TiO_2$, as described herein with respect to the cladding portion 103 of the optical fiber 10 depicted in FIGS. 1 and 2.

In the embodiments where the attenuation dopant in the outer cladding 108 is $TiO_2$, the $TiO_2$ concentration in the outer cladding 108 is greater than or equal to 0.2 wt. %. In some embodiments, the $TiO_2$ concentration in the outer cladding 108 is greater than or equal to 0.5 wt. %, for example greater than or equal to 1.0 wt. % or even greater than or equal to 1.5 wt. %. In some of these embodiments, the concentration of $TiO_2$ in the outer cladding 108 is greater than or equal to 2.0 wt. % or even greater than or equal to 2.5 wt. %. In still other embodiments, the $TiO_2$ concentration in the outer cladding 108 is greater than or equal to 3.0 wt. % or even greater than or equal to 3.5 wt. %.

In the embodiments described herein, the concentration of the attenuation dopant in the outer cladding 108 is sufficient to increase the relative refractive index of the silica glass of the outer cladding 108 such that the relative refractive index $\Delta_{OC}$ of the outer cladding 108 is greater than or equal to 0.1% and less than or equal to 1.0%. For example, in some embodiments, the relative refractive index $\Delta_{OC}$ of the outer cladding 108 is greater than or equal to 0.15% or even greater than or equal to 0.2% and less than or equal to 0.8%. In some of these embodiments, the relative refractive index $\Delta_{OC}$ of the outer cladding 108 is greater than or equal to 0.2% and less than or equal to 0.6%. In some other embodiments, the relative refractive index $\Delta_{OC}$ of the outer cladding 108 is greater than or equal to 0.3% and less than or equal to 0.7%. For example, in some embodiments, the relative refractive index $\Delta_{OC}$ of the outer cladding 108 is greater than or equal to 0.2% and less than or equal to 0.5%. In some other embodiments, the relative refractive index $\Delta_{OC}$ of the outer cladding 108 is greater than or equal to 0.3% and less than or equal to 0.5%. In some other embodiments, the relative refractive index $\Delta_{OC}$ of the outer cladding 108 is greater than or equal to 0.3% and less than or equal to 0.5%. In some embodiments, the relative refractive index $\Delta_{OC}$ of the outer cladding 108 is generally equal to the relative refractive index $\Delta_{IC}$ in the inner cladding 104. In other embodiments, the relative refractive index $\Delta_{OC}$ of the outer cladding 108 is generally less than the relative refractive index $\Delta_{IC}$ in the inner cladding 104. In still other embodiments, the relative refractive index $\Delta_{OC}$ of the outer cladding 108 is generally greater than the relative refractive index $\Delta_{IC}$ in the inner cladding 104.

In embodiments, the optical fiber 12 depicted in FIGS. 6 and 8 is multi-moded at a wavelength of 850 nm. In embodiments, the optical fiber 12 has an attenuation at 850 nm that is greater than or equal to 0.5 dB/m. In some of these embodiments, the optical fiber 12 has attenuation at 850 nm greater than or equal to 1.0 dB/m. For example, in some embodiments, the attenuation at 850 nm is greater than or equal to 5 dB/m or even greater or equal to 7 dB/m. In some of these embodiments, the attenuation at 850 nm is greater than or equal to 12 dB/m or even greater than or equal to 18 dB/m.

In embodiments, the optical fiber 12 is multi-moded for wavelengths between 800 nm to 1350 nm, for example, the optical fiber 12 may be multi-moded for wavelengths less between 800 and 1000 nm or between 800 and 900 nm. In some embodiments, the optical fiber 12 is multi-moded for wavelengths between 1250 nm and 1350 nm. The optical fiber 12 may have an attenuation for at least one wavelength between 800 nm and 1000 nm that is greater than or equal to 0.5 dB/m. In embodiments, the optical fiber 12 has an attenuation for wavelengths between 800 nm and 1000 nm greater than or equal to 0.5 dB/m, for example greater than or equal to 1.0 dB/m. In some embodiments, the attenuation is greater than or equal to 5 dB/m or even greater or equal to 7 dB/m. In some of these embodiments, the attenuation is greater than or equal to 12 dB/m or even greater than or equal to 18 dB/m.

Still referring to FIGS. 6 and 8, in some embodiments, the 30 mm diameter bend loss of the optical fiber 12 (i.e., when the optical fiber is wound around a 30 mm diameter mandrel for two turns) at 850 nm is less than 0.5 dB, for example less than or equal to 0.4 dB, less than or equal to 0.3 dB, or even less than or equal to 0.2 dB. In some embodiments, the 20 mm bend loss of the optical fiber 12 (i.e., when the optical fiber is wound around a 20 mm diameter mandrel for two turns) at 850 nm is less than or equal to 0.5 dB and the 20 mm bend loss at 1300 nm is less than or equal to 1.0 dB. In some embodiments, the 15 mm diameter bend loss of the optical fiber 12 (i.e., when the optical fiber is wound around a 15 mm diameter mandrel for two turns) at 850 nm is less than 1.0 dB, for example less than or equal to 0.8 dB, less than or equal to 0.6 dB, or even less than or equal to 0.4 dB. For example, in some embodiments the 15 mm diameter bend loss of the optical fiber 12 at 850 nm is less than or equal to 0.3 dB and the 15 mm diameter bend loss at 1300 nm is less than or equal to 0.8 dB. In some embodiments, the 5×10 mm diameter bend loss of the optical fiber 11 (i.e., when the optical fiber is wound around a 10 mm diameter mandrel for five turns) at 850 nm is less than 2.0 dB, for example less than or equal to 1.8 dB, and in some embodiments less than or equal to 1.6 dB, or even less than or equal to 1.4 dB. In some embodiments, the 2×10 mm bend loss of the optical fiber 12 (i.e., when the optical fiber is wound around a 10 mm diameter mandrel for two turns) at 850 nm is less than or equal to 0.8 dB and the 10 mm two turn bend loss at 1300 nm is less than or equal to 1.5 dB.

While FIGS. 6 and 8 depict an optical fiber 12 with a core portion and an inner cladding comprising an up-dopant with a concentration that is graded and an attenuation dopant with a concentration that is graded, it should be understood that the core portion and the inner cladding may comprise only an attenuation dopant (i.e., an up-dopant is not present in the core portion) with a concentration that is graded. In such embodiments, the concentration of the attenuation dopant in the core portion is lowest at the radius $r_C$ and increases from the radius $r_C$ along a direction towards the centerline $C_L$ of the core portion and the concentration of the attenuation dopant in the inner cladding is lowest at the radius $r_{IC}$ and increases from the radius $r_{IC}$ along a direction towards the centerline $C_L$ of the core portion. For example, FIG. 9 schematically depicts an axial cross section of the optical fiber 12 depicted in FIG. 6 that includes a core portion with a concentration of an attenuation dopant that is lowest at the radius $r_C$ and increases from the radius $r_C$ along the direction towards the center line of the core portion, and a concentration of the attenuation dopant in the inner cladding that is lowest at the radius $r_{IC}$ and increases from the radius $r_{IC}$ along a direction towards the centerline $C_L$ of the core portion.

Figure 9:
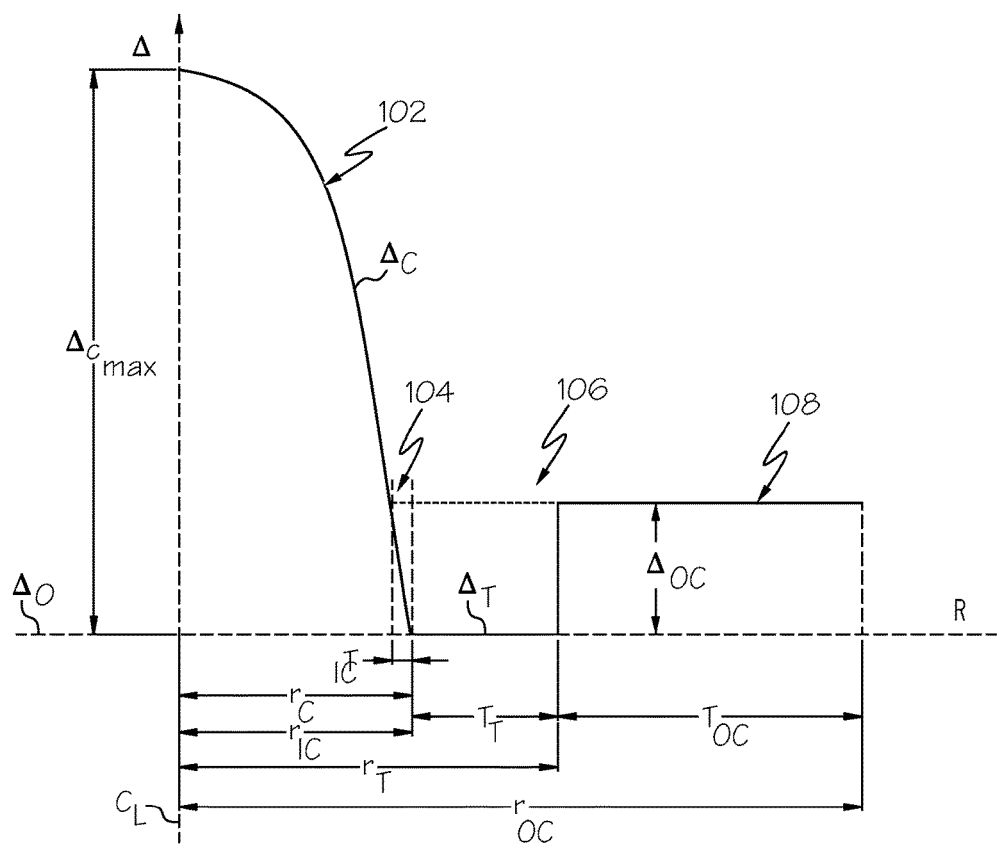
FIG. 9 graphically depicts a relative refractive index profile of the optical fiber of FIG. 8 as a function of the radius R of the glass portion of the optical fiber according to one or more embodiments shown and described herein.

Referring to FIGS. 6 and 9, the optical fiber 12 generally comprises a core portion 102 and a cladding portion 103 as described herein with respect to FIGS. 1 and 2. In this embodiment of the optical fiber 12, the cladding portion 103 further comprises an inner cladding 104, a low-index trench 106 and an outer cladding 108. In these embodiments of the optical fiber 12, the core portion 102 is positioned within the cladding portion 103 and has a maximum relative refractive index $\Delta_{Cmax}$ (relative to pure (i.e., un-doped) silica glass). The core portion 102 and the cladding portion 103 are concentric such that the cross section of the optical fiber 12 is generally circular symmetric with respect to the center of the core portion 102. The inner cladding 104 surrounds and is in direct contact with the core portion 102 and has a graded relative refractive index $\Delta_{IC}$ (relative to pure silica glass). The low-index trench 106 surrounds and is in direct contact with the inner cladding 104 and has a relative refractive index $\Delta_T$ (relative to pure silica glass). The outer cladding 108 surrounds and is in direct contact with the low-index trench 106 and has a relative refractive index $\Delta_{OC}$ (relative to pure silica glass). That is, the inner cladding 104, low-index trench 106 and outer cladding 108 are arranged such that the inner cladding 104 is disposed between the core portion 102 and the low-index trench 106, and the low-index trench 106 is disposed between the inner cladding 104 and the outer cladding 108. In the embodiment of the optical fiber 12 depicted in FIGS. 6 and 9, $\Delta_{Cmax} > \Delta_{IC}$; $\Delta_{Cmax} > \Delta_{OC}$; $\Delta_{IC} \geq \Delta_T$; $\Delta_{Cmax} > \Delta_{IC} \geq \Delta_T$; $\Delta_{Cmax} > \Delta_{OC} > \Delta_T$.

Still referring to FIGS. 6 and 9, the core portion 102 has a radius $r_C$. The inner cladding 104 surrounds the core portion 102 and extends from the radius $r_C$ to a radius $r_{IC}$ such that the inner cladding 104 has a radial thickness $T_{IC} = r_{IC} - r_C$. The low-index trench 106 surrounds the inner cladding 104 and extends from the radius $r_{IC}$ to a radius $r_T$ such that the low-index trench has a radial thickness $T_T = r_T - r_{IC}$. The outer cladding 108 may surround the low-index trench 106 and extend from the radius $r_T$ to a radius $r_{OC}$ such that the outer cladding has a radial thickness of $T_{OC} = r_{OC} - r_T$. Accordingly, the glass portion of the optical fiber 12 (e.g., the core portion 102, the low-index trench 106, and the outer cladding 108) may have a diameter of $2r_{OC}$. In some embodiments described herein, the radius $r_{OC}$ of the glass portion of the optical fiber 12 is less than 65 microns. In some embodiments described herein, the radius $r_{OC}$ of the glass portion of the optical fiber 12 is 62.5 microns. In some embodiments described herein, the radius $r_{OC}$ of the glass portion of the optical fiber 12 is greater than or equal to 40 microns and less than or equal to 62.5 microns.

The radius $r_C$ of the core portion 102 of the optical fiber 12 depicted in FIGS. 6 and 9 is defined as the minimum radius at which the line tangent to the relative refractive index profile (i.e., $\Delta_C$ in FIG. 9) of the core portion 102 crosses a line with zero slope extending from the relative refractive index $\Delta_{OC}$ at the radius $r_{OC}$ in a direction towards the centerline $C_L$ of the core portion 102. In the embodiments of the optical fiber 12 depicted in FIGS. 6 and 9, the radius $r_C$ of the core portion 102 is greater than or equal to 22 microns and less than or equal to 28 microns. In some of these embodiments, the radius $r_C$ of the core portion 102 is greater than or equal to 23 microns and less than or equal to 28 microns, for example greater than or equal to 23.5 microns and less than or equal to 27.5 microns.

In embodiments, the maximum relative refractive index $\Delta_{Cmax}$ of the core portion 102 of the optical fiber 12 is greater than or equal to 0.8% and less than or equal to 1.6%. In some of these embodiments, the maximum relative refractive index $\Delta_{Cmax}$ of the core portion 102 is greater than or equal to 0.8% and less than or equal to 1.4% or even greater than or equal to 0.8% and less than or equal to 1.2%. In some embodiments the maximum relative refractive index $\Delta_{Cmax}$ of the core portion 102 is greater than or equal to 0.9% and less than or equal to 1.1%.

To obtain maximum relative refractive index $\Delta_{Cmax}$ values greater than 0.8%, the core portion 102 of the optical fiber 12 depicted in FIGS. 6 and 9 is doped with one or more attenuation dopants which increase the refractive index of silica glass. Suitable attenuation dopants include, without limitation, oxides of transition metals including, titanium, vanadium, chromium, manganese, iron, cobalt, nickel, copper, molybdenum, tungsten or tantalum, or the like. These attenuation dopants can be in one or more oxidation states, for example Ti (+4 and/or +3), V (+5 and/or +4 and/or +3 and/or +2), Cr (+6 and/or +3 and/or +2), Mn (+7 and/or +6 and/or +4 and/or +3 and/or +2), Fe (+3 and/or +2), Co (+3 and/or +2), Ni (+3 and/or +2), Cu (+2 and/or +1), or the like. For example, doping the core portion 102 with 6.0 wt. % $TiO_2$ is the equivalent of increasing the relative refractive index of the core portion 102 by 1.0% and the core portion 102 may be doped with a maximum $TiO_2$ concentration greater than or equal to 0.5 wt. % and less than or equal to 15 wt. % $TiO_2$. In embodiments, the core portion 102 is doped with an attenuation dopant such that the concentration of the attenuation dopant in the core portion 102 is graded such that the concentration of the attenuation dopant is lowest at the radius $r_C$ and increases from the radius $r_C$ along a direction towards the centerline $C_L$ of the core portion 102.

It is understood that an optical attenuator comprising the optical fiber 12 as depicted in FIGS. 6 and 9 will propagate an optical signal primarily through the core portion 102 of the optical fiber 12. Accordingly, it is the core portion 102 of the optical fiber 12 that is doped with the attenuation dopant thereby attenuating the optical signal and providing a balanced optical signal output from the optical attenuator.

In embodiments, the core portion 102 of the optical fiber 12 depicted in FIGS. 6 and 9 has a numerical aperture NA greater than or equal to 0.15 and less than or equal to 0.25. In another embodiment, the core portion 102 of the optical fiber 12 has a numerical aperture NA greater than or equal to 0.16 and less than or equal to 0.24. In another embodiment, the core portion 102 of the optical fiber 12 has a numerical aperture NA greater than or equal to 0.18 and less than or equal to 0.22. In another embodiment, the core portion 102 of the optical fiber 12 has a numerical aperture NA greater than or equal to 0.185 and less than or equal to 0.215.

In the embodiment of the optical fiber 12 depicted in FIGS. 6 and 9, the core portion 102 of the optical fiber 12 has a graded relative refractive index profile $\Delta_C$ extending from $\Delta_{Cmax}$ at the centerline $C_L$ of the core portion 102 to a relative refractive index value equal to $\Delta_{OC}$ (at the radius $r_T$ of the low-index trench) at the radius $r_C$ of the core portion 102. In embodiments, the core portion 102 of the optical fiber 12 has a graded relative refractive index profile $\Delta_C$ with a core alpha ($\alpha$) that is greater than or equal to 1 and less than or equal to 3. In some embodiments, $\alpha$ of the core portion 102 is greater than or equal to 1.5 and less than or equal to 2.5. In some of these embodiments, $\alpha$ of the core portion 102 is greater than or equal to 1.9 and less than or equal to 2.3.

Still referring to FIGS. 6 and 9, the inner cladding 104 is directly adjacent to and in direct contact with the core portion 102. The inner radius of the inner cladding 104 is equal to the radius $r_C$ of the core portion 102 and the outer radius of the inner cladding 104 (i.e., the radius $r_{IC}$ of the inner cladding 104) is defined as the radius at which the line tangent to the relative refractive index profile of the inner cladding at the radius where $\Delta=0.5(\Delta_{OC}-\Delta_T)$ (i.e., FIG. 9) intersects a line with zero slope extending from the innermost radius of the trench where $\Delta=\Delta_T$ in a direction towards the centerline $C_L$ of the core portion 102.

In the embodiments depicted in FIGS. 6 and 9, the radius $r_{IC}$ of the inner cladding 104 is greater than or equal to 23 microns. In embodiments, the radius $r_{IC}$ is greater than or equal to 23 microns and less than or equal to 30 microns, such as greater than or equal to 24 microns and less than or equal to 28 microns. In some of these embodiments, the radius $r_{IC}$ of the inner cladding 104 is greater than or equal to 25 microns and less than or equal to 28 microns or even greater than or equal to 25 microns and less than or equal to 27 microns.

In embodiments, the radial thickness $T_{IC}$ of the inner cladding 104 is greater than or equal to 0.5 microns and less than or equal to 5 microns. In some embodiments, the radial thickness $T_{IC}$ of the inner cladding 104 is greater than or equal to 1 micron and less than or equal to 4 microns. In some embodiments, the radial thickness $T_{IC}$ of the inner cladding 104 is greater than or equal to 1 micron and less than or equal to 3 microns.

The inner cladding 104 of the optical fiber 12 depicted in FIGS. 6 and 9 has a graded relative refractive index $\Delta_{IC}$ which is greater than the relative refractive index $\Delta_T$ of the low-index trench 106 at radii within the inner cladding 104 less than $r_{IC}$ and equal to the relative refractive index $\Delta_T$ of the low-index trench 106 at the radius $r_{IC}$, thereby forming a region which is "up-doped" relative to the low-index trench 106. In this embodiment, the inner cladding 104 is up-doped with an attenuation dopant, e.g., $TiO_2$. The concentration of the attenuation dopant in the inner cladding 104 may be graded such that the concentration of the attenuation dopant is lowest at the radius $r_{IC}$ and increases from the radius $r_{IC}$ along a direction towards the centerline $C_L$ of the core portion 102.

In the embodiments in which the attenuation dopant is $TiO_2$, the $TiO_2$ concentration in the inner cladding 104 is graded with a maximum concentration at the radius $r_C$ greater than or equal to 0.2 wt. %. In some embodiments, the maximum $TiO_2$ concentration in the inner cladding 104 is greater than or equal to 0.5 wt. %, for example greater than or equal to 1.0 wt. % or even greater than or equal to 1.5 wt. %. In some of these embodiments, the maximum concentration of $TiO_2$ in the inner cladding 104 is greater than or equal to 2.0 wt. % or even greater than or equal to 2.5 wt. %. In still other embodiments, the maximum $TiO_2$ concentration in the inner cladding 104 is greater than or equal to 3.0 wt. % or even greater than or equal to 3.5 wt. %.

In the embodiments described herein, the concentration of the attenuation dopant in the inner cladding 104 is sufficient to increase the relative refractive index of the silica glass of the inner cladding 104 such that the maximum relative refractive index $\Delta_{IC}$ of the inner cladding 104 (e.g., at the radius $r_C$) is greater than or equal to 0.1% and less than or equal to 1.0%. For example, in some embodiments, the maximum relative refractive index $\Delta_{IC}$ of the inner cladding 104 is greater than or equal to 0.15% or even greater than or equal to 0.2% and less than or equal to 0.8%. In some of these embodiments, the maximum relative refractive index $\Delta_{IC}$ of the inner cladding 104 is greater than or equal to 0.2% and less than or equal to 0.6%. In some other embodiments, the maximum relative refractive index $\Delta_{IC}$ of the inner cladding 104 is greater than or equal to 0.3% and less than or equal to 0.7%. For example, in some embodiments, the maximum relative refractive index $\Delta_{IC}$ of the inner cladding 104 is greater than or equal to 0.2% and less than or equal to 0.5%. In some other embodiments, the maximum relative refractive index $\Delta_{IC}$ of the inner cladding 104 is greater than or equal to 0.3% and less than or equal to 0.5%.

Still referring to FIGS. 6 and 9, the low-index trench 106 is directly adjacent to and in direct contact with the inner cladding 104. The inner radius of the low-index trench 106 is equal to the radius $r_{IC}$ of the inner cladding 104 and the outer radius of the low-index trench 106 (i.e., the radius $r_T$ of the low-index trench 106) is defined as the radially outer-most point at which the line tangent to the relative refractive index profile of the low-index trench at the radius where $\Delta=0.5(\Delta_{OC}-\Delta_T)$ (i.e., FIG. 9) crosses the zero delta line ($\Delta_0$).

In the embodiments depicted in FIGS. 6 and 9, the radius $r_T$ of the low-index trench 106 is greater than or equal to 25 microns which improves the bend performance of the optical fiber 12. In embodiments, the radius $r_T$ is greater than or equal to 26 microns and less than or equal to 40 microns, such as greater than or equal to 26 microns and less than or equal to 35 microns.

In embodiments, the radial thickness $T_T$ of the low-index trench 106 is greater than or equal to 1 micron and less than or equal to 15 microns. In some embodiments, the radial thickness $T_T$ of the low-index trench 106 is greater than or equal to 2 microns and less than or equal to 10 microns. In some embodiments, the radial thickness $T_T$ of the low-index trench 106 is greater than or equal to 2 microns and less than or equal to 8 microns or even greater than or equal to 2 microns and less than or equal to 7 microns.

As noted herein, the relative refractive index $\Delta_T$ of the low-index trench 106 is less than the maximum relative refractive index $\Delta_{Cmax}$ of the core portion 102 and the relative refractive index $\Delta_{OC}$ of the outer cladding 108. In the embodiments described herein, the relative refractive index $\Delta_T$ of the low-index trench 106 is generally less than or equal to 0.6% and greater than or equal to −0.6% relative to pure silica glass. In some embodiments, the relative refractive index $\Delta_T$ of the low-index trench 106 is less than or equal to 0.3% and greater than or equal to −0.3%, less than or equal to 0.1% and greater than or equal to −0.1%, or even less than or equal to 0.05% and greater than or equal to −0.05%. For example, in some embodiments, the low-index trench 106 is formed from pure silica glass and the relative refractive index $\Delta_T$ of the low-index trench 106 is 0% as depicted in FIG. 9. In other embodiments, the low-index trench 106 may be formed from silica glass doped with an attenuation dopant such that the relative refractive index $\Delta_T$ is greater than or equal to 0.01% and less than or equal to 0.05% relative to pure silica glass. In the alternative, or in addition to, the low-index trench 106 may be doped with a down-dopant, for example and without limitation fluorine. In some embodiments, the relative refractive index $\Delta_T$ of the low-index trench 106 is essentially flat. That is, the difference between the relative refractive index $\Delta_T$ at any two radii within the low-index trench 106 is less than 0.1%, or even less than 0.05%. In other embodiments the low-index trench 106 may have small fluctuations in the relative refractive index $\Delta_T$ as a result of small profile design or process variations.

In order to achieve good bend performance, the volume $|V_T|$ of the low-index trench 106 is preferably greater than 20% $\Delta$-micron$^2$. In embodiments, the volume $|V_T|$ of the low-index trench 106 may be greater than or equal to 30% $\Delta$-micron$^2$ or even greater than or equal to 40% $\Delta$-micron$^2$. In some of these embodiments, the volume $|V_T|$ of the low-index trench 106 may be greater than or equal to 50% $\Delta$-micron$^2$ or even greater than or equal to 60% $\Delta$-micron$^2$. In some embodiments the volume $|V_T|$ of the low-index trench is greater than or equal to 30% $\Delta$-micron$^2$ and less than or equal to 120% $\Delta$-micron$^2$. In some of these embodiments, the volume $|V_T|$ of the low-index trench is greater than or equal to 40% $\Delta$-micron$^2$ and less than or equal to 100% $\Delta$-micron$^2$.

Still referring to FIGS. 6 and 9, the outer cladding 108 is directly adjacent to and in direct contact with the low-index trench 106. That is, the inner radius of the outer cladding 108 is equal to the radius $r_T$ of the low-index trench 106 and the outer radius of the outer cladding 108 (i.e., radius $r_{OC}$ of the outer cladding 108) is defined as the outer radius of the glass portion of the optical fiber. In the embodiment depicted in FIGS. 6 and 9, the radius $r_{OC}$ of the outer cladding 108 is less than 65 microns. In some embodiments described herein, the radius $r_{OC}$ of the outer cladding 108 of the optical fiber 12 is 62.5 microns. In some embodiments described herein, the radius $r_{OC}$ of the outer cladding 108 of the optical fiber 12 is greater than or equal to 40 microns and less than or equal to 62.5 microns.

The outer cladding 108 of the optical fiber 12 depicted in FIGS. 6 and 9 has a relative refractive index $\Delta_{OC}$ which is greater than the relative refractive index $\Delta_T$ of the low-index trench 106, thereby forming a region which is "up-doped" relative to the low-index trench 106. In embodiments, the concentration of the attenuation dopant is constant along the radial thickness of the outer cladding 108. In other embodiments, the concentration of the attenuation dopant is slightly decreasing along the radial thickness of the outer cladding 108. The outer cladding 108 may be up-doped with the attenuation dopant, e.g., $TiO_2$, as described herein with respect to the cladding portion 103 of the optical fiber 10 depicted in FIGS. 1 and 2.

In the embodiments where the attenuation dopant in the outer cladding is $TiO_2$, the $TiO_2$ concentration in the outer cladding 108 is greater than or equal to 0.2 wt. %. In some embodiments, the $TiO_2$ concentration in the outer cladding 108 is greater than or equal to 0.5 wt. %, for example greater than or equal to 1.0 wt. % or even greater than or equal to 1.5 wt. %. In some of these embodiments, the concentration of $TiO_2$ in the outer cladding 108 is greater than or equal to 2.0 wt. % or even greater than or equal to 2.5 wt. %. In still other embodiments, the $TiO_2$ concentration in the outer cladding 108 is greater than or equal to 3.0 wt. % or even greater than or equal to 3.5 wt. %.

In the embodiments described herein, the concentration of the attenuation dopant in the outer cladding 108 is sufficient to increase the relative refractive index of the silica glass of the outer cladding 108 such that the relative refractive index $\Delta_{OC}$ of the outer cladding 108 is greater than or equal to 0.1% and less than or equal to 1.0%. For example, in some embodiments, the relative refractive index $\Delta_{OC}$ of the outer cladding 108 is greater than or equal to 0.15% or even greater than or equal to 0.2% and less than or equal to 0.8%. In some of these embodiments, the relative refractive index $\Delta_{OC}$ of the outer cladding 108 is greater than or equal to 0.2% and less than or equal to 0.6%. In some other embodiments, the relative refractive index $\Delta_{OC}$ of the outer cladding 108 is greater than or equal to 0.3% and less than or equal to 0.7%. For example, in some embodiments, the relative refractive index $\Delta_{OC}$ of the outer cladding 108 is greater than or equal to 0.2% and less than or equal to 0.5%. In some other embodiments, the relative refractive index $\Delta_{OC}$ of the outer cladding 108 is greater than or equal to 0.3% and less than or equal to 0.5%.

In embodiments, the optical fiber 12 is multi-moded at a wavelength of 850 nm. In embodiments, the optical fiber 12 has an attenuation at 850 nm that is greater than or equal to 0.5 dB/m. In some of these embodiments, the optical fiber 12 has attenuation at 850 nm greater than or equal to 1.0 dB/m. For example, in some embodiments, the attenuation at 850 nm is greater than or equal to 5 dB/m or even greater or equal to 7 dB/m. In some of these embodiments, the attenuation at 850 nm is greater than or equal to 12 dB/m or even greater than or equal to 18 dB/m.

In embodiments, the optical fiber 12 is multi-moded for wavelengths between 800 nm to 1350 nm, for example, the optical fiber 12 may be multi-moded for wavelengths less between 800 and 1000 nm or between 800 and 900 nm. In some embodiments, the optical fiber 12 is multi-moded for wavelengths between 1250 nm and 1350 nm. The optical fiber 12 may have an attenuation for at least one wavelength between 800 nm and 1000 nm that is greater than or equal to 0.5 dB/m. In embodiments, the optical fiber 12 has an attenuation for wavelengths between 800 nm and 1000 nm greater than or equal to 0.5 dB/m, for example greater than or equal to 1.0 dB/m. In some embodiments, the attenuation is greater than or equal to 5 dB/m or even greater or equal to 7 dB/m. In some of these embodiments, the attenuation is greater than or equal to 12 dB/m or even greater than or equal to 18 dB/m.

Still referring to FIGS. 6 and 9, in some embodiments, the 30 mm diameter bend loss of the optical fiber 12 (i.e., when the optical fiber is wound around a 30 mm diameter mandrel for two turns) at 850 nm is less than 0.5 dB, for example less than or equal to 0.4 dB, less than or equal to 0.3 dB, or even less than or equal to 0.2 dB. In some embodiments, the 20 mm bend loss of the optical fiber 12 (i.e., when the optical fiber is wound around a 20 mm diameter mandrel for two turns) at 850 nm is less than or equal to 0.5 dB and the 20 mm bend loss at 1300 nm is less than or equal to 1.0 dB. In some embodiments, the 15 mm diameter bend loss of the optical fiber 12 (i.e., when the optical fiber is wound around a 15 mm diameter mandrel for two turns) at 850 nm is less than 1.0 dB, for example less than or equal to 0.8 dB, less than or equal to 0.6 dB, or even less than or equal to 0.4 dB. For example, in some embodiments the 15 mm diameter bend loss of the optical fiber 12 at 850 nm is less than or equal to 0.3 dB and the 15 mm diameter bend loss at 1300 nm is less than or equal to 0.8 dB. In some embodiments, the 5×10 mm diameter bend loss of the optical fiber 12 (i.e., when the optical fiber is wound around a 10 mm diameter mandrel for five turns) at 850 nm is less than 2.0 dB, for example less than or equal to 1.8 dB, and in some embodiments less than or equal to 1.6 dB, or even less than or equal to 1.4 dB. In some embodiments, the 2×10 mm bend loss of the optical fiber 12 (i.e., when the optical fiber is wound around a 10 mm diameter mandrel for two turns) at 850 nm is less than or equal to 0.8 dB and the 10 mm two turn bend loss at 1300 nm is less than or equal to 1.5 dB.

The optical fibers disclosed herein may be drawn from optical fiber preforms made using conventional manufacturing techniques and using known fiber draw methods and apparatuses, for example, as is disclosed in U.S. Pat. No. 7,565,820, U.S. Pat. No. 5,410,567, U.S. Pat. No. 7,832,675, U.S. Pat. No. 6,027,062, the specifications of which is hereby incorporated by reference. In some embodiments, a preform of silica glass with a core portion doped with an attenuation dopant (e.g., $TiO_2$) and/or an up-dopant (e.g., $GeO_2$) and a cladding portion doped with an attenuation dopant is sintered under non-oxidizing conditions. For example and without limitation, a preform of silica glass with a core portion doped an attenuation dopant and/or an up-dopant and a cladding portion doped with an attenuation dopant is sintered in an atmosphere of dry chlorine ($Cl_2$) gas, helium (H) gas, combinations thereof or the like. In other embodiments, a preform of silica glass with a core portion doped with an attenuation dopant and/or an up-dopant and a cladding portion doped with an attenuation dopant is sintered under reducing conditions. For example and without limitation, a preform of silica glass with a core portion doped with an attenuation dopant and/or an up-dopant and a cladding portion doped with an attenuation dopant is sintered in an atmosphere of carbon monoxide (CO), carbon tetrachloride ($CCl_4$), methane ($CH_4$), hydrogen ($H_2$), deuterium ($D_2$), a combination thereof or the like. In embodiments where preforms of silica glass with a core portion is doped with the attenuation dopant $TiO_2$, sintering of the preform in non-oxidizing or reducing conditions, an increase in $Ti^{3+}$ ions is generated in the preforms and present in optical fibers drawn from the preforms. It is understood that an increase in $Ti^{3+}$ ions in the optical fibers provides additional process levers to form attenuating optical fibers since $Ti^{3+}$ ions attenuate wavelengths of light within a range from 800 nm to 1000 nm. Processes for making the optical fiber preforms may include outside vapor deposition (OVD), inside vapor deposition (IVD), vapor axial deposition (VAD), chemical vapor deposition (CVD), modified chemical vapor deposition (MCVD), plasma enhanced chemical vapor deposition (PCVD), or the like. A preform of silica glass with a core portion doped with an attenuation dopant and/or an up-dopant and a cladding portion doped with an attenuation dopant may include a low-index trench portion of pure silica glass, or in the alternative include a low-index trench of silica glass doped with a down-dopant (e.g., fluorine). Optical fibers as described herein are drawn from a sintered preform of silica glass a core portion doped with an attenuation dopant and/or an up-dopant and a cladding portion doped with an attenuation dopant. The drawn optical fibers have optical properties as described herein and may be cut to a desired length and assembled as part of a fixed attenuator, e.g., as an attenuating optical fiber in a receptacle style attenuator or a loopback style attenuator.

EXAMPLES

The embodiments described herein will be further clarified by the following examples.

Example 1

Twelve optical fiber designs (FIGS. 10-21) were mathematically modeled and three optical fiber designs were manufactured (FIGS. 22, 24, 26) and tested to determine the optical properties (FIGS. 23, 25, 27, 28) of the fibers. Five of the optical fiber designs (FIGS. 10-14) were modeled with a core portion doped with an up-dopant having a graded concentration and an attenuation dopant having a constant concentration. Five of the optical fiber designs (FIGS. 15-19) were modeled with a core portion doped with an up-dopant and an attenuation dopant with both dopants having graded concentrations. Two of the optical fiber designs (FIGS. 20-21) were modeled with a core portion doped with an attenuation dopant only having a graded concentration. All of the optical fiber designs were modeled with a radius $r_{OC}$ of 62.5 microns.

Figure 10:
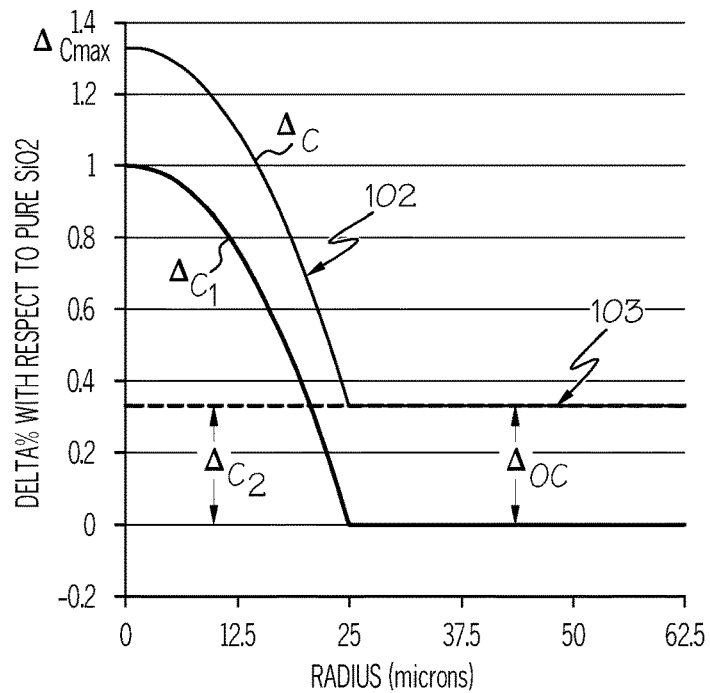
FIG. 10 graphically depicts a modeled relative refractive index profile for an optical fiber design according to FIGS. 1 and 2 as a function of the radius R of the glass portion of the optical fiber.

Referring now to FIGS. 1, 2 and 10, the optical fiber 10 was modeled with a core portion 102 doped with a graded concentration of $GeO_2$, the core portion doped with a constant concentration of $TiO_2$, and a cladding portion 103 doped with a constant concentration of $TiO_2$. The core portion 102 had a radius $r_C$ of 25 microns. The concentrations of $GeO_2$ in the core portion 102 for the optical fiber design depicted in FIG. 10 was graded such that the concentration of $GeO_2$ was the lowest at the radius $r_C$ of 25 microns and increased from the radius $r_C$ along a direction towards the centerline $C_L$ of the core portion 102. The graded concentration of $GeO_2$ provided a core portion 102 comprising a graded relative refractive index $\Delta_{C1}$ of 0% at the radius $r_C$ and a $\Delta_{C1}$ of 1.0% at the centerline $C_L$ of the core portion 102. The $TiO_2$ concentration for the core portion 102 of the optical fiber design depicted in FIG. 10 was constant from the centerline $C_L$ of the core portion 102 to the radius $r_C$ of the core portion 102. Particularly, the $TiO_2$ concentration for the optical fiber design depicted in FIG. 10 provided a core portion 102 comprising a constant relative refractive index $\Delta_{C2}$ of 0.33% from the centerline $C_L$ of the core portion 102 to the radius $r_C$. The graded concentration of $GeO_2$ and constant concentration of $TiO_2$ provided the core portion 102 with an overall or cumulative relative refractive index of 0.33% at the radius $r_C$ and 1.33% ($\Delta_{Cmax}$) at the centerline $C_L$ of the core portion 102. The $TiO_2$ concentration for the cladding portion 103 of the optical fiber design depicted in FIG. 10 was constant from the radius of the core portion 102 (i.e., radius $r_C$) to the radius $r_{OC}$ of the cladding portion 103. Particularly, the $TiO_2$ concentration provided a cladding portion 103 comprising a constant relative refractive index $\Delta_{OC}$ of 0.33% from the radius $r_C$ to the radius $r_{OC}$.

Figure 11:
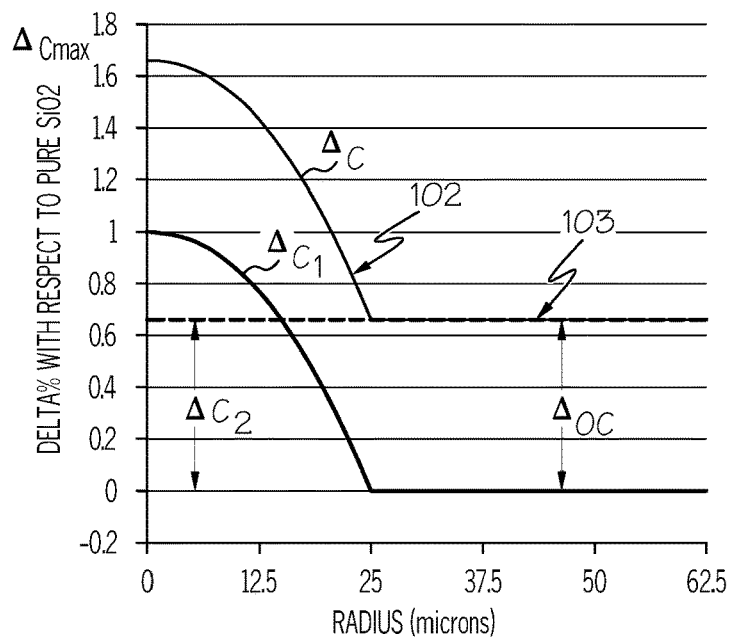
FIG. 11 graphically depicts a modeled relative refractive index profile for an optical fiber design according to FIGS. 1 and 2 as a function of the radius R of the glass portion of the optical fiber.

Referring now to FIGS. 1, 2 and 11, the optical fiber 10 was modeled with a core portion 102 doped with $GeO_2$ similar to the optical fiber design depicted in FIG. 10, but with a higher concentration of $TiO_2$ doping in the core portion 102 and cladding portion 103. The core portion 102 had a radius $r_C$ of 25 microns. The concentrations of $GeO_2$ in the core portion 102 for the optical fiber design depicted in FIG. 11 was graded such that the concentration of $GeO_2$ was the lowest at the radius $r_C$ of 25 microns and increased from the radius $r_C$ along a direction towards the centerline $C_L$ of the core portion 102. The graded concentration of $GeO_2$ provided a core portion 102 comprising a graded relative refractive index $\Delta_{C1}$ of 0% at the radius $r_C$ and a $\Delta_{C1}$ of 1.0% at the centerline $C_L$ of the core portion 102. The $TiO_2$ concentration for the core portion 102 of the optical fiber designs depicted in FIG. 11 was constant from the centerline $C_L$ of the core portion 102 to the radius $r_C$ of the core portion 102. Particularly, the $TiO_2$ concentration for the optical fiber design depicted in FIG. 11 provided a core portion 102 comprising a constant relative refractive index $\Delta_{C2}$ of 0.66% from the centerline $C_L$ of the core portion 102 to the radius $r_C$. The graded concentration of $GeO_2$ and constant concentration of $TiO_2$ provided the core portion 102 with an overall or cumulative relative refractive index of 0.66% at the radius $r_C$ and 1.66% ($\Delta_{Cmax}$) at the centerline $C_L$ of the core portion 102. The $TiO_2$ concentration for the cladding portion 103 of the optical fiber design depicted in FIG. 11 was constant from the radius of the core portion 102 (i.e., radius $r_C$) to the radius $r_{OC}$ of the cladding portion 103. Particularly, the $TiO_2$ concentration provided a cladding portion 103 comprising a constant relative refractive index $\Delta_{OC}$ of 0.66% from the radius $r_C$ to the radius $r_{OC}$.

Figure 12:
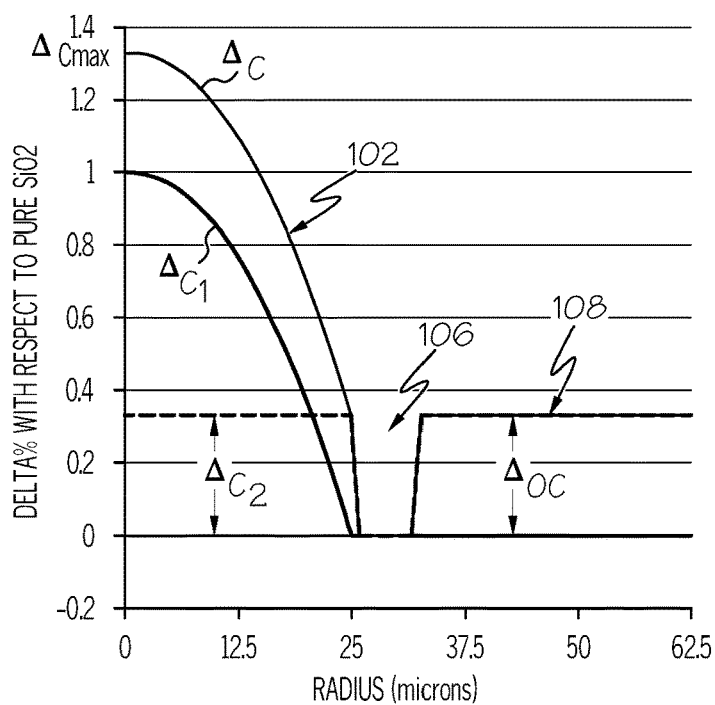
FIG. 12 graphically depicts a modeled relative refractive index profile for an optical fiber design according to FIGS. 3 and 4 as a function of the radius R of the glass portion of the optical fiber.

Referring now to FIGS. 3, 4 and 12, the optical fiber 11 was modeled with a core portion 102 doped with a graded concentration of $GeO_2$ and a constant concentration of $TiO_2$, a low-index trench 106 formed from pure $SiO_2$ and an outer cladding 108 doped with $TiO_2$. The core portion had a radius $r_C$ of 25 microns and the low-index trench had a radial thickness $T_T$ of 6 microns and a volume $|V_T|$ of 112.4% $\Delta$-$micron^2$. The concentration of $GeO_2$ in the core portion 102 for the optical fiber design depicted in FIG. 12 was graded such that the concentration of $GeO_2$ was the lowest at the radius $r_C$ of 25 microns and increased from the radius $r_C$ along a direction towards the centerline $C_L$ of the core portion 102. The graded concentration of $GeO_2$ provided a core portion 102 comprising a graded relative refractive index $\Delta_{C1}$ of 0% at the radius $r_C$ and a $\Delta_{C1}$ of 1.0% at the centerline $C_L$ of the core portion 102. The $TiO_2$ concentration for the core portion 102 of the optical fiber design depicted in FIG. 12 was constant from the centerline $C_L$ of the core portion 102 to the radius $r_C$ of the core portion 102. Particularly, the $TiO_2$ concentration for the optical fiber design depicted in FIG. 12 provided a core portion 102 comprising a constant relative refractive index $\Delta_{C2}$ of 0.33% from the centerline $C_L$ of the core portion 102 to the radius $r_C$. The graded concentration of $GeO_2$ and constant concentration of $TiO_2$ in the core portion 102 provided the core portion 102 with an overall or cumulative relative refractive index of 0.33% at the radius $r_C$ and 1.33% ($\Delta_{Cmax}$) at the centerline $C_L$ of the core portion 102. The low-index trench 106 was formed from pure $SiO_2$ and had a $\Delta_T$ of 0%. The $TiO_2$ concentration for the outer cladding 108 of the optical fiber design depicted in FIG. 12 was constant from the radius of the low-index trench 106 (i.e., radius $r_T$) to the radius $r_{OC}$ of the outer cladding 108. Particularly, the $TiO_2$ concentration provided an outer cladding 108 comprising a constant relative refractive index $\Delta_{OC}$ of 0.33% from the radius $r_T$ to the radius $r_{OC}$. It is understood from FIG. 12 that the relative refractive index $\Delta_{OC}$ for the outer cladding 108 was generally equal to the relative refractive index $\Delta_{C2}$ of the core portion 102.

Figure 13:
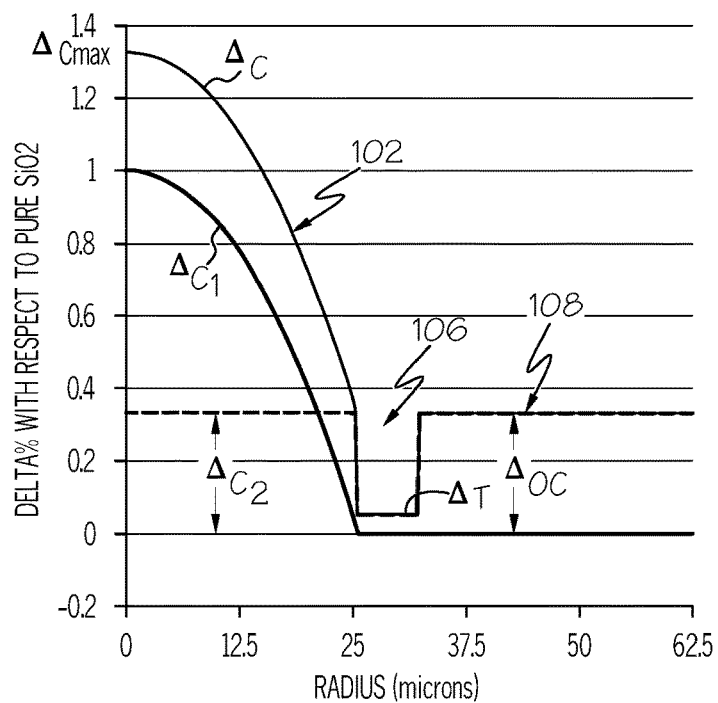
FIG. 13 graphically depicts a modeled relative refractive index profile for an optical fiber design according to FIGS. 3 and 5 as a function of the radius R of the glass portion of the optical fiber.

Referring now to FIGS. 3, 5 and 13, the optical fiber 11 was modeled with a core portion 102 and outer cladding 106 doped with $GeO_2$ and $TiO_2$ similar to the optical fiber design depicted in FIG. 12, but the low-index trench 106 was modeled with $SiO_2$ doped with $TiO_2$. The core portion had a radius of 24.5 microns and the low-index trench had a radial thickness $T_T$ of 7 microns, a relative refractive index of 0.05%, and a volume $|V_T|$ of 106.8% $\Delta$-$micron^2$. The concentration of $GeO_2$ in the core portion 102 for the optical fiber design depicted in FIG. 13 was graded such that the concentration of $GeO_2$ was the lowest at the radius $r_C$ of 25 microns and increased from the radius $r_C$ along a direction towards the centerline $C_L$ of the core portion 102. The graded concentration of $GeO_2$ provided a core portion 102 comprising a graded relative refractive index $\Delta_{C1}$ of 0% at the radius $r_C$ and a $\Delta_{C1}$ of 1.0% at the centerline $C_L$ of the core portion 102. The $TiO_2$ concentration for the core portion 102 of the optical fiber design depicted in FIG. 13 was constant from the centerline $C_L$ of the core portion 102 to the radius $r_C$ of the core portion 102. Particularly, the $TiO_2$ concentration for the optical fiber design depicted in FIG. 13 provided a core portion 102 comprising a constant relative refractive index $\Delta_{C2}$ of 0.33% from the centerline $C_L$ of the core portion 102 to the radius $r_C$. The graded concentration of $GeO_2$ and constant concentration of $TiO_2$ in the core portion 102 provided the core portion 102 with an overall or cumulative relative refractive index of 0.33% at the radius $r_C$ and 1.33% ($\Delta_{Cmax}$) at the centerline $C_L$ of the core portion 102. The $TiO_2$ concentration for the low-index trench 106 of the optical fiber design depicted in FIG. 13 was constant from the radius $r_C$ of the core portion 102 to the radius $r_T$ of the low-index trench 106. Particularly, the $TiO_2$ concentration for the optical fiber design depicted in FIG. 13 provided a low-index trench 106 comprising a constant relative refractive index $\Delta_T$ of 0.05% from the radius $r_C$ to the radius $r_T$. The $TiO_2$ concentration for the outer cladding 108 of the optical fiber design depicted in FIG. 13 was constant from the radius of the low-index trench 106 (i.e., radius $r_T$) to the radius $r_{OC}$ of the outer cladding 108. Particularly, the $TiO_2$ concentration provided an outer cladding 108 comprising a constant relative refractive index $\Delta_{OC}$ of 0.33% from the radius $r_T$ to the radius $r_{OC}$. It is understood from FIG. 15 that the relative refractive index $\Delta_{OC}$ for the outer cladding 108 was generally equal to the relative refractive index $\Delta_{C2}$ of the core portion 102.

Figure 14:
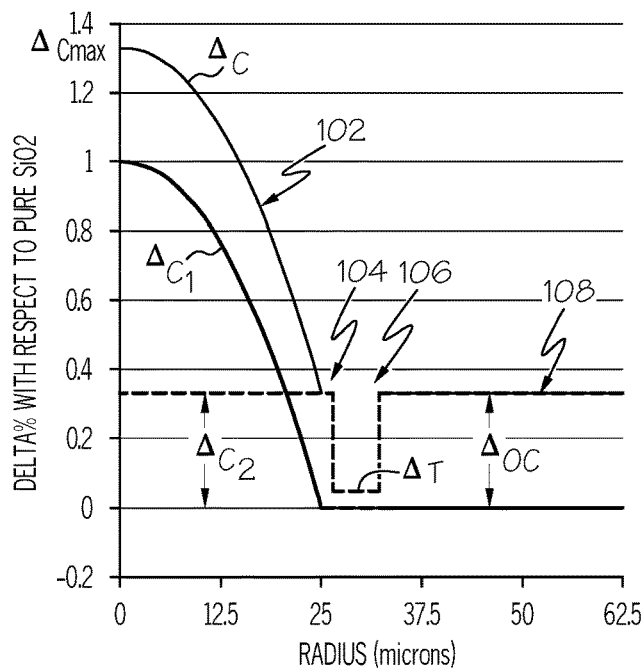
FIG. 14 graphically depicts a modeled relative refractive index profile for an optical fiber design according to FIGS. 6 and 7 as a function of the radius R of the glass portion of the optical fiber.

Referring now to FIGS. 6, 7 and 14, the optical fiber 12 was modeled with a core portion 102 doped with a graded concentration of $GeO_2$ and a constant concentration of $TiO_2$, an inner cladding 104 doped with $TiO_2$, a low-index trench 106 doped with $TiO_2$ and an outer cladding 108 doped with $TiO_2$. The core portion 102 had a radius $r_C$ of 25 microns, the inner cladding had a radial thickness $T_{IC}$ of 1.5 microns and the low-index trench had a radial thickness $T_T$ of 5.5 microns, a relative refractive index of 0.05%, and a volume $|V_T|$ of 90.5% $\Delta$-micron$^2$. The concentration of $GeO_2$ in the core portion 102 for the optical fiber design depicted in FIG. 14 was graded such that the concentration of $GeO_2$ was the lowest at the radius $r_C$ of 25 microns and increased from the radius $r_C$ along a direction towards the centerline $C_L$ of the core portion 102. The graded concentration of $GeO_2$ provided a core portion 102 comprising a graded relative refractive index $\Delta_{C1}$ of 0% at the radius $r_C$ and a $\Delta_{C1}$ of 1.0% at the centerline $C_L$ of the core portion 102. The $TiO_2$ concentration for the core portion 102 of the optical fiber design depicted in FIG. 14 was constant from the centerline $C_L$ of the core portion 102 to the radius $r_C$ of the core portion 102. Particularly, the $TiO_2$ concentration for the optical fiber design depicted in FIG. 14 provided a core portion 102 comprising a constant relative refractive index $\Delta_{C2}$ of 0.33% from the centerline $C_L$ of the core portion 102 to the radius $r_C$. The graded concentration of $GeO_2$ and constant concentration of $TiO_2$ in the core portion 102 provided the core portion 102 with an overall or cumulative relative refractive index of 0.33% at the radius $r_C$ and 1.33% ($\Delta_{Cmax}$) at the centerline $C_L$ of the core portion 102. The concentration of $TiO_2$ in the inner cladding 104 was constant from the inner radius $r_C$ to the radius $r_{IC}$ and provided an inner cladding 104 comprising a constant relative refractive index IC of 0.33%. It is understood from FIG. 14 that the constant relative refractive index $\Delta_{IC}$ of the inner cladding 104 is equal to the constant relative refractive index $\Delta_{C2}$ in the core portion 102. That is, the constant concentration of $TiO_2$ in the inner cladding 104 is equal to the constant concentration of $TiO_2$ in the core portion 102. The $TiO_2$ concentration for the low-index trench 106 of the optical fiber design depicted in FIG. 13 was constant from the radius $r_C$ of the core portion 102 to the radius $r_T$ of the low-index trench 106. Particularly, the $TiO_2$ concentration for the optical fiber design depicted in FIG. 14 provided a low-index trench 106 comprising a constant relative refractive index $\Delta_T$ of 0.05% from the radius $r_C$ to the radius $r_T$. The $TiO_2$ concentration for the outer cladding 108 of the optical fiber design depicted in FIG. 14 was constant from the radius of the low-index trench 106 (i.e., radius $r_T$) to the radius $r_{OC}$ of the outer cladding 108. Particularly, the $TiO_2$ concentration provided an outer cladding 108 comprising a constant relative refractive index $\Delta_{OC}$ of 0.33% from the radius $r_T$ to the radius $r_{OC}$. It is understood from FIG. 14 that the relative refractive index $\Delta_{OC}$ for the outer cladding 108 is generally equal to the relative refractive index $\Delta_{C2}$ of the core portion 102 and the relative refractive index $\Delta_{IC}$ of the inner cladding 104.

Figure 15:
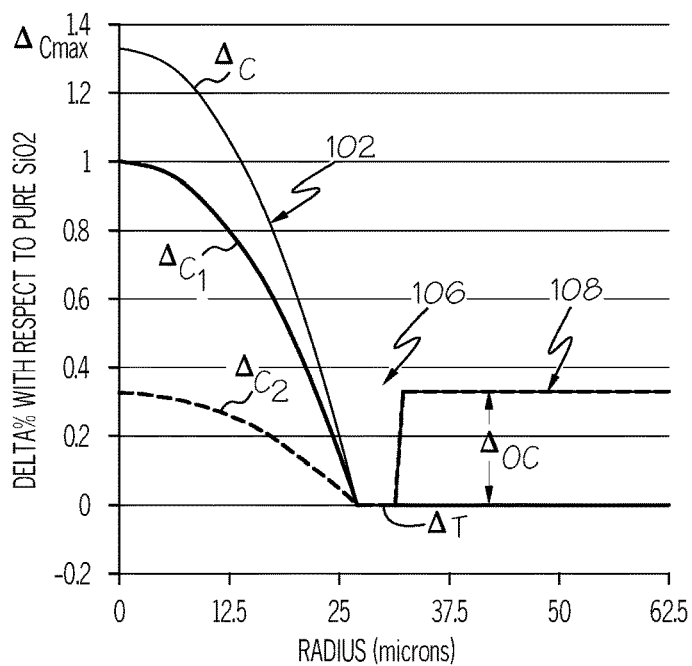
FIG. 15 graphically depicts a modeled relative refractive index profile for an optical fiber design according to FIGS. 3 and 8 as a function of the radius R of the glass portion of the optical fiber.

Referring now to FIGS. 6, 8 and 15, the optical fiber 11 was modeled with the core portion 102 and the inner cladding portion 104 doped with graded concentrations of $GeO_2$ and $TiO_2$, a low-index trench 106 formed from pure $SiO_2$ and an outer cladding 108 doped with $TiO_2$. The core portion 102 had a radius of 23.5 microns, the inner cladding had a radial thickness $T_{IC}$ of 3.5 microns, and the low-index trench had a radial thickness of 4.5 microns and a volume $|V_T|$ of 120.7% $\Delta$-micron$^2$. The concentration of $GeO_2$ in the core portion 102 and the inner cladding portion 104 for the optical fiber design depicted in FIG. 15 was graded such that the concentration of $GeO_2$ was the lowest at the radius $r_{IC}$ of 27 microns and increased from the radius $r_{IC}$ along a direction towards the centerline $C_L$ of the core portion 102. The graded concentration of $GeO_2$ provided a core portion 102 comprising a graded relative refractive index $\Delta_{C1}$ of 0% at the radius $r_C$ and a $\Delta_{C1}$ of 1.0% at the centerline $C_L$ of the core portion 102. The $TiO_2$ concentration for the core portion 102 and the inner cladding portion 104 of the optical fiber design depicted in FIG. 15 was graded such that the concentration of $TiO_2$ was the lowest at the radius $r_{IC}$ of 27 microns and increased from the radius $r_{IC}$ along a direction towards the centerline $C_L$ of the core portion 102. The graded concentration of $TiO_2$ provided a core portion 102 comprising a graded relative refractive index $\Delta_{C2}$ generally less than the graded relative refractive index $\Delta_{C1}$, i.e., the graded relative refractive index $\Delta_{C2}$ was 0% at the radius $r_C$ and a $\Delta_{C2}$ of 0.33% at the centerline $C_L$ of the core portion 102. The graded concentration of $GeO_2$ and graded concentration of $TiO_2$ in the core portion 102 provided the core portion 102 with an overall or cumulative relative refractive index of 0% at the radius $r_C$ and 1.33% ($\Delta_{Cmax}$) at the centerline $C_L$ of the core portion 102. The low-index trench 106 was formed from pure SiO2 and had a $\Delta_T$ of 0%. The $TiO_2$ concentration for the outer cladding 108 of the optical fiber design depicted in FIG. 15 was constant from the radius of the low-index trench 106 (i.e., radius $r_T$) to the radius $r_{OC}$ of the outer cladding 108. Particularly, the $TiO_2$ concentration provided an outer cladding 108 comprising a constant relative refractive index $\Delta_{OC}$ of 0.33% from the radius $r_T$ to the radius $r_{OC}$.

Figure 16:
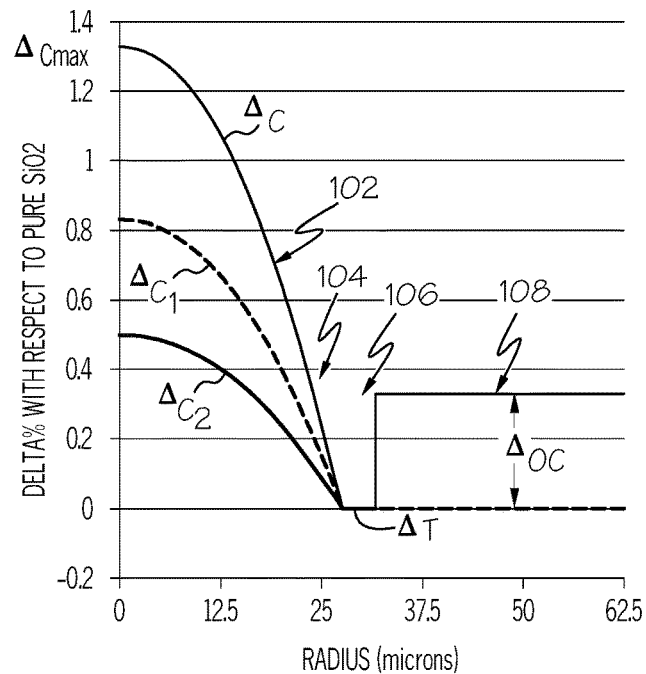
FIG. 16 graphically depicts a modeled relative refractive index profile for an optical fiber design according to FIGS. 3 and 8 as a function of the radius R of the glass portion of the optical fiber.

Referring now to FIGS. 6, 8 and 16, the optical fiber 11 was modeled with the core portion 102 and the inner cladding portion 104 doped with graded concentrations of $GeO_2$ and $TiO_2$, a low-index trench 106 formed from pure $SiO_2$ and an outer cladding 108 doped with $TiO_2$. The core portion had a radius $r_C$ of 23.5 microns, the inner cladding had a radial thickness $T_{IC}$ of 3.5 microns, and the low-index trench had a radial thickness $T_T$ of 5 microns and a volume $|V_T|$ of 128.6% $\Delta$-micron$^2$. The concentration of $GeO_2$ in the core portion 102 and the inner cladding portion 104 for the optical fiber design depicted in FIG. 16 was graded such that the concentration of $GeO_2$ was the lowest at the radius $r_{IC}$ of 27 microns and increased from the radius $r_{IC}$ along a direction towards the centerline $C_L$ of the core portion 102. The graded concentration of $GeO_2$ provided a core portion 102 comprising a graded relative refractive index $\Delta_{C1}$ of 0% at the radius $r_C$ and a $\Delta_{C1}$ of 0.5% at the centerline $C_L$ of the core portion 102. The $TiO_2$ concentration for the core portion 102 and the inner cladding portion 104 of the optical fiber design depicted in FIG. 16 was graded such that the concentration of $TiO_2$ was the lowest at the radius $r_{IC}$ of 27 microns and increased from the radius $r_{IC}$ along a direction towards the centerline $C_L$ of the core portion 102. The graded concentration of $TiO_2$ provided a core portion 102 comprising a graded relative refractive index $\Delta_{C2}$ generally greater than the graded relative refractive index $\Delta_{C1}$, i.e., the graded relative refractive index $\Delta_{C2}$ was 0% at the radius $r_C$ and a $\Delta_{C2}$ of 0.83% at the centerline $C_L$ of the core portion 102. The graded concentration of $GeO_2$ and graded concentration of $TiO_2$ in the core portion 102 provided the core portion 102 with an overall or cumulative relative refractive index of 0% at the radius $r_C$ and 1.33% ($\Delta_{Cmax}$) at the centerline $C_L$ of the core portion 102. The low-index trench 106 was formed from pure SiO2 and had a $\Delta_T$ of 0%. The $TiO_2$ concentration for the outer cladding 108 of the optical fiber design depicted in FIG. 16 was constant from the radius of the low-index trench 106 (i.e., radius $r_T$) to the radius $r_{OC}$ of the outer cladding 108. Particularly, the $TiO_2$ concentration provided an outer cladding 108 comprising a constant relative refractive index $\Delta_{OC}$ of 0.33% from the radius $r_T$ to the radius $r_{OC}$.

Figure 17:
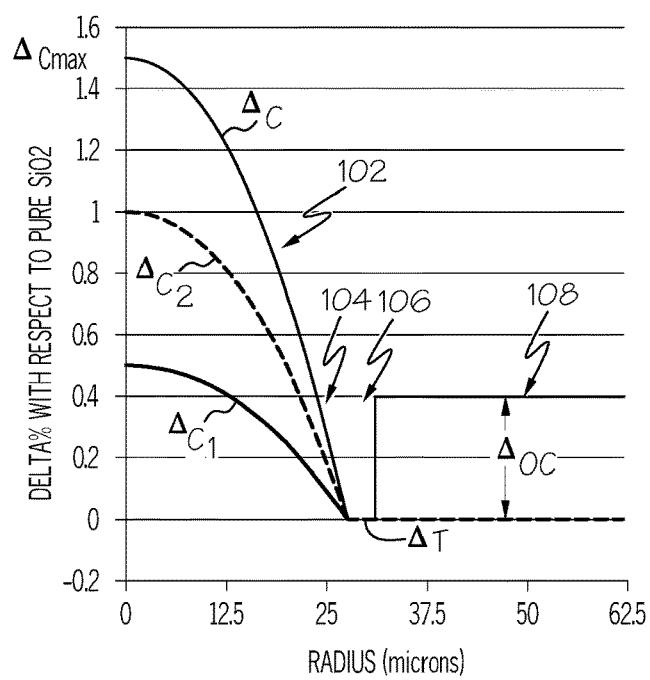
FIG. 17 graphically depicts a modeled relative refractive index profile for an optical fiber design according to FIGS. 3 and 8 as a function of the radius R of the glass portion of the optical fiber.

Referring now to FIGS. 6, 8 and 17, the optical fiber 11 was modeled with the core portion 102 and the inner cladding portion 104 doped with graded concentrations of $GeO_2$ and $TiO_2$, a low-index trench 106 formed from pure $SiO_2$ and an outer cladding 108 doped with $TiO_2$. The core portion had a radius $r_C$ of 24 microns, the inner cladding had a radial thickness $T_{IC}$ of 4 microns, and the low-index trench had a radial thickness $T_T$ of 3 microns and a volume $|V_T|$ of 114.0% $\Delta$-micron$^2$. The concentration of $GeO_2$ in the core portion 102 and the inner cladding portion 104 for the optical fiber design depicted in FIG. 17 was graded such that the concentration of $GeO_2$ was the lowest at the radius $r_{IC}$ of 28 microns and increased from the radius $r_{IC}$ along a direction towards the centerline $C_L$ of the core portion 102. The graded concentration of $GeO_2$ provided a core portion 102 comprising a graded relative refractive index $\Delta_{C1}$ of 0% at the radius $r_C$ and a $\Delta_{C1}$ of 0.5% at the centerline $C_L$ of the core portion 102. The $TiO_2$ concentration for the core portion 102 and the inner cladding portion 104 of the optical fiber design depicted in FIG. 17 was graded such that the concentration of $TiO_2$ was the lowest at the radius $r_{IC}$ of 28 microns and increased from the radius $r_{IC}$ along a direction towards the centerline $C_L$ of the core portion 102. The graded concentration of $TiO_2$ provided a core portion 102 comprising a graded relative refractive index $\Delta_{C2}$ generally greater than the graded relative refractive index $\Delta_{C1}$, i.e., the graded relative refractive index $\Delta_{C2}$ was 0% at the radius $r_C$ and a $\Delta_{C2}$ of 1.0% at the centerline $C_L$ of the core portion 102. The graded concentration of $GeO_2$ and graded concentration of $TiO_2$ in the core portion 102 provided the core portion 102 with an overall or cumulative relative refractive index of 0% at the radius $r_C$ and 1.5% ($\Delta C_{max}$) at the centerline $C_L$ of the core portion 102. The low-index trench 106 was formed from pure $SiO_2$ and had a $\Delta_T$ of 0%. The $TiO_2$ concentration for the outer cladding 108 of the optical fiber design depicted in FIG. 16 was constant from the radius of the low-index trench 106 (i.e., radius $r_T$) to the radius $r_{OC}$ of the outer cladding 108. Particularly, the $TiO_2$ concentration provided an outer cladding 108 comprising a constant relative refractive index $\Delta_{OC}$ of 0.4% from the radius $r_T$ to the radius $r_{OC}$.

Figure 18:
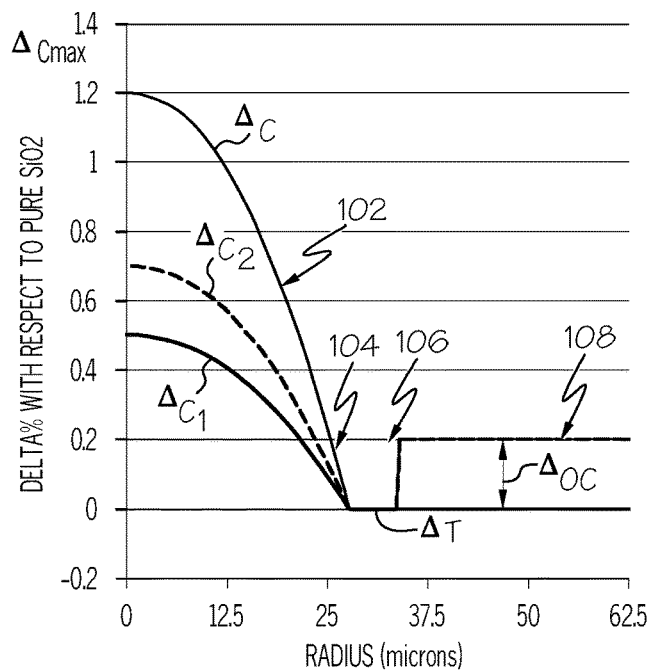
FIG. 18 graphically depicts a modeled relative refractive index profile for an optical fiber design according to FIGS. 3 and 8 as a function of the radius R of the glass portion of the optical fiber.

Referring now to FIGS. 6, 8 and 18, the optical fiber 11 was modeled with the core portion 102 and the inner cladding portion 104 doped with graded concentrations of $GeO_2$ and $TiO_2$, a low-index trench 106 formed from pure $SiO_2$ and an outer cladding 108 doped with $TiO_2$. The core portion had a radius $r_C$ of 25.5 microns, the inner cladding had a radial thickness $T_{IC}$ of 2.5 microns, and the low-index trench had a radial thickness $T_T$ of 6 microns and a volume $|V_T|$ of 85.2% $\Delta$-micron$^2$. The concentration of $GeO_2$ in the core portion 102 and the inner cladding portion 104 for the optical fiber design depicted in FIG. 18 was graded such that the concentration of $GeO_2$ was the lowest at the radius $r_{IC}$ of 28 microns and increased from the radius $r_{IC}$ along a direction towards the centerline $C_L$ of the core portion 102. The graded concentration of $GeO_2$ provided a core portion 102 comprising a graded relative refractive index $\Delta_{C1}$ of 0% at the radius $r_C$ and a $\Delta_{C1}$ of 0.5% at the centerline $C_L$ of the core portion 102. The $TiO_2$ concentration for the core portion 102 and the inner cladding portion 104 of the optical fiber design depicted in FIG. 18 was graded such that the concentration of $TiO_2$ was the lowest at the radius $r_{IC}$ of 28 microns and increased from the radius $r_{IC}$ along a direction towards the centerline $C_L$ of the core portion 102. The graded concentration of $TiO_2$ provided a core portion 102 comprising a graded relative refractive index $\Delta_{C2}$ generally greater than the graded relative refractive index $\Delta_{C1}$, i.e., the graded relative refractive index $\Delta_{C2}$ was 0% at the radius $r_C$ and 0.7% at the centerline $C_L$ of the core portion 102. The graded concentration of $GeO_2$ and graded concentration of $TiO_2$ in the core portion 102 provided the core portion 102 with an overall or cumulative relative refractive index of 0% at the radius $r_C$ and 1.2% ($\Delta C_{max}$) at the centerline $C_L$ of the core portion 102. The low-index trench 106 was formed from pure $SiO_2$ and had a $\Delta_T$ of 0%. The $TiO_2$ concentration for the outer cladding 108 of the optical fiber design depicted in FIG. 16 was constant from the radius of the low-index trench 106 (i.e., radius $r_T$) to the radius $r_{OC}$ of the outer cladding 108. Particularly, the $TiO_2$ concentration provided an outer cladding 108 comprising a constant relative refractive index $\Delta_{OC}$ of 0.2% from the radius $r_T$ to the radius $r_{OC}$.

Figure 19:
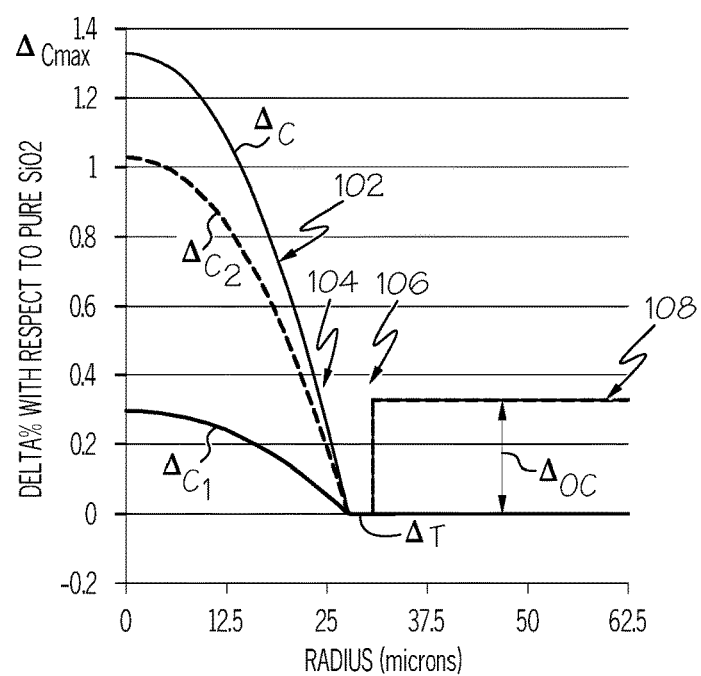
FIG. 19 graphically depicts a modeled relative refractive index profile for an optical fiber design according to FIGS. 3 and 8 as a function of the radius R of the glass portion of the optical fiber.

Referring now to FIGS. 6, 8 and 19, the optical fiber 11 was modeled with the core portion 102 and the inner cladding portion 104 doped with graded concentrations of $GeO_2$ and $TiO_2$, a low-index trench 106 formed from pure $SiO_2$ and an outer cladding 108 doped with $TiO_2$. The core portion had a radius $r_C$ of 24.5 microns, the inner cladding had a radial thickness $T_{IC}$ of 3 microns, and the low-index trench had a radial thickness $T_T$ of 3 microns and a volume $|V_T|$ of 79.0% $\Delta$-micron$^2$. The concentration of $GeO_2$ in the core portion 102 and the inner cladding portion 104 for the optical fiber design depicted in FIG. 19 was graded such that the concentration of $GeO_2$ was the lowest at the radius $r_{IC}$ of 27.5 microns and increased from the radius $r_{IC}$ along a direction towards the centerline $C_L$ of the core portion 102. The graded concentration of $GeO_2$ provided a core portion 102 comprising a graded relative refractive index $\Delta_{C1}$ of 0% at the radius $r_C$ and a $\Delta_{C1}$ of 0.3% at the centerline $C_L$ of the core portion 102. The $TiO_2$ concentration for the core portion 102 and the inner cladding portion 104 of the optical fiber design depicted in FIG. 19 was graded such that the concentration of $TiO_2$ was the lowest at the radius $r_{IC}$ of 27.5 microns and increased from the radius $r_{IC}$ along a direction towards the centerline $C_L$ of the core portion 102. The graded concentration of $TiO_2$ provided a core portion 102 comprising a graded relative refractive index $\Delta_{C2}$ generally greater than the graded relative refractive index $\Delta_{C1}$, i.e., the graded relative refractive index $\Delta_{C2}$ was 0% at the radius $r_C$ and 1.03% at the centerline $C_L$ of the core portion 102. The graded concentration of $GeO_2$ and graded concentration of $TiO_2$ in the core portion 102 provided the core portion 102 with an overall or cumulative relative refractive index of 0% at the radius $r_C$ and 1.33% ($\Delta C_{max}$) at the centerline $C_L$ of the core portion 102. The low-index trench 106 was formed from pure $SiO_2$ and had a $\Delta_T$ of 0%. The $TiO_2$ concentration for the outer cladding 108 of the optical fiber design depicted in FIG. 19 was constant from the radius of the low-index trench 106 (i.e., radius $r_T$) to the radius $r_{OC}$ of the outer cladding 108. Particularly, the $TiO_2$ concentration provided an outer cladding 108 comprising a constant relative refractive index $\Delta_{OC}$ of 0.3% from the radius $r_T$ to the radius $r_{OC}$.

Figure 20:
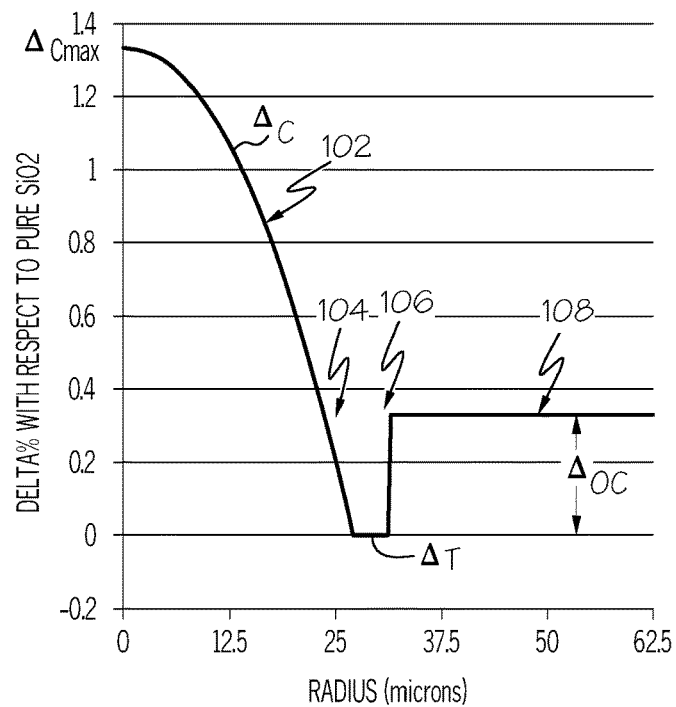
FIG. 20 graphically depicts a modeled relative refractive index profile for an optical fiber design according to FIGS. 3 and 9 as a function of the radius R of the glass portion of the optical fiber.

Referring now to FIGS. 6, 8 and 20, the optical fiber 11 was modeled with the core portion 102 and the inner cladding portion 104 doped only with a graded concentration of $TiO_2$, a low-index trench 106 formed from pure $SiO_2$ and an outer cladding 108 doped with $TiO_2$. The core portion had a radius $r_C$ of 23.5 microns, the inner cladding had a radial thickness $T_{IC}$ of 3.5 microns, and the low-index trench had a radial thickness $T_T$ of 4.5 microns and a volume $|V_T|$ of 118.1% $\Delta$-micron$^2$. The concentration of $TiO_2$ in the core portion 102 and the inner cladding portion 104 for the optical fiber design depicted in FIG. 20 was graded such that the concentration of $TiO_2$ was the lowest at the radius $r_{IC}$ of 27 microns and increased from the radius $r_{IC}$ along a direction towards the centerline $C_L$ of the core portion 102. The graded concentration of $TiO_2$ provided a core portion 102 comprising a graded relative refractive index with a relative refractive index of 0% at the radius $r_C$ and 1.33% ($\Delta C_{max}$) at the centerline $C_L$ of the core portion 102. The low-index trench 106 was formed from pure SiO2 and had a $\Delta_T$ of 0%. The $TiO_2$ concentration for the outer cladding 108 of the optical fiber design depicted in FIG. 20 was constant from the radius of the low-index trench 106 (i.e., radius $r_T$) to the radius $r_{OC}$ of the outer cladding 108. Particularly, the $TiO_2$ concentration provided an outer cladding 108 comprising a constant relative refractive index $\Delta_{OC}$ of 0.33% from the radius $r_T$ to the radius $r_{OC}$.

Figure 21:
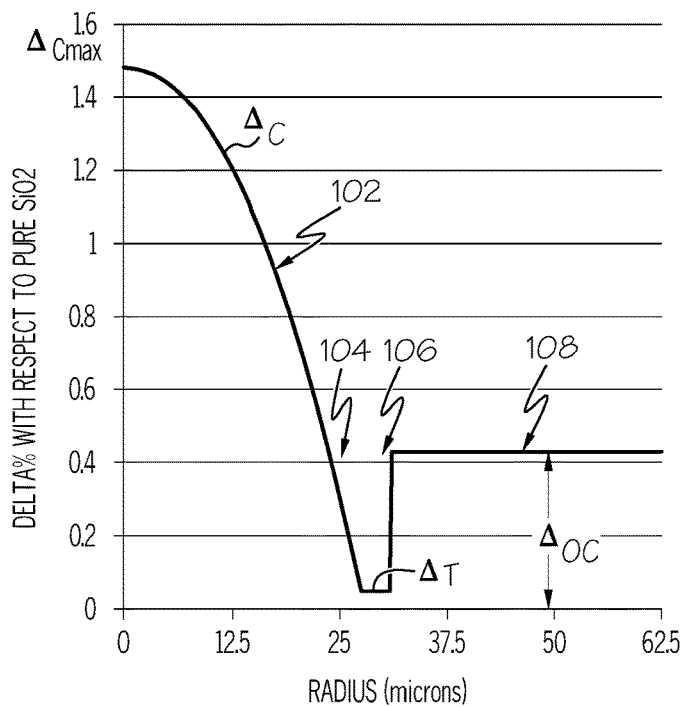
FIG. 21 graphically depicts a modeled relative refractive index profile for an optical fiber design according to FIGS. 3 and 9 as a function of the radius R of the glass portion of the optical fiber.

Referring now to FIGS. 6, 8 and 21, the optical fiber 11 was modeled with a core portion 102 the core portion 102 and the inner cladding portion 104 doped only with a graded concentration of $TiO_2$, a low-index trench 106 doped with $TiO_2$ and an outer cladding 108 doped with $TiO_2$. The core portion had a radius $r_C$ of 24.0 microns, the inner cladding had a radial thickness $T_{IC}$ of 3 microns, and the low-index trench had a radial thickness $T_T$ of 3.5 microns, a relative refractive index of 0.05% and a volume $|V_T|$ of 91.8% $\Delta$-micron$^2$. The concentration of $TiO_2$ in the core portion 102 and the inner cladding portion 104 for the optical fiber design depicted in FIG. 21 was graded such that the concentration of $TiO_2$ was the lowest at the radius $r_{IC}$ of 27.5 microns and increased from the radius $r_{IC}$ along a direction towards the centerline $C_L$ of the core portion 102. The graded concentration of $TiO_2$ provided a core portion 102 comprising a graded relative refractive index with a relative refractive index of 0% at the radius $r_C$ and 1.48% ($\Delta C_{max}$) at the centerline $C_L$ of the core portion 102. The $TiO_2$ concentration for the low-index trench 106 of the optical fiber design depicted in FIG. 21 was constant from the radius $r_C$ of the core portion 102 to the radius $r_T$ of the low-index trench 106. Particularly, the $TiO_2$ concentration for the optical fiber design depicted in FIG. 21 provided a low-index trench 106 comprising a constant relative refractive index $\Delta_T$ of 0.05% from the radius $r_C$ to the radius $r_T$. The $TiO_2$ concentration for the outer cladding 108 of the optical fiber design depicted in FIG. 21 was constant from the inner radius of the cladding portion 103 (i.e., radius $r_C$) to the radius $r_{OC}$ of the cladding portion. Particularly, the $TiO_2$ concentration for the optical fiber design depicted in FIG. 21 provided a cladding portion 103 comprising a constant relative refractive index $\Delta_{OC}$ of 0.43% from the radius $r_C$ to the radius $r_{OC}$.

Figure 22:
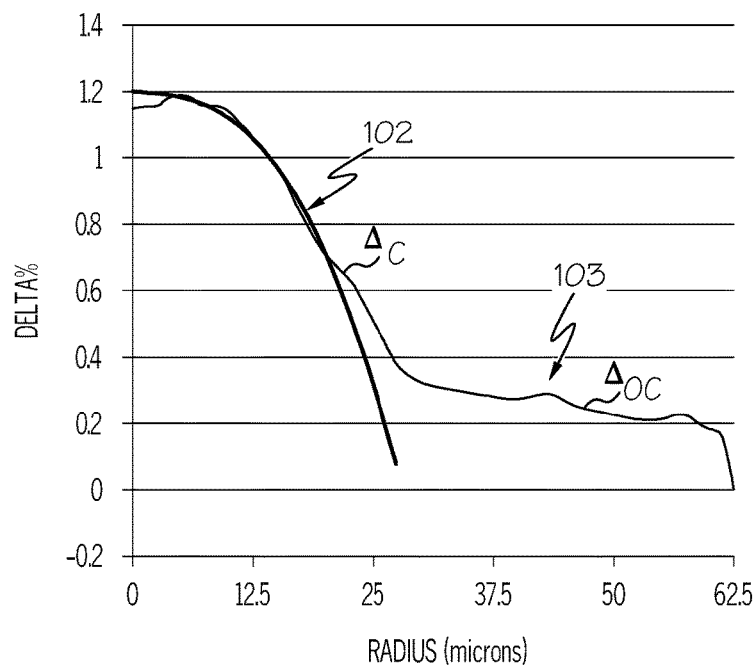
FIG. 22 graphically depicts a measured relative refractive index profile for an optical fiber formed according to the optical fiber design of FIG. 10 as a function of the radius R of the glass portion of the optical fiber.
Figure 23:
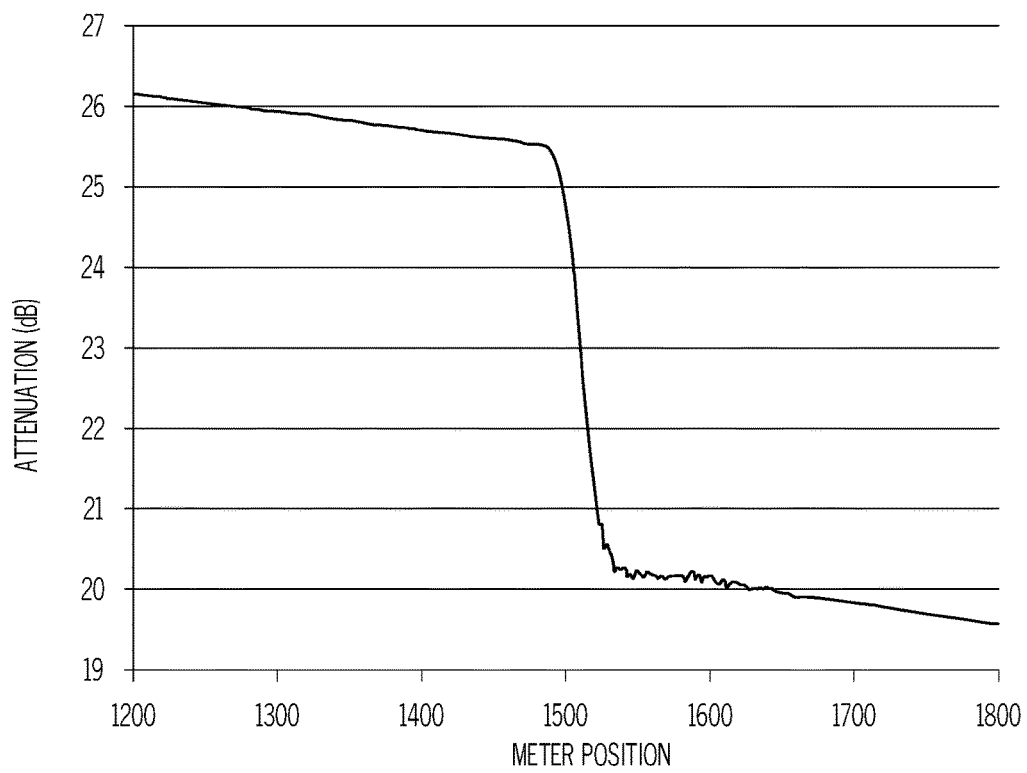
FIG. 23 graphically depicts measured attenuation for the optical fiber formed according to the optical fiber design of FIG. 10 and having the measured relative refractive index profile of FIG. 22.

Referring now to FIGS. 1, 10, 22 and 23, a measured relative refractive index profile for a multimode optical fiber with a radial cross-section depicted in FIG. 1 and formed according to the optical fiber design depicted in FIG. 10 is shown in FIG. 22. Measured attenuation of the multimode optical fiber is depicted in FIG. 23. The optical fiber with the measured relative refractive index profile depicted in FIG. 22 has a core portion with a radius of 28 microns and a cladding portion with a radius of 62.5 microns. The core portion had a maximum relative refractive index of 1.2% and the outer cladding had an average relative refractive index of 0.25%. The numerical aperture of the optical fiber was 0.21 and relative refractive index profile for the core portion had an alpha of 2.66. The OTDR attenuation of a 10 meter section of the optical fiber depicted in FIG. 22 spliced between two 1500 meter segments of OM3 multimode optical fiber is shown in FIG. 23. The attenuation of the 10 meter section is 5 dB thereby corresponding to an average attenuation of 0.5 dB/m.

Figure 24:
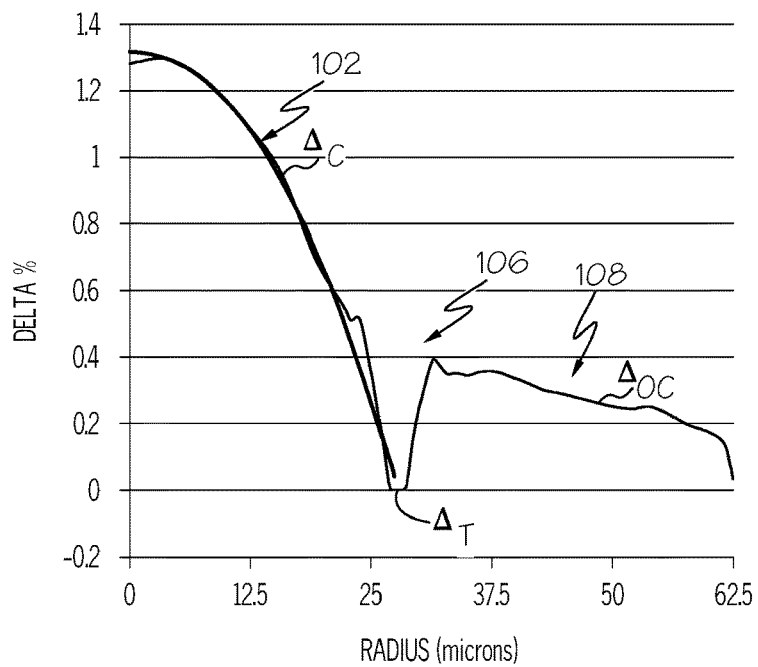
FIG. 24 graphically depicts a measured relative refractive index profile for an optical fiber formed according to the optical fiber design of FIG. 12 as a function of the radius R of the glass portion of the optical fiber.
Figure 25:
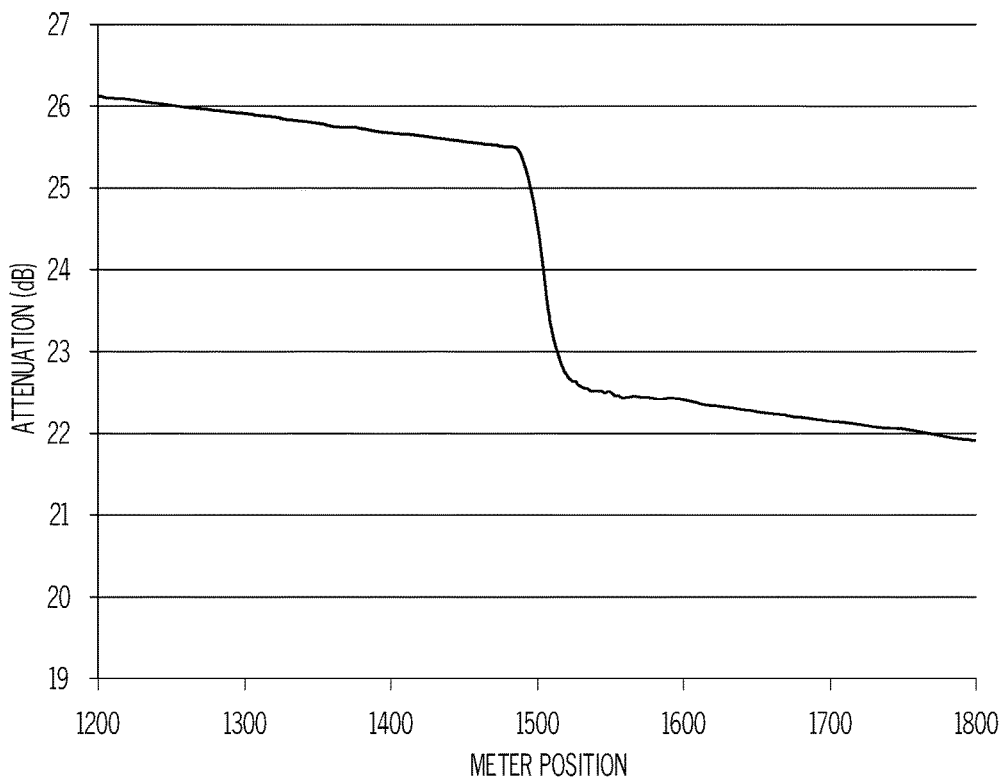
FIG. 25 graphically depicts measured attenuation for the optical fiber formed according to the optical fiber design of FIG. 12 and having the measured relative refractive index profile of FIG. 24.

Referring now to FIGS. 3, 4, 12, 24 and 25, a measured relative refractive index profile for a multimode optical fiber with a radial cross-section depicted in FIG. 3 and formed according to the optical fiber design depicted in FIG. 12 is shown in FIG. 24. Measured attenuation of the multimode optical fiber is depicted in FIG. 25. The optical fiber with the measured relative refractive index profile depicted in FIG. 24 has a core portion with a radius of 25.3 microns, a low-index trench with a radial thickness of 5.8 microns and a volume of 41% $\Delta$-$\mu m^2$, and a cladding portion with a radius of 62.5 microns. The core portion has a maximum relative refractive index of 1.3%, the low-index trench has an average relative refractive index of 0% and the outer cladding has an average relative refractive index of 0.27%. The numerical aperture of the optical fiber was 0.21 and the relative refractive index profile for the core portion has an alpha of 2.18. The OTDR attenuation at 850 nm of a 2 meter section of the optical fiber with the measured relative refractive index profile depicted in FIG. 24 spliced between two 1500 meter segments of OM3 multimode optical fiber is shown in FIG. 25. The attenuation of the 2 meter section of the optical fiber is 3 dB thereby corresponding to an average attenuation of 1.5 dB/m.

Figure 26:
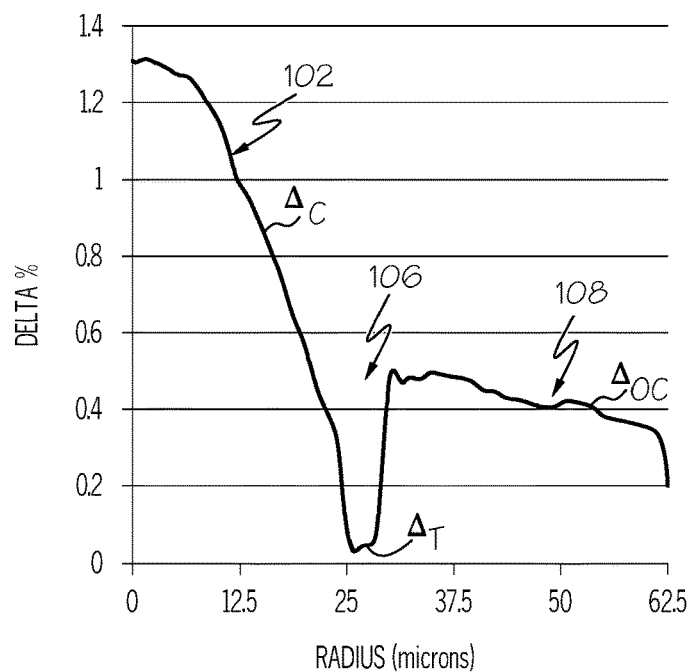
FIG. 26 graphically depicts a measured relative refractive index profile for an optical fiber formed according to the optical fiber design of FIG. 12 as a function of the radius R of the glass portion of the optical fiber.
Figure 27:
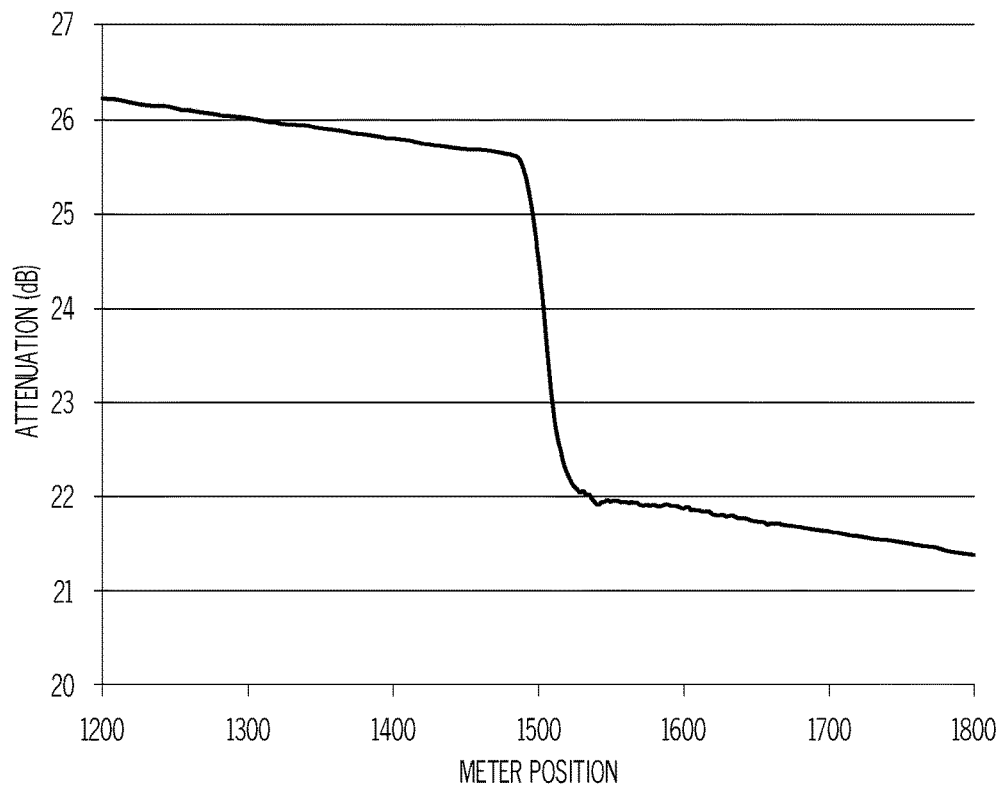
FIG. 27 graphically depicts measured attenuation for the optical fiber formed according to the optical fiber design of FIG. 12 and having the measured relative refractive index profile of FIG. 26.
Figure 28:
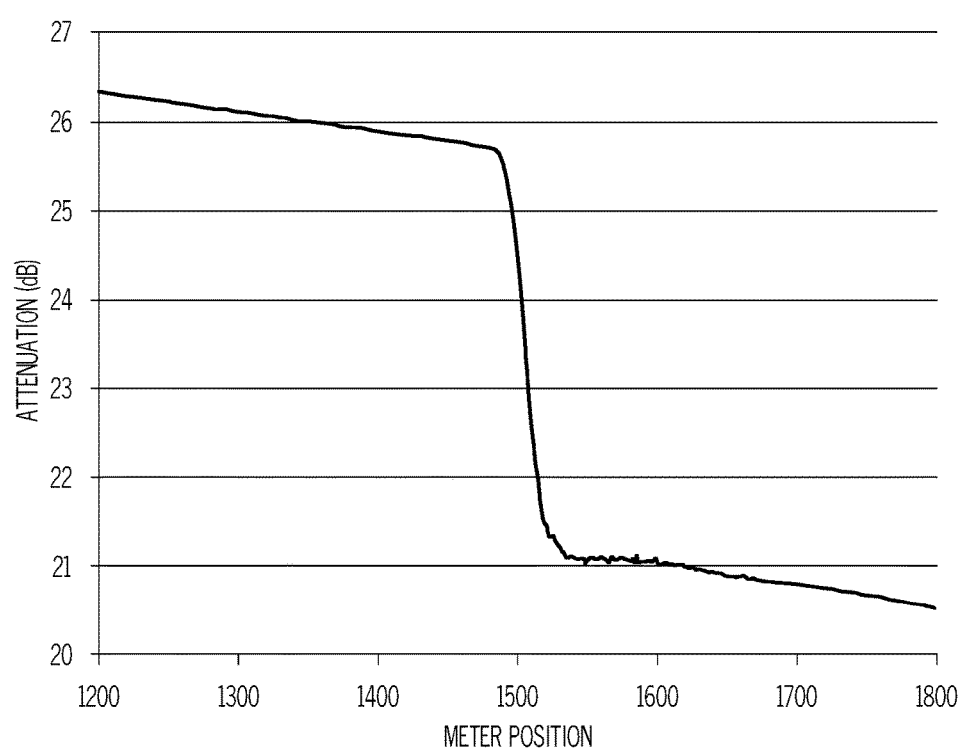
FIG. 28 graphically depicts measured attenuation for the optical fiber formed according to the optical fiber design of FIG. 12, having the measured relative refractive index profile of FIG. 26 and wrapped five times around a mandrel with a diameter of 10 mm.

Referring now to FIGS. 6, 8, 26, 27 and 28, a measured relative refractive index profile for a multimode optical fiber with a radial cross-section depicted in FIG. 3 and formed according to the optical fiber design depicted in FIG. 8 is shown in FIG. 26. Measured attenuation measurements of the multimode optical fiber are depicted in FIGS. 27 and 28. The optical fiber with the measured relative refractive index profile depicted in FIG. 26 has a core portion with a radius of 22.1 microns, an inner cladding having a radius of 25.5 microns, a low-index trench with a radial thickness of 4.1 microns and a volume of 92%-$\mu m^2$, and a cladding portion with a radius of 62.5 microns. The core portion has a maximum relative refractive index of 1.31%, the low-index trench has an average relative refractive index of 0.05% and the outer cladding has an average relative refractive index of 0.4% with respect to pure silica. The numerical aperture of the optical fiber was 0.20 and the relative refractive index profile for the core portion has an alpha of 1.83. The OTDR attenuation at 850 nm of a 0.5 meter section of the optical fiber with the measured relative refractive index profile depicted in FIG. 26 spliced between two 1500 meter segments of OM3 multimode optical fiber is shown in FIG. 27.

The attenuation of the 0.5 meter section of the optical fiber is 3.7 dB thereby corresponding to an average attenuation of 7.4 dB/m. Attenuation at 850 nm of the fiber wrapped five times around a mandrel with a diameter of 10 mm is depicted in FIG. 28. The attenuation of the 0.5 meter section of the optical fiber wrapped five times around the mandrel with the diameter of 10 mm is 4.6 dB thereby corresponding to a macrobend loss of 0.9 dB (4.6 dB-3.7 dB), or 0.18 dB/turn.

Figure 29:
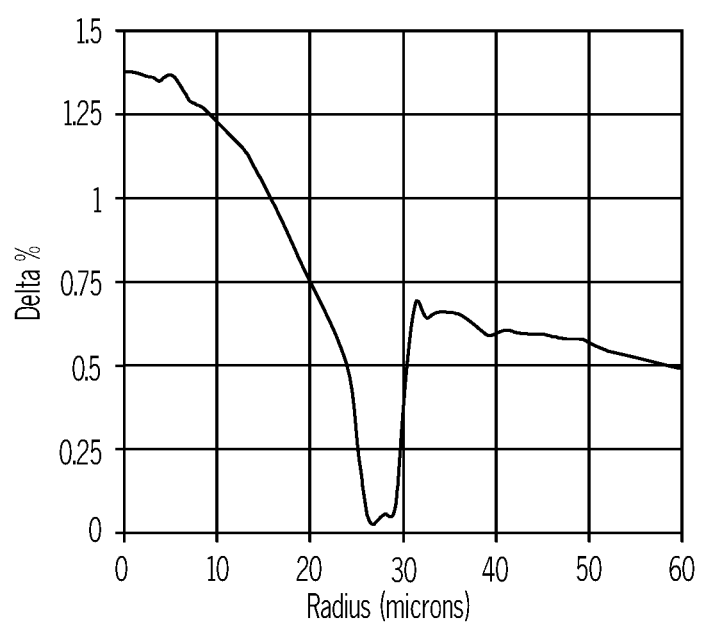
FIG. 29 graphically depicts a measured relative refractive index profile for an optical fiber formed according to the optical fiber design of FIG. 12 as a function of the radius R of the glass portion of the optical fiber.

Referring now to FIGS. 6, 8 and 29, a measured relative refractive index profile for a multimode optical fiber with a radial cross-section depicted in FIG. 3 and formed according to the optical fiber design depicted in FIG. 8 is shown in FIG. 29. In this embodiment, $\Delta_C = \Delta_{C1} + \Delta_{C2}$ and $\Delta_{C1} = \Delta_{C2}/3$ The optical fiber with the measured relative refractive index profile depicted in FIG. 29 has a core portion with a radius of 23.4 microns, an inner cladding having a radius of 25.2 microns, a low-index trench with a radial thickness of 4.2 microns and a volume of 119%-$\mu m^2$, and a cladding portion with a radius of 62.5 microns. The core portion has a maximum relative refractive index of 1.36%, the low-index trench has an average relative refractive index of 0.05% and the outer cladding has an average relative refractive index of 0.6% with respect to pure silica. The numerical aperture of the optical fiber was 0.20 and the relative refractive index profile for the core portion has an alpha of 2.07. The OTDR attenuation at 850 nm of a 0.2 meter section of the optical fiber with the measured relative refractive index profile depicted in FIG. 29 was 3.2 dB thereby corresponding to an average attenuation of 15.9 dB/m. The OTDR attenuation at 1310 nm of a 0.2 meter section of the optical fiber with the measured relative refractive index profile depicted in FIG. 29 was 1.03 dB thereby corresponding to an average attenuation of 5.1 dB/m.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber comprising:
   a core portion having a radius $r_C$, a centerline $C_L$, a numerical aperture NA greater than or equal to 0.15 and less than or equal to 0.25, a graded relative refractive index profile having a maximum relative refractive index $\Delta C_{max}$ and an α value greater than or equal to 1 and less than or equal to 3, the core portion formed from silica-based glass comprising:
      an up-dopant, wherein a concentration of the up-dopant in the core portion is graded such that the concentration of the up-dopant is lowest at the radius $r_C$ and increases from the radius $r_C$ along a direction towards the centerline $C_L$ of the core portion; and
      an attenuation dopant, wherein a concentration of the attenuation dopant in the core portion is constant from the centerline $C_L$ of the core portion to the radius $r_C$ of the core portion;
   a cladding portion surrounding the core portion and having a relative refractive index $\Delta_{OC}$, the cladding portion formed from silica-based glass comprising the attenuation dopant, wherein the concentration of the attenuation dopant in the cladding portion is constant or slightly decreasing through a radial thickness of the cladding portion, wherein:

$\Delta C_{max} > \Delta_{OC}$;

the optical fiber is multi-moded for wavelengths of light within a range from about 800 nm to about 1000 nm; and
   an attenuation of the optical fiber for at least one wavelength between 800 nm and 1000 nm is greater than or equal to 0.5 dB/m.

2. The optical fiber of claim 1, wherein the up-dopant is $GeO_2$.

3. The optical fiber of claim 2, wherein a maximum concentration of $GeO_2$ is greater than or equal to 7 wt. % and less than or equal to 20 wt. %.

4. The optical fiber of claim 1, wherein the attenuation dopant is $TiO_2$.

5. The optical fiber of claim 4, wherein a maximum concentration of $TiO_2$ is greater than or equal to 0.5 wt. % and less than or equal to 15 wt. %.

6. The optical fiber of claim 1, wherein the cladding portion further comprises a low-index trench and an outer cladding, the low-index trench positioned between the core portion and the outer cladding, the low-index trench having a relative refractive index $\Delta_T$ and the outer cladding having the relative refractive index $\Delta_{OC}$, wherein $\Delta C_{max} > \Delta_{OC} > \Delta_T$.

7. The optical fiber of claim 6, wherein the low-index trench directly contacts the core portion and the outer cladding.

8. The optical fiber of claim 6, wherein the radius $r_C$ is greater than or equal to 23 microns and less than or equal to 28 microns.

9. The optical fiber of claim 6, wherein the low-index trench has a radius $r_T$ greater than or equal to 26 microns and less than or equal to 40 microns.

10. The optical fiber of claim 6, wherein the low-index trench is formed from substantially pure silica glass.

11. The optical fiber of claim 6, wherein the low-index trench is formed from silica glass doped with the attenuation dopant.

12. The optical fiber of claim 6, wherein the cladding portion further comprises an inner cladding positioned between the core portion and the low-index trench, wherein the inner cladding has a relative refractive index $\Delta_{IC}$ and is formed from silica-based glass comprising the attenuation dopant.

13. The optical fiber of claim 12, wherein the inner cladding has a radius $r_{IC}$ greater than or equal to 23 microns and less than or equal to 30 microns.

14. The optical fiber of claim 1, wherein the optical fiber has a bend loss of less than 0.5 dB at a wavelength of 850 nm for two turns around a 30 mm mandrel.

15. The optical fiber of claim 1, wherein the optical fiber has a bend loss of less than 1 dB at a wavelength of 850 nm for two turns around a 15 mm mandrel.

16. The optical fiber of claim 1, wherein the optical fiber has a bend loss of less than 2 dB at a wavelength of 850 nm for two turns around a 01 mm mandrel.

17. The optical fiber of claim 1, wherein the attenuation of the optical fiber for at least one wavelength between 800 nm and 1000 nm is greater than or equal to 8.0 dB/m.

18. The optical fiber of claim 1, wherein the attenuation dopant is incorporated into core of the optical fiber using an outside vapor deposition (OVD) formed optical fiber or an inside vapor deposition (IVD) formed optical fiber.

19. An optical fiber comprising:
   a core portion having a radius $r_C$, a centerline $C_L$, a numerical aperture NA greater than or equal to 0.15 and less than or equal to 0.25, a graded relative refractive index profile having a maximum relative refractive index $\Delta C_{max}$ and an α value greater than or equal to 1 and less than or equal to 3, the core portion formed from silica-based glass comprising:

an up-dopant, wherein a concentration of the up-dopant in the core portion is graded such that the concentration of the up-dopant is lowest at the radius $r_C$ and increases from the radius $r_C$ along a direction towards the centerline $C_L$ of the core portion; and an attenuation dopant, wherein a concentration of the attenuation dopant in the core portion is graded such that the concentration of the attenuation dopant is lowest at the radius $r_C$ and increases from the radius $r_C$ along the direction towards the centerline $C_L$ of the core portion;

a cladding portion surrounding the core portion and having a relative refractive index $\Delta_{OC}$, the cladding portion formed from silica-based glass comprising the attenuation dopant, wherein:

$\Delta C_{max} > \Delta_{OC}$;

the optical fiber is multi-moded for wavelengths of light within a range from about 800 nm to about 1000 nm; and an attenuation of the optical fiber for at least one wavelength between 800 nm and 1000 nm is greater than or equal to 0.5 dB/m.

20. The optical fiber of claim 19, wherein the up-dopant is $GeO_2$ and a maximum concentration of $GeO_2$ is greater than or equal to 7 wt. % and less than or equal to 20 wt. %.

21. The optical fiber of claim 19, wherein the attenuation dopant is $TiO_2$ and a maximum concentration of $TiO_2$ is greater than or equal to 0.5 wt. % and less than or equal to 15 wt. %.

22. The optical fiber of claim 19, wherein the cladding portion further comprises a low-index trench and an outer cladding, the low-index trench positioned between the core portion and the outer cladding, the low-index trench having a relative refractive index $\Delta_T$ and the outer cladding having the relative refractive index $\Delta_{OC}$, wherein $\Delta C_{max} > \Delta_{OC} > \Delta_T$.

23. The optical fiber of claim 22, wherein the radius $r_C$ is greater than or equal to 23 microns and less than or equal 28 microns, the low-index trench has a radius $r_T$ greater than or equal to 26 microns and less than or equal to 40 microns and the low-index trench directly contacts the core portion and the outer cladding.

24. The optical fiber of claim 22, wherein the low-index trench is formed from substantially pure silica glass.

25. The optical fiber of claim 22, wherein the low-index trench is formed from silica glass doped with the attenuation dopant.

26. The optical fiber of claim 22, wherein the cladding portion further comprises an inner cladding positioned between the core portion and the low-index trench, wherein the inner cladding has a radius $r_{IC}$ greater than or equal to 23 microns and less than or equal to 30 microns, a relative refractive index $\Delta_{IC}$ and is formed from silica-based glass comprising the attenuation dopant.

27. The optical fiber of claim 26, wherein $\Delta_{IC} = \Delta_{OC}$.

28. The optical fiber of claim 19, wherein the optical fiber has at least one of a bend loss of less than 0.5 dB for two turns around a 30 mm mandrel, a bend loss of less than 1 dB for two turns around a 15 mm mandrel and a bend loss of less than 2 dB for two turns around a 10 mm mandrel at a wavelength of 850 nm.

29. The optical fiber of claim 19, wherein a concentration of the attenuation dopant in the cladding portion is constant through a radial thickness of the cladding portion.

30. The optical fiber of claim 19, wherein a concentration of the attenuation dopant in the cladding portion is slightly decreasing through a radial thickness of the cladding portion.

31. The optical fiber of claim 19, wherein the attenuation of the optical fiber for at least one wavelength between 800 nm and 1000 nm is greater than or equal to 8.0 dB/m.

32. The optical fiber of claim 19, wherein the optical fiber is an outside vapor deposition (OVD) formed optical fiber or an inside vapor deposition (IVD) formed optical fiber.

33. An optical fiber comprising:

a core portion having a radius $r_C$, a centerline $C_L$, a numerical aperture NA greater than or equal to 0.15 and less than or equal to 0.25, a graded relative refractive index profile having a maximum relative refractive index $\Delta C_{max}$ and an α value greater than or equal to 1 and less than or equal to 3, the core portion formed from silica-based glass comprising an attenuation dopant, wherein a concentration of the attenuation dopant in the core portion is graded such that the concentration of the attenuation dopant is lowest at the radius $r_C$ and increases from the radius rC along a direction towards the centerline $C_L$ of the core portion;

a cladding portion surrounding the core portion and having a relative refractive index $\Delta_{OC}$, the cladding portion formed from silica-based glass comprising the attenuation dopant, wherein:

$\Delta C_{max} > \Delta_{OC}$;

the optical fiber is multi-moded for wavelengths of light within a range from about 800 nm to about 1000 nm; and an attenuation of the optical fiber for at least one wavelength between 800 nm and 1000 nm is greater than or equal to 0.5 dB/m.

34. The optical fiber of claim 33, wherein the cladding portion further comprises a low-index trench and an outer cladding, the low-index trench positioned between the core portion and the outer cladding, the low-index trench having a relative refractive index $\Delta_T$ and the outer cladding having the relative refractive index $\Delta_{OC}$, wherein $\Delta C_{max} > \Delta_{OC} > \Delta_T$.

* * * * *

UNITED STATES PATENT AND TRADEMARK OFFICE
CERTIFICATE OF CORRECTION

PATENT NO. : 10,162,109 B2
APPLICATION NO. : 15/881239
DATED : December 25, 2018
INVENTOR(S) : Kevin Wallace Bennett et al.

Page 1 of 1

It is certified that error appears in the above-identified patent and that said Letters Patent is hereby corrected as shown below:

On the Title Page

In Column 2, item (57), Abstract, Line 5, delete "$\Delta_{Cmax}$" and insert -- $\Delta C_{max}$ --, therefor.

In the Claims

In Column 48, Line 35, Claim 33, delete "rC" and insert -- $r_C$ --, therefor.

Signed and Sealed this
Ninth Day of June, 2020

Andrei Iancu
*Director of the United States Patent and Trademark Office*